(12) United States Patent
Tanaka et al.

(10) Patent No.: US 11,795,912 B2
(45) Date of Patent: Oct. 24, 2023

(54) WIND TURBINE CONTROL DEVICE, WIND TURBINE CONTROL PROGRAM, AND WIND TURBINE CONTROL METHOD

(71) Applicant: NATIONAL INSTITUTE OF ADVANCED INDUSTRIAL SCIENCE AND TECHNOLOGY, Tokyo (JP)

(72) Inventors: Motofumi Tanaka, Koriyama (JP); Hirokazu Kawabata, Koriyama (JP); Tetsuya Kogaki, Koriyama (JP); Noritsugu Kubo, Koriyama (JP)

(73) Assignee: NATIONAL INSTITUTE OF ADVANCED INDUSTRIAL SCIENCE AND TECHNOLOGY ( * ) Notice: Subject to any disclaimer, the term of this patent is extended or adjusted under 35 U.S.C. 154(b) by 74 days.

(21) Appl. No.: 17/618,598

(22) PCT Filed: Jun. 12, 2020

(86) PCT No.: PCT/JP2020/023303
§ 371 (c)(1),
(2) Date: Dec. 13, 2021

(87) PCT Pub. No.: WO2020/251042
PCT Pub. Date: Dec. 17, 2020

(65) Prior Publication Data
US 2022/0356868 A1 Nov. 10, 2022

(30) Foreign Application Priority Data
Jun. 14, 2019 (JP) .................................. 2019-111506
Dec. 2, 2019 (JP) .................................. 2019-218167

(51) Int. Cl.
F03D 7/04 (2006.01)

(52) U.S. Cl.
CPC ....................................... *F03D 7/04* (2013.01)

(58) Field of Classification Search
CPC ........................................................ F03D 7/04
See application file for complete search history.

(56) References Cited

U.S. PATENT DOCUMENTS

2014/0167419 A1    6/2014  Quek ............................. 290/55
2016/0146188 A1*  5/2016  Matsuda ................. F03D 7/022
                                                              416/146 R

FOREIGN PATENT DOCUMENTS

| JP | 2016-015882 A | 1/2016 |
| JP | 5881491 B2 | 3/2016 |
| JP | 2016-098787 A | 5/2016 |

OTHER PUBLICATIONS

International Search Report dated Aug. 18, 2020 in corresponding PCT International Application No. PCT/JP2020/023303.

(Continued)

Primary Examiner — Viet P Nguyen
(74) Attorney, Agent, or Firm — OSTROLENK FABER LLP

(57) ABSTRACT

A wind turbine control device acquires operation history data at the time of plasma generation indicating an operation history of a first wind turbine when a plasma has been generated by plasma electrodes installed on a blade and operation history data at the time of stopping plasma generation indicating an operation history of the first wind turbine when no plasma has been generated by the plasma electrodes, executes an operation history comparison process of comparing the operation history data at the time of plasma generation with the operation history data at the time of stopping plasma generation, executes an operation history determination process of determining whether or not a result of the operation history comparison process satisfies a prescribed first condition, and controls at least one of the (Continued)

plasma electrodes and at least one of the first wind turbine and a second wind turbine different from the first wind turbine on the basis of a result of the operation history determination process.

28 Claims, 21 Drawing Sheets

(56) References Cited

OTHER PUBLICATIONS

Written Opinion dated Aug. 18, 2020 in corresponding PCT International Application No. PCT/JP2020/023303.

* cited by examiner

FIG. 12
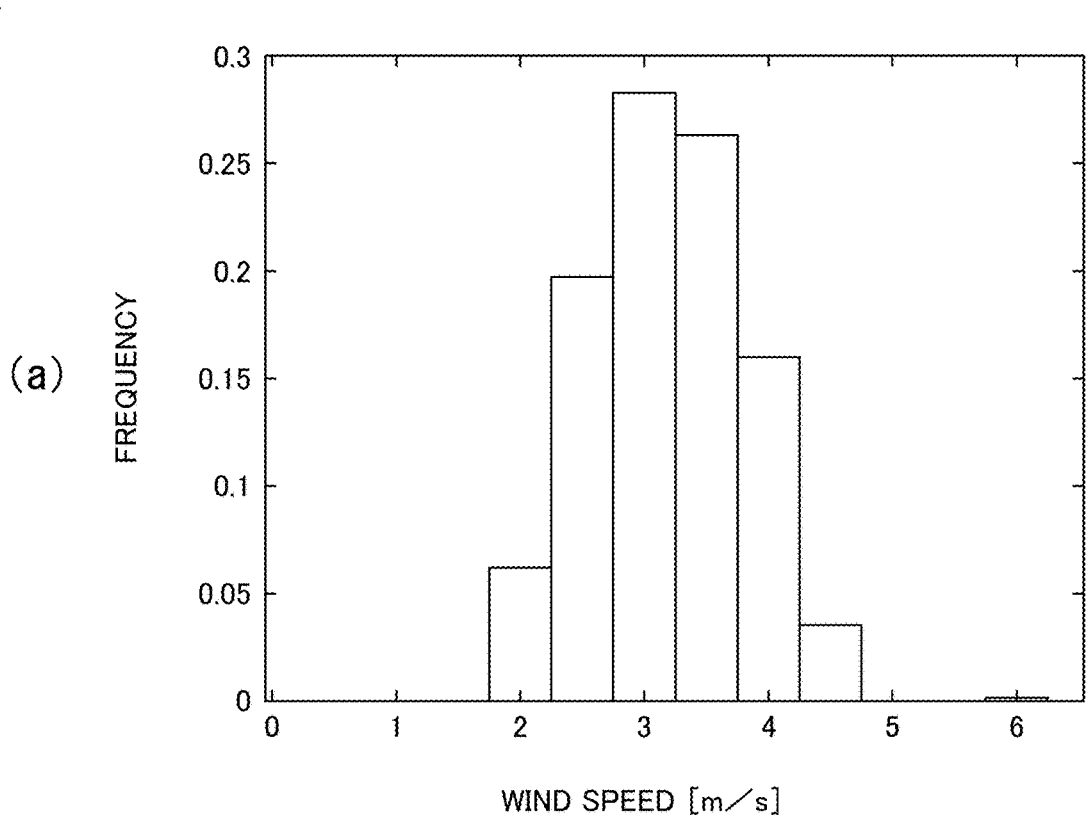
(a)
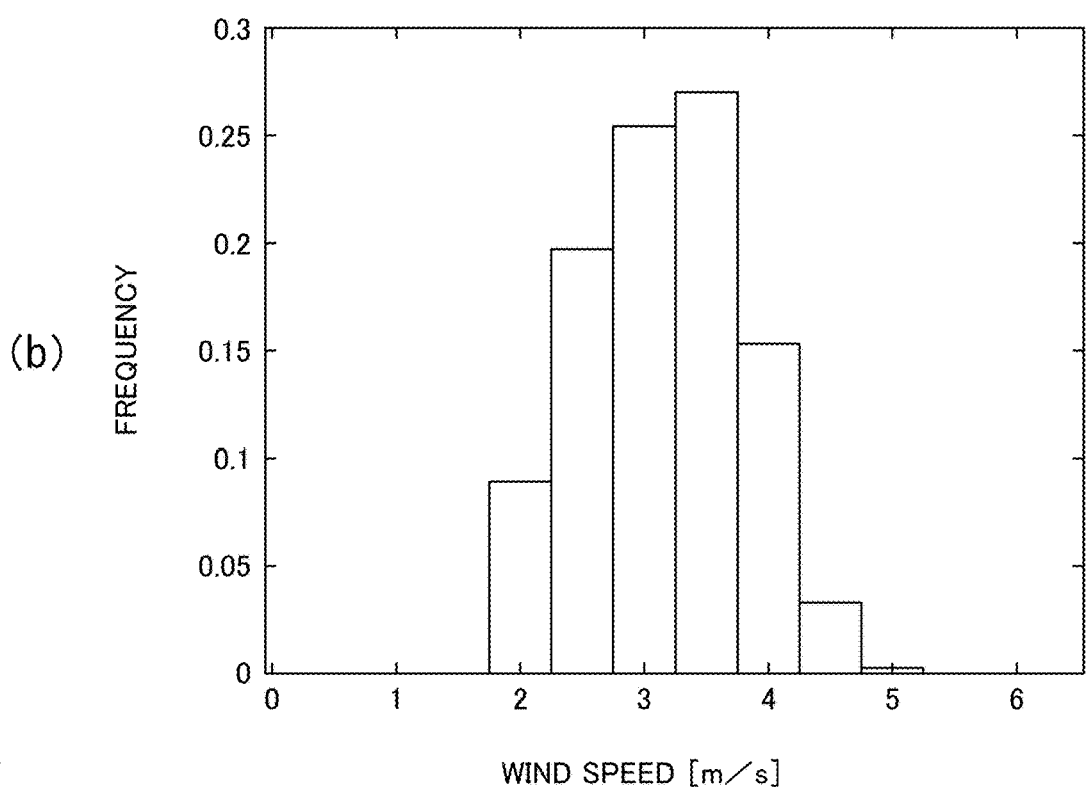
(b)

FIG. 13
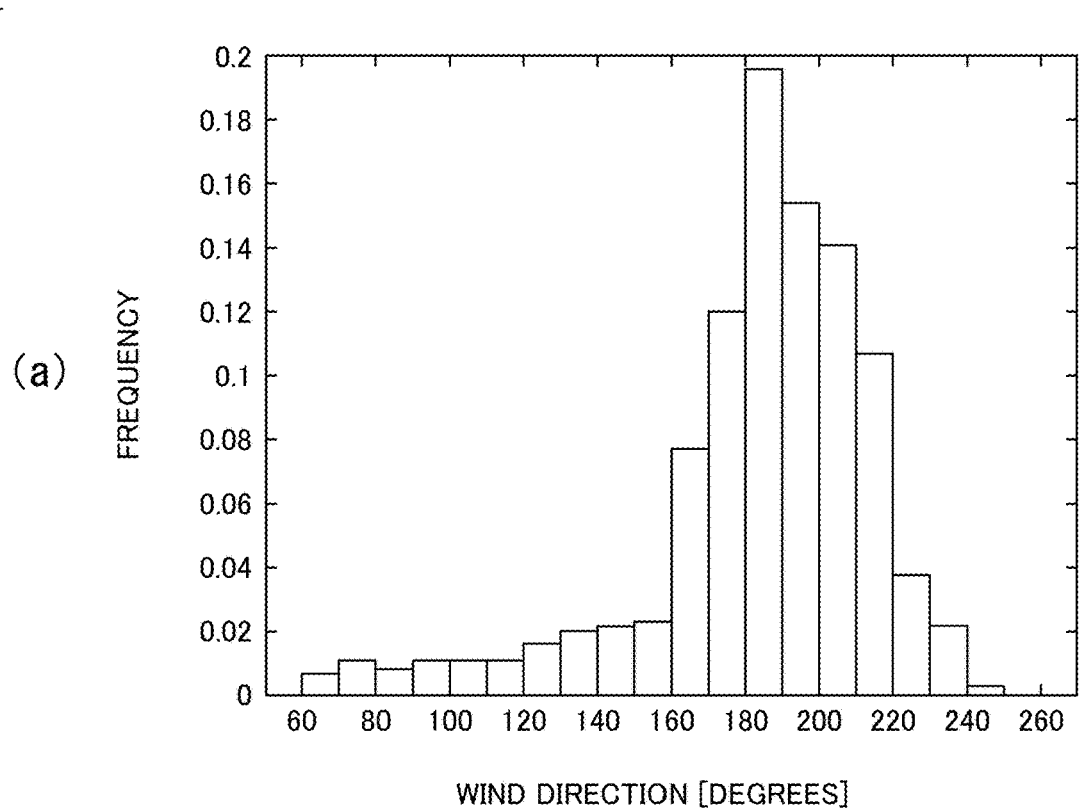
(a)
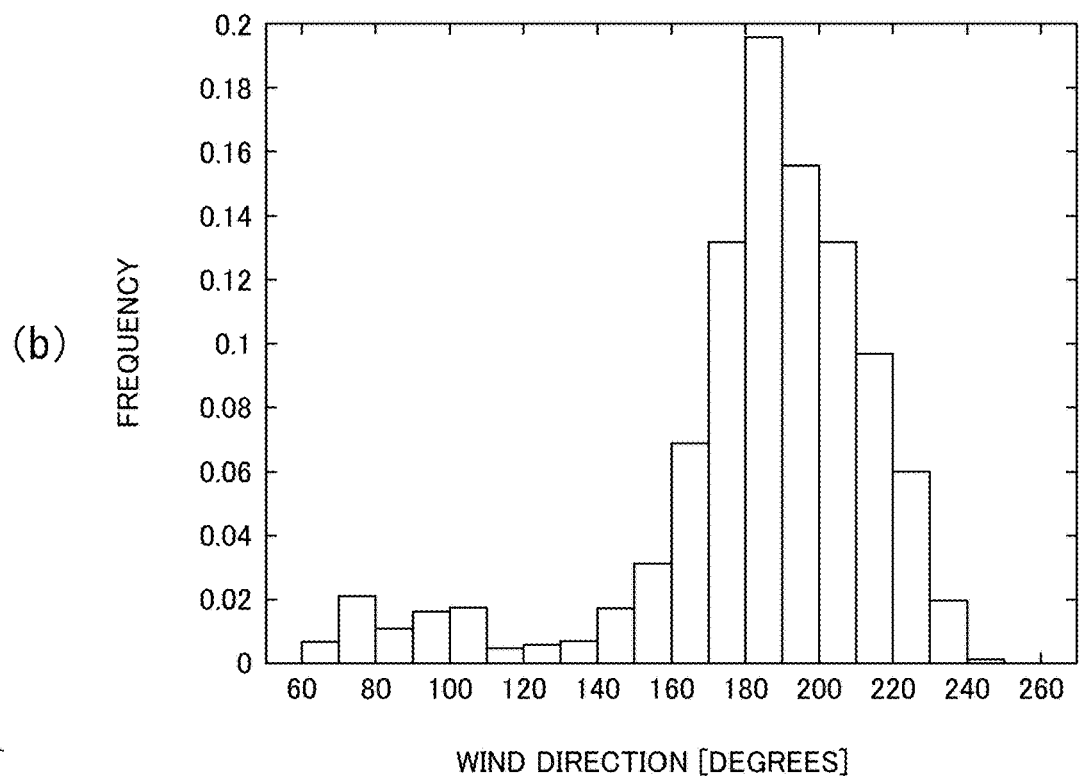
(b)

WIND TURBINE CONTROL DEVICE, WIND TURBINE CONTROL PROGRAM, AND WIND TURBINE CONTROL METHOD

CROSS-REFERENCE TO RELATED APPLICATIONS

The present application is a 35 U.S.C. §§ 371 national phase conversion of PCT/JP2020/023303, filed Jun. 12, 2020, which claims priority to Japanese Patent Application No. 2019-111506, filed Jun. 14, 2019, and Japanese Patent Application No. 2019-218167, filed Dec. 2, 2019, the contents of which are incorporated herein by reference. The PCT International Application was published in the Japanese language.

TECHNICAL FIELD

The present invention relates to a wind turbine control device, a wind turbine control program, and a wind turbine control method.

BACKGROUND ART

In recent years, the importance of wind power generation using wind turbines has increased. In particular, wind power generation using a wind turbine has advantages such as no depletion, no carbon dioxide emissions at the time of power generation, low power generation cost of renewable energies, and high efficiency of power generation.

However, when flow separation has occurred on a blade surface of a blade of a wind turbine, the torque of a power generator decreases rapidly and a rotational speed of the power generator decreases. In this case, a rapid change in a load is applied to a power train provided in the wind turbine, which may cause a failure in the wind turbine. Therefore, the wind turbine controls a pitch angle of the blade or torque of the power generator so that flow separation does not occur on the blade surface of the blade when an angle of attack exceeds a stall angle. Also, a wind power generation system that suppress flow separation by generating a plasma-induced flow to optimize a flow on the blade surface and improve a power generation output is disclosed in Patent Literature 1.

The wind power generation system according to Patent Literature 1 includes a rotor, a nacelle, a tower, an airflow generation device, a voltage application mechanism, a measurement device, and a control means. The rotor includes a hub and at least two or more blades attached to the hub. The nacelle pivotally supports the rotor via a rotating shaft connected to the hub. The tower supports the nacelle. The airflow generation device is provided at a leading edge of the blade and includes a first electrode and a second electrode which are separated from each other via a dielectric and can generate a plasma-induced flow. The voltage application mechanism can apply a voltage between the first electrode and the second electrode of the airflow generation device. The measurement device detects information about at least one of an output in the wind power generation system, torque in the rotor, and a rotational speed of the blade. Also, the measurement device measures a speed of the wind flowing into the blade with an anemometer installed on the nacelle. The control means controls the voltage application mechanism on the basis of the output from the measurement device.

Also, the control means is characterized in that a plasma-induced flow is generated by controlling the voltage application mechanism and applying the voltage to the airflow generation device when it is determined that the state is a complete stall state in which the actual output in the wind power generation system, the actual torque in the rotor, or the actual rotational speed of the blade is less than the set output in the wind power generation system, the set torque in the rotor, or the set rotational speed of the blade preset at a wind speed of an axial direction when the actual output, the actual torque, or the actual rotational speed is obtained for a prescribed time period.

Also, the wind power generation system according to Patent Literature 1 calculates an angle of attack from information such as the wind speed and the rotational speed of the power generator acquired by the measurement device and determines whether or not a stall has occurred by determining whether or not the angle of attack exceeds the stall angle. Also, when it is determined that a stall has occurred, the wind power generation system generates a plasma-induced flow to suppress the stall.

However, because the wind received by the wind turbine is not uniform within the rotating surfaces of a blade 51, a blade 52, and a blade 53 and changes irregularly, it is difficult to predict the wind only with a measured value from the anemometer installed on the nacelle. Although there is also technology for measuring a wind direction and a wind speed using a light detection and ranging (LIDAR) sensor, it is difficult to ascertain an angle of attack and its distribution for each blade element accurately because a certain period in time is required for scanning and averaging. Therefore, the wind power generation system according to Patent Literature 1 may not be able to determine whether or not a stall has occurred on the basis of the angle of attack calculated from information about a wind speed, a rotational speed, and the like measured by the measurement device.

On the other hand, the occurrence of a stall can also be detected by detecting a rapid decrease in the rotational speed of the power generator. However, the phenomenon in which the rotational speed of the power generator connected to the wind turbine decreases is not always caused due to flow separation, and may also be caused due to a change in a wind condition, i.e., a wind direction and a wind speed. Also, when a phenomenon in which the rotational speed of the power generator connected to the wind turbine decreases due to a change in the wind condition rather than flow separation has occurred, the above-described phenomenon cannot be limited even if the above-described airflow generation device is used and the consumption for electric power for operating the airflow generation device may also be ineffective. Thus, technology for ascertaining the cause or presence of the above-described phenomenon is desired.

As technology for ascertaining the cause or presence of the above-described phenomenon, for example, a wind power generation system according to Patent Literature 2 can be mentioned. In the wind power generation system according to Patent Literature 2, a voltage is applied from the voltage application mechanism to the airflow generation device for a prescribed time period, and a process of comparing a value with the actual output in the wind power generation system, the actual torque in the rotor, or the actual rotational speed of the blade before/after the voltage is applied is performed. When it is determined that the actual output, the actual torque, or the actual rotational speed has increased by applying the voltage, the wind power generation system further controls the voltage application mechanism for a prescribed time period, applies the voltage to the airflow generation device, and causes a plasma-induced flow to be generated. Thereby, the wind power generation system can determine whether or not flow separation has occurred without being affected by the wind condition.

CITATION LIST

Patent Literature

[Patent Literature 1]
Japanese Unexamined Patent Application, First Publication No. 2016-015882
[Patent Literature 2]
Japanese Patent No. 5881491

However, in the wind power generation system according to Patent Literature 2, for example, it may be difficult to determine whether or not flow separation has occurred according to control applied to the wind turbine and a degree of a difference between the wind condition at the time of plasma generation and the wind condition at the time of stopping plasma generation. Also, when a wind turbine is operated, it is necessary to control the wind turbine and/or another wind turbine installed near the wind turbine on the basis of a relationship between an operation history when a plasma is being generated by plasma electrodes attached to the wind turbine and an operation history when no plasma is being generated.

SUMMARY OF INVENTION

Technical Problem

The present invention has been made in view of such circumstances and an objective of the present invention is to provide a wind turbine control device, a wind turbine control program, and a wind turbine control method capable of controlling a wind turbine to which plasma electrodes are attached and another wind turbine installed near the wind turbine in accordance with a relationship between an operation history when a plasma is being generated and an operation history when no plasma is being generated.

Solution to Problem

According to an aspect of the present invention, there is provided a wind turbine control device including: an acquisition unit configured to acquire operation history data at the time of plasma generation indicating an operation history of a first wind turbine when a plasma has been generated by plasma electrodes installed on a blade and operation history data at the time of stopping plasma generation indicating an operation history of the first wind turbine when no plasma has been generated by the plasma electrodes; a determination unit configured to execute an operation history comparison process of comparing the operation history data at the time of plasma generation with the operation history data at the time of stopping plasma generation and execute an operation history determination process of determining whether or not a result of the operation history comparison process satisfies a prescribed first condition; and a control unit configured to control at least one of the plasma electrodes and at least one of the first wind turbine and a second wind turbine different from the first wind turbine on the basis of a result of the operation history determination process.

Also, in the above-described wind turbine control device, the acquisition unit acquires wind condition data at the time of plasma generation indicating a wind condition when the plasma has been generated by the plasma electrodes simultaneously with the operation history data at the time of plasma generation and acquires wind condition data at the time of stopping plasma generation indicating a wind condition when no plasma has been generated by the plasma electrodes simultaneously with the operation history data at the time of stopping plasma generation.

Also, in the above-described wind turbine control device, the acquisition unit acquires wind condition data at the time of plasma generation indicating a wind condition when the plasma has been generated by the plasma electrodes and acquires wind condition data at the time of stopping plasma generation indicating a wind condition when no plasma has been generated by the plasma electrodes, the determination unit executes a wind condition comparison process of comparing the wind condition data at the time of plasma generation with the wind condition data at the time of stopping plasma generation and further determines whether or not a result of the wind condition comparison process satisfies a prescribed wind condition condition, and the acquisition unit acquires the operation history data at the time of plasma generation and the operation history data at the time of stopping plasma generation when it is determined that the result of the wind condition comparison process satisfies the prescribed wind condition condition.

Also, in the above-described wind turbine control device, the determination unit compares a statistical value of a physical quantity included in the operation history data at the time of plasma generation with a statistical value of a physical quantity included in the operation history data at the time of stopping plasma generation in the operation history comparison process.

Also, in the above-described wind turbine control device, the acquisition unit acquires the operation history data at the time of plasma generation indicating a relationship between at least two types of physical quantities and the operation history data at the time of stopping plasma generation indicating a relationship between at least two types of physical quantities, and the determination unit determines whether or not the prescribed first condition in which the relationship between at least two types of physical quantities indicated in the operation history data at the time of plasma generation matches the relationship between at least two types of physical quantities indicated in the operation history data at the time of stopping plasma generation is satisfied in the operation history determination process.

Also, in the above-described wind turbine control device, the acquisition unit further acquires second wind turbine operation history data indicating an operation history of the second wind turbine, and the control unit selects any of execution of a process of changing only control of the first wind turbine, execution of a process of changing only control of the second wind turbine, and execution of a process of changing the control of the first wind turbine and the control of the second wind turbine on the basis of the result of the operation history determination process.

Also, in the above-described wind turbine control device, the acquisition unit acquires the operation history data at the time of plasma generation indicating a relationship between a tip speed ratio and a power coefficient of the first wind turbine and the operation history data at the time of stopping plasma generation indicating a relationship between a tip speed ratio and a power coefficient of the first wind turbine, the wind turbine control device further includes an adjustment unit configured to adjust a control parameter related to at least one of the tip speed ratio, torque of the first wind turbine, a pitch angle of the first wind turbine, and a yaw control characteristic for the first wind turbine when it is determined that the result of the operation history comparison process satisfies the prescribed first condition, and the control unit selects the execution of the process of changing only the control of the first wind turbine and controls the first wind turbine using the control parameter adjusted by the adjustment unit.

Also, in the above-described wind turbine control device, the acquisition unit acquires the operation history data at the time of plasma generation indicating a relationship between an output and a wind speed of the first wind turbine and the operation history data at the time of stopping plasma generation indicating a relationship between an output and a wind speed of the first wind turbine, the wind turbine control device further includes an adjustment unit configured to adjust a control parameter related to a control characteristic for the output when it is determined that the result of the operation history comparison process satisfies the prescribed first condition, and the control unit selects the execution of the process of changing only the control of the first wind turbine and controls the first wind turbine using the control parameter adjusted by the adjustment unit.

Also, in the above-described wind turbine control device, the acquisition unit acquires the operation history data at the time of plasma generation indicating a relationship between a rotational speed and torque of the first wind turbine and the operation history data at the time of stopping plasma generation indicating a relationship between a rotational speed and torque of the first wind turbine, the wind turbine control device further includes an adjustment unit configured to adjust a control parameter related to a control characteristic for the torque when it is determined that the result of the operation history comparison process satisfies the prescribed first condition, and the control unit selects the execution of the process of changing only the control of the first wind turbine and controls the first wind turbine using the control parameter adjusted by the adjustment unit.

Also, in the above-described wind turbine control device, the acquisition unit acquires the operation history data at the time of plasma generation indicating a relationship between a rotational speed and a pitch angle of the first wind turbine and the operation history data at the time of stopping plasma generation indicating a relationship between a rotational speed and a pitch angle of the first wind turbine, the wind turbine control device further includes an adjustment unit configured to adjust a control parameter related to a control characteristic for the pitch angle when it is determined that the result of the operation history comparison process satisfies the prescribed first condition, and the control unit selects the execution of the process of changing only the control of the first wind turbine and controls the first wind turbine using the control parameter adjusted by the adjustment unit.

Also, in the above-described wind turbine control device, the acquisition unit acquires the operation history data at the time of plasma generation indicating a relationship between a tip speed ratio and a power coefficient of the first wind turbine and the operation history data at the time of stopping plasma generation indicating a relationship between a tip speed ratio and a power coefficient of the first wind turbine, the wind turbine control device further includes an adjustment unit configured to adjust a control parameter related to a control characteristic for the tip speed ratio when it is determined that the result of the operation history comparison process satisfies the prescribed first condition, and the control unit selects the execution of the process of changing only the control of the first wind turbine and controls the first wind turbine using the control parameter adjusted by the adjustment unit.

Also, in the above-described wind turbine control device, the acquisition unit acquires the operation history data at the time of plasma generation indicating a relationship between a tip speed ratio and a wind speed of the first wind turbine and the operation history data at the time of stopping plasma generation indicating a relationship between a tip speed ratio and a wind speed of the first wind turbine, the wind turbine control device further includes an adjustment unit configured to adjust a control parameter related to a control characteristic for the tip speed ratio when it is determined that the result of the operation history comparison process satisfies the prescribed first condition, and the control unit selects the execution of the process of changing only the control of the first wind turbine and controls the first wind turbine using the control parameter adjusted by the adjustment unit.

Also, in the above-described wind turbine control device, the acquisition unit further acquires the second wind turbine operation history data indicating a relationship between a wind speed of the second wind turbine and a frequency of the wind speed of the second wind turbine, the determination unit further determines whether or not the operation history of the second wind turbine indicated in the second wind turbine operation history data satisfies a prescribed second condition, and the control unit selects the execution of the process of changing only the control of the second wind turbine.

Also, in the above-described wind turbine control device, the acquisition unit further acquires the second wind turbine operation history data indicating a relationship between an output and a wind speed of the second wind turbine, the determination unit further determines whether or not the operation history of the second wind turbine indicated in the second wind turbine operation history data satisfies a prescribed second condition, and the control unit selects the execution of the process of changing only the control of the second wind turbine.

Also, in the above-described wind turbine control device, the acquisition unit further acquires the second wind turbine operation history data indicating a relationship between a rotational speed, torque, or a wind speed of the second wind turbine and vibrations or distortion of the second wind turbine, the determination unit further determines whether or not the operation history of the second wind turbine indicated in the second wind turbine operation history data satisfies a prescribed second condition, and the control unit selects the execution of the process of changing only the control of the second wind turbine.

Also, in the above-described wind turbine control device, the acquisition unit acquires the operation history data at the time of plasma generation indicating a relationship between a wind speed of the first wind turbine and a frequency of the wind speed of the first wind turbine and the operation history data at the time of stopping plasma generation indicating a relationship between a wind speed of the first wind turbine and a frequency of the wind speed of the first wind turbine and further acquires the second wind turbine operation history data indicating a relationship between a wind speed of the second wind turbine and a frequency of the wind speed of the second wind turbine, the determination unit further determines whether or not the operation history of the second wind turbine indicated in the second wind turbine operation history data satisfies a prescribed second condition, and the control unit selects the execution of the process of changing the control of the first wind turbine and the control of the second wind turbine.

Also, the above-described wind turbine control device further includes a notification unit configured to provide a notification for notifying that it is recommended to keep the plasma electrodes installed on the blade when it is determined that the result of the operation history comparison process satisfies the prescribed first condition.

Also, the above-described wind turbine control device further includes a notification unit configured to provide a notification for notifying that it is recommended to continue a state in which the plasma is generated by the plasma electrodes when it is determined that the result of the operation history comparison process satisfies the prescribed first condition.

Also, the above-described wind turbine control device further includes a notification unit configured to provide a notification for notifying that the plasma electrodes may be removed from the blade when it is determined that the result of the operation history comparison process does not satisfy the prescribed first condition.

Also, the above-described wind turbine control device further includes a notification unit configured to provide a notification for notifying that it is recommended to continue a state in which no plasma is generated by the plasma electrodes when it is determined that the result of the operation history comparison process does not satisfy the prescribed first condition.

Also, in the above-described wind turbine control device, the acquisition unit further acquires direction data indicating a direction in which a rotating surface of the first wind turbine is facing, wake data indicating information about a wake of the first wind turbine, and wind turbine data indicating information about the second wind turbine different from the first wind turbine, the determination unit further determines whether or not the second wind turbine is affected by the wake of the first wind turbine using the direction data, the wake data, and the wind turbine data, and, when it is determined that the second wind turbine is affected by the wake of the first wind turbine, the control unit controls the first wind turbine so that a tip speed ratio of the first wind turbine is included in a range in which a difference between a power coefficient of the first wind turbine in a state in which the plasma electrodes attached to the blade of the first wind turbine are generating the plasma and a power coefficient of the first wind turbine in a state in which the plasma electrodes are not generating the plasma exceeds a prescribed threshold value and controls the plasma electrodes so that the plasma is generated.

Also, in the above-described wind turbine control device, the acquisition unit acquires wake passage region data indicating a wake passage region through which the wake of the first wind turbine passes as the wake data and acquires wind turbine position data indicating a position of the second wind turbine as the wind turbine data, and, when the position of the second wind turbine indicated in the wind turbine position data is included in the wake passage region indicated in the wake passage region data, the determination unit determines that the second wind turbine is affected by the first wind turbine.

Also, in the above-described wind turbine control device, the control unit controls the first wind turbine so that the tip speed ratio of the first wind turbine is included in the range in which the difference exceeds the prescribed threshold value by controlling the first wind turbine so that an angle of attack is included in a range of more than a stall angle in a blade element at a prescribed radial position of the blade.

Also, in the above-described wind turbine control device, when an airfoil of the blade is of a trailing-edge flow separation type and the plasma electrodes generate no plasma, the control unit controls the first wind turbine so that an angle of attack is included in a range of a stall angle or less in a blade element at a prescribed radial position of the blade.

Also, in the above-described wind turbine control device, when an airfoil of the blade is of a leading-edge flow separation type and the plasma electrodes generate no plasma, the control unit controls the first wind turbine so that an angle of attack is included in a range of a stall angle or less in a blade element at a prescribed radial position of the blade.

Also, in the above-described wind turbine control device, the acquisition unit further acquires direction data indicating a direction in which a rotating surface of the first wind turbine is facing, wake passage region data indicating a wake passage region through which the wake of the first wind turbine passes, and wind turbine position data indicating a position of the second wind turbine different from the first wind turbine, the determination unit further determines whether or not the position of the second wind turbine indicated in the wind turbine position data is included in the wake passage region indicated in the wake passage region data using the direction data, the wake passage region data, and the wind turbine position data, and, when it is determined that the position of the second wind turbine indicated in the wind turbine position data is included in the wake passage region indicated in the wake passage region data, the control unit controls the direction in which the rotating surface of the first wind turbine is facing so that the position of the second wind turbine indicated in the wind turbine position data is not included in the wake passage region indicated in the wake passage region data and controls the plasma electrodes so that the plasma is generated.

According to an aspect of the present invention, there is provided a wind turbine control program for causing a computer to implement: a data acquisition function of acquiring operation history data at the time of plasma generation indicating an operation history of a first wind turbine when a plasma has been generated by plasma electrodes installed on a blade and operation history data at the time of stopping plasma generation indicating an operation history of the first wind turbine when no plasma has been generated by the plasma electrodes; a determination function of executing an operation history comparison process of comparing the operation history data at the time of plasma generation with the operation history data at the time of stopping plasma generation and executing an operation history determination process of determining whether or not a result of the operation history comparison process satisfies a prescribed first condition; and a control function of controlling at least one of the plasma electrodes and at least one of the first wind turbine and a second wind turbine different from the first wind turbine on the basis of a result of the operation history determination process.

According to an aspect of the present invention, there is provided a wind turbine control method including: acquiring operation history data at the time of plasma generation indicating an operation history of a first wind turbine when a plasma has been generated by plasma electrodes installed on a blade and operation history data at the time of stopping plasma generation indicating an operation history of the first wind turbine when no plasma has been generated by the plasma electrodes; executing an operation history comparison process of comparing the operation history data at the time of plasma generation with the operation history data at the time of stopping plasma generation and executing an operation history determination process of determining whether or not a result of the operation history comparison process satisfies a prescribed first condition; and controlling at least one of the plasma electrodes and at least one of the first wind turbine and a second wind turbine different from the first wind turbine on the basis of a result of the operation history determination process.

Advantageous Effects of Invention

According to the present invention, it is possible to provide a wind turbine control device, a wind turbine control program, and a wind turbine control method capable of controlling a wind turbine to which plasma electrodes are attached and another wind turbine installed near the wind turbine in accordance with a relationship between an operation history when a plasma is being generated and an operation history when no plasma is being generated.

BRIEF DESCRIPTION OF DRAWINGS

FIG. 12 is a diagram showing an example of a histogram of a wind speed when a plasma is being generated by applying a voltage between plasma electrodes and a histogram of a wind speed when no plasma is being generated by applying no voltage between the plasma electrodes according to the embodiment of the present invention.

FIG. 13 is a diagram showing an example of a histogram of a wind direction when a plasma is being generated by applying a voltage between plasma electrodes and a histogram of a wind direction when no plasma is being generated by applying no voltage between the plasma electrodes according to the embodiment of the present invention.

DESCRIPTION OF EMBODIMENTS

Embodiments

Figure 1:
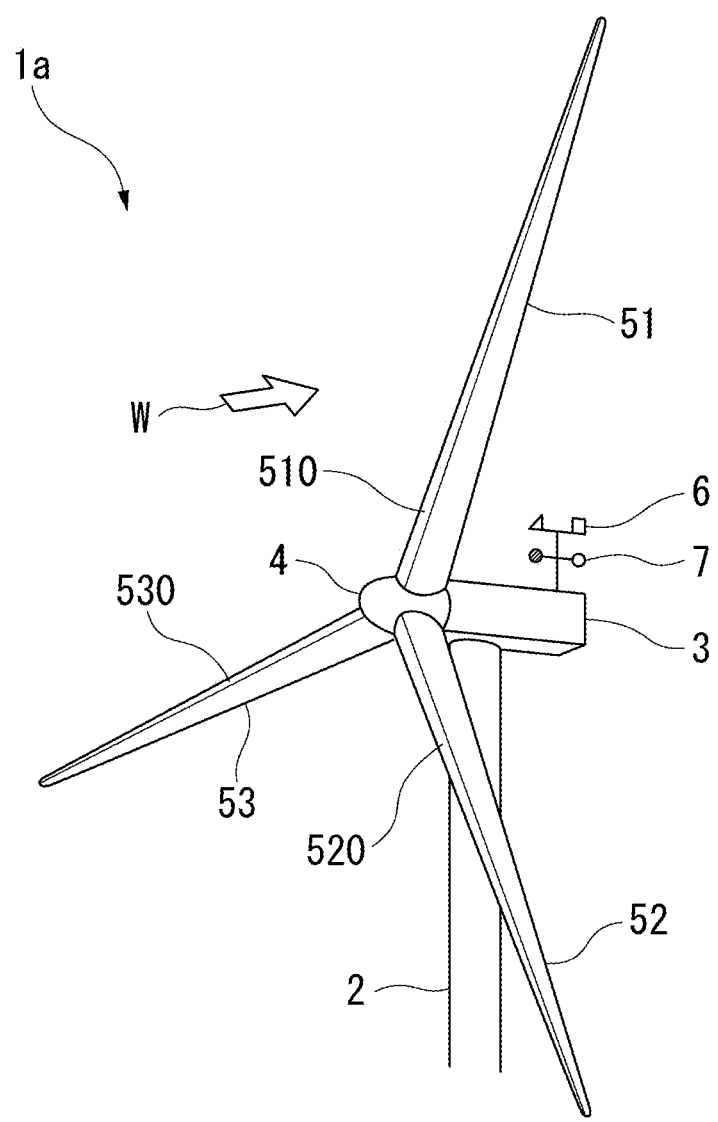
FIG. 1 is a diagram showing an example of a first wind turbine according to an embodiment of the present invention.

An example of a wind turbine control device according to an embodiment will be described with reference to the drawings. FIG. 1 is a diagram showing an example of a first wind turbine according to an embodiment of the present invention. As shown in FIG. 1, a first wind turbine 1a includes, for example, a propeller type wind turbine for use in wind power generation, and includes a tower 2, a nacelle 3, a hub 4, a blade 51, a blade 52, a blade 53, a wind direction meter 6, and an anemometer 7.

The tower 2 is a pillar that supports the nacelle 3 and a cable and the like are laid in at least one of a space inside the tower 2 and a space outside the tower 2. The nacelle 3 is a housing for housing a gearbox that increases a rotational speed of the rotation of the hub 4 transferred by a rotating shaft, a power generator that converts a rotational force of the hub 4 transferred by the gearbox into electric power, and the like. Also, torque Tg of the power generator and an angular velocity $\Omega$ of a rotor are appropriately measured by a sensor or the like. Also, instead of the angular velocity $\Omega$ of the rotor, the rotational speed of the rotor may be measured by a sensor or the like. Alternatively, in addition to the angular velocity $\Omega$ of the rotor, the rotational speed of the rotor may be measured by a sensor or the like. The hub 4 is connected to the gearbox through the rotating shaft. Also, the blade 51, the blade 52, and the blade 53 are attached to the hub 4 and the hub 4 is supported by the nacelle 3 and constitutes the rotor.

The blade 51, the blade 52, and the blade 53 all receive a wind W indicated by an arrow shown in FIG. 1 to generate a lift force and rotate the rotor. An angle between the blade 51 and the blade 52, an angle between the blade 52 and the blade 53, and an angle between the blade 53 and the blade 51 are all 120 degrees. Also, the blade 51, the blade 52, and the blade 53 generally have a trailing-edge flow separation type airfoil, but may have a leading-edge flow separation type airfoil. The trailing-edge flow separation type airfoil is generally thicker than the leading-edge flow separation type airfoil and the curvature of a leading edge is smaller.

Also, the blade 51, the blade 52, and the blade 53 are all attached to the leading edge in a detachable way with plasma electrodes 510, plasma electrodes 520, and plasma electrodes 530, regardless of an airfoil. The plasma electrodes 510 are a set of electrodes facing each other in a state in which a dielectric is sandwiched between the electrodes and a plasma is generated between the electrodes by applying a voltage between the two facing electrodes. The plasma electrodes 510 generate disturbance at the leading edge of the blade 51 by generating the plasma at the leading edge of the blade 51. Thereby, the plasma electrodes 510 improve the lift force of the blade when flow separation has occurred near the leading edge of the blade 51. The same is true for the plasma electrodes 520 and the plasma electrodes 530. Also, at least one of the plasma electrodes 510, the plasma electrodes 520, and the plasma electrodes 530 may be attached to a place other than the leading edge.

The wind direction meter 6 measures a direction in which the wind W is blowing. The anemometer 7 measures a wind speed of the wind W. However, the wind speed of the wind W may be measured by a meteorological mast or a LIDAR sensor instead of the anemometer 7.

Figure 2:
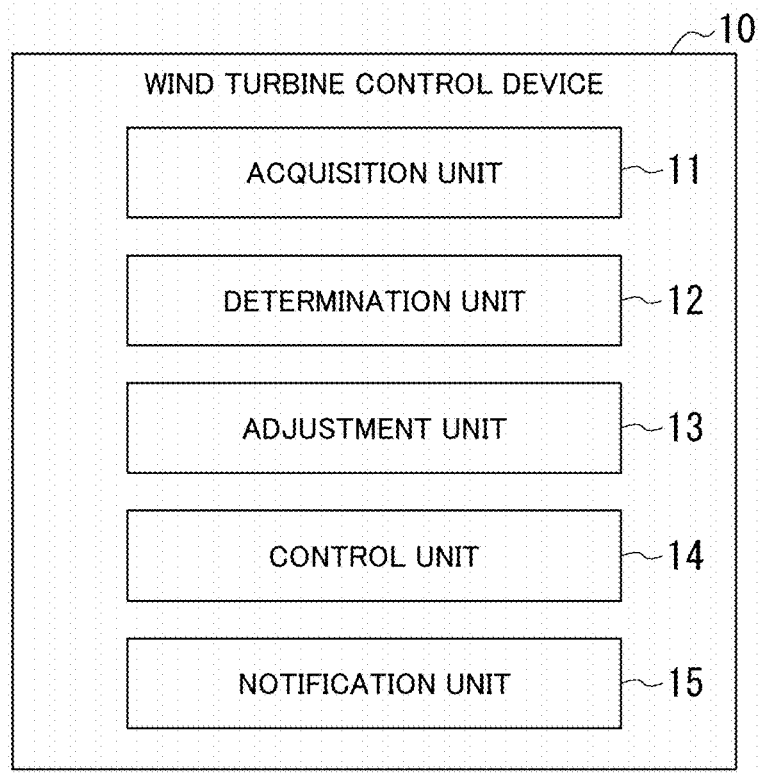
FIG. 2 is a diagram showing an example of a wind turbine control device according to the embodiment of the present invention.

FIG. 2 is a diagram showing an example of the wind turbine control device according to the embodiment of the present invention. As shown in FIG. 2, a wind turbine control device 10 includes an acquisition unit 11, a determination unit 12, an adjustment unit 13, a control unit 14, and a notification unit 15. A place where the wind turbine control device 10 is installed is not particularly limited. The wind turbine control device 10 is installed, for example, inside the tower 2, inside the nacelle 3, and inside a building constructed at a place different from that of the first wind turbine 1a.

The acquisition unit 11 acquires torque data indicating torque Tg of the power generator housed in the nacelle 3, rotational speed data indicating a rotational speed $\omega$ of the power generator, wind direction data indicating a wind direction measured by the wind direction meter 6, and wind speed data indicating a wind speed measured by the anemometer 7. On the basis of a result of an operation history determination process, the control unit 14 controls at least one of at least one of the first wind turbine 1a and a second wind turbine 1b different from the first wind turbine 1a, and at least one of the plasma electrodes 510, the plasma electrodes 520, and the plasma electrodes 530. The control unit 14 controls pitch angles $\beta$ of the blade 51, the blade 52, and the blade 53 in, for example, PI control (a proportional-integral controller). The control unit 14 controls the torque Tg of the power generator in, for example, PI control. Details of the control executed by the control unit 14 will be described below.

Figure 3:
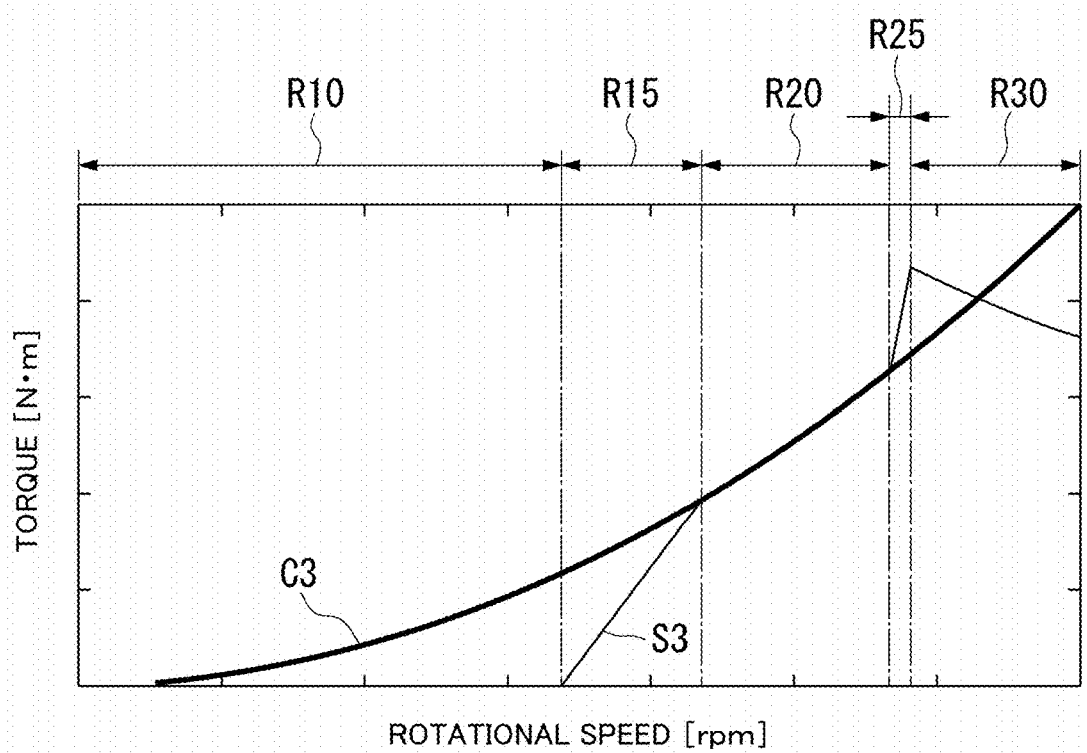
FIG. 3 is a diagram showing an example of a relationship between a rotational speed and torque when a power generator of the first wind turbine operates.

FIG. 3 is a diagram showing an example of a relationship between a rotational speed and torque when the first wind turbine operates and is a diagram quoted from a drawing published in "Jonkman J, et. al., Definition of a 5-MW Reference Wind Turbine for Offshore System Development, NREL/TP-500-38060." A dotted line C3 shown in FIG. 3 indicates a rotational speed $\omega$ and torque Tg for implementing a tip speed ratio $\lambda_{OPT}$ that maximizes a power coefficient Cp of the rotor including the blade 51, the blade 52, and the blade 53 on the basis of a result of measuring the rotational speed $\omega$. The power coefficient Cp is expressed by the following Eq. (1) including an output P of the wind turbine, a density $\rho$ of air, a wind speed U, and an area A of a rotating surface of each of the blade 51, the blade 52, and the blade 53.

[Math. 1]

$$Cp = \frac{P}{(1/2)\rho AU^3} \quad (1)$$

The control for operating the first wind turbine 1a so that the power generator operates at the rotational speed ω and the torque Tg on the dotted line C3 is called constant tip speed ratio control. By executing the constant tip speed ratio control, the wind turbine control device 10 increases the torque Tg using the control unit 14 so that the rotational speed ω does not excessively increase when the wind speed of the wind W has increased. The dotted line C3 is represented by the following Eq. (2).

[Math. 2]

$$T = f(\lambda_{opt}) \cdot \omega^2 \quad (2)$$

However, in reality, the wind turbine control device 10 executes mutually different control processes in a rotational speed region R10, a rotational speed region R15, a rotational speed region R20, a rotational speed region R25, and a rotational speed region R30 shown in FIG. 3. That is, the wind turbine control device 10 controls the first wind turbine 1a so that the power generator operates at a rotational speed and torque Tg on a solid line S3 shown in FIG. 3.

In the rotational speed region R10, the wind turbine control device 10 opens the pitch angles β of the blades 51, 52, and 53 using the control unit 14 to allow the wind W to release and prevent the power generator from operating. Here, opening the pitch angle β indicates that the wind is allowed to release by setting the pitch angle β at a feathering position.

In the rotational speed region R15, the wind turbine control device 10 closes the pitch angles β of the blades 51, 52, and 53 using the control unit 14, receives the wind W, and causes the power generator to operate. Here, closing the pitch angle β indicates that the wind is received by setting the pitch angle β at a fine position.

In the rotational speed region R20, the wind turbine control device 10 executes constant tip speed ratio control using the control unit 14. Also, in the rotational speed region R20, the wind turbine control device 10 keeps the pitch angle β at 0 degrees using the control unit 14. Alternatively, in the rotational speed region R20, the wind turbine control device 10 sets the pitch angle β at the fine position using the control unit 14.

In the rotational speed region R25, the wind turbine control device 10 controls the torque Tg using the control unit 14 so that the rotational speed ω does not greatly exceed the maximum rotational speed $\omega_{max}$ determined from a limit value of blade tip noise and the like. That is, when the rotational speed ω indicated in the rotational speed data acquired by the acquisition unit 11 has increased, the wind turbine control device 10 maintains the rotational speed ω on the solid line S3 shown in FIG. 3 by increasing the torque Tg using the control unit 14. Also, when the rotational speed ω indicated in the rotational speed data acquired by the acquisition unit 11 has decreased, the wind turbine control device 10 maintains the rotational speed ω on the solid line S3 by decreasing the torque Tg using the control unit 14. Such control is called rotational speed limitation control. When the torque Tg has reached rated torque of the power generator or the output of the power generator has reached a rated output, the wind turbine control device 10 executes control to be described below.

In the rotational speed region R30, the wind turbine control device 10 controls the rotational speed ω so that the output of the power generator, i.e., a product of the rotational speed ω and the torque Tg, is constant using the control unit 14 or controls the torque Tg so that the torque Tg continues to match the rated torque of the power generator using the control unit 14. Also, the pitch angle may be controlled even in the rotational speed region R25 where the rotational speed limitation control is performed according to the wind condition.

Figure 4:
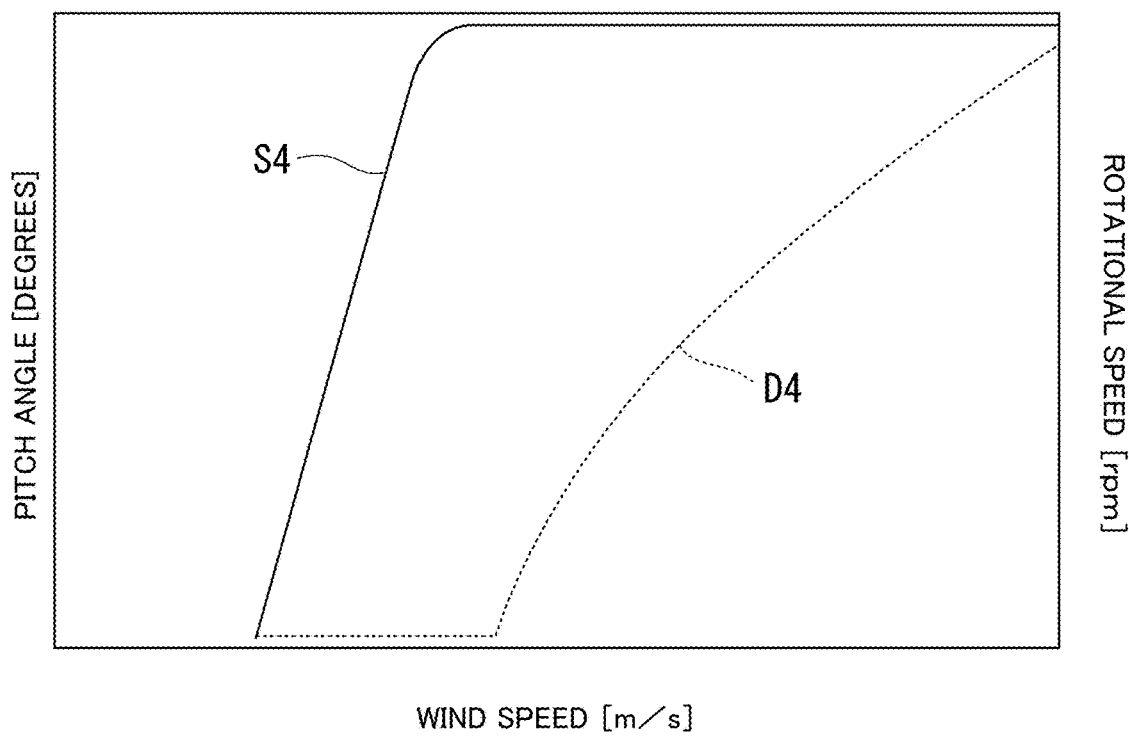
FIG. 4 is a diagram showing an example of a relationship between a wind speed and a rotational speed and a relationship between a wind speed and a pitch angle when the power generator of the first wind turbine operates.

FIG. 4 is a diagram showing an example of a relationship between a wind speed and a rotational speed and a relationship between a wind speed and a pitch angle when the power generator of the first wind turbine operates and is a diagram quoted from a drawing published in "Hansen M H, et. al., Control design for a pitch-regulated, variable speed wind turbine, Riso-r-1500."

A dotted line D4 shown in FIG. 4 indicates the wind speed dependence of the pitch angles β of the blade 51, the blade 52, and the blade 53 when the first wind turbine 1a has been controlled so that the power generator operates at the rotational speed ω and the torque Tg on the solid line S3 shown in FIG. 3. When the region is shifted from the rotational speed region R25 to the rotational speed region R30 shown in FIG. 3, the wind turbine control device 10 opens the pitch angle β and allows the releasing of the wind W to start using the control unit 14.

A solid line S4 shown in FIG. 4 indicates the wind speed dependence of the rotational speed ω when the first wind turbine 1a has been controlled so that the power generator operates at the rotational speed ω and the torque Tg on the solid line S3 shown in FIG. 3. When the region is shifted from the rotational speed region R20 to the rotational speed region R25 shown in FIG. 3, the wind turbine control device 10 controls the torque Tg and starts trying to keep the rotational speed ω constantly using the control unit 14.

Figure 5:
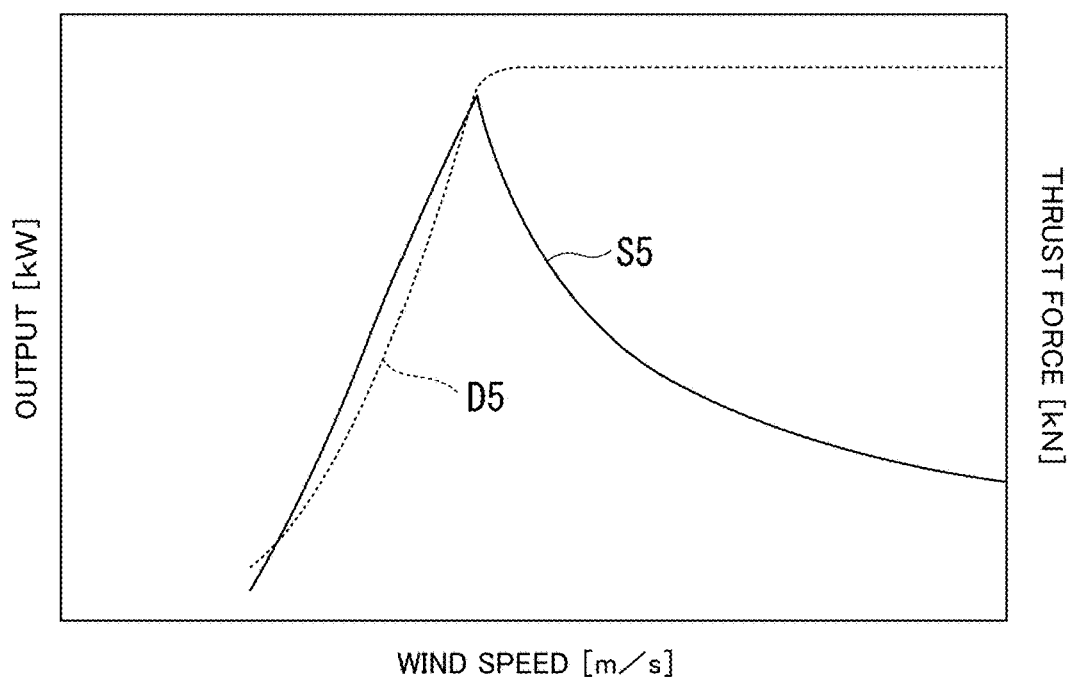
FIG. 5 is a diagram showing an example of a relationship between a wind speed and an output and a relationship between a wind speed and a thrust force when the first wind turbine operates.

FIG. 5 is a diagram showing an example of a relationship between a wind speed and an output and a relationship between a wind speed and a thrust force when the power generator of the first wind turbine operates and is a diagram quoted from a drawing published in "Hansen M H, et. al., Control design for a pitch-regulated, variable speed wind turbine, Riso-r-1500."

A dotted line D5 shown in FIG. 5 indicates the wind speed dependence of the output of the power generator, i.e., a product of the rotational speed ω and the torque Tg, when the first wind turbine 1a has been controlled so that the power generator operates at the rotational speed ω and the torque Tg on the solid line S3 shown in FIG. 3. The wind turbine control device 10 starts trying to keep the output of the power generator constantly using the control unit 14 when the region is shifted from the rotational speed region R25 to the rotational speed region R30 shown in FIG. 3.

A solid line S5 shown in FIG. 5 indicates the wind speed dependence of a magnitude of a thrust force received by the first wind turbine 1a when the first wind turbine 1a is controlled so that the power generator operates at the rotational speed ω and the torque Tg on the solid line S3 shown in FIG. 3. This thrust force is a force in a direction perpendicular to a rotating surface of the blade 51, the blade 52, and the blade 53. As shown in FIG. 5, the thrust force becomes maximum in the rotational speed region R25 shown in FIG. 3.

Next, relationships between the angle of attack, the stall angle, and the flow separation will be described with reference to FIGS. 6 and 7.

Figure 6:
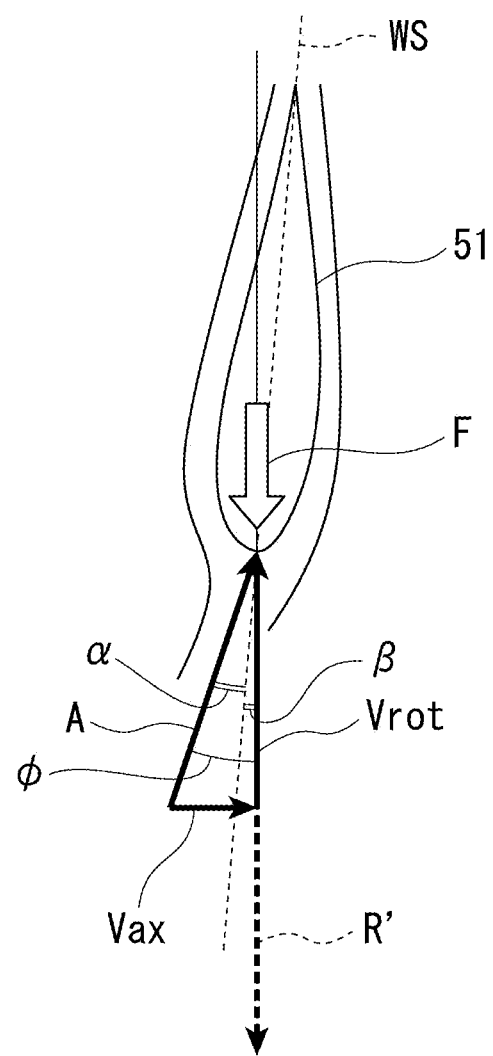
FIG. 6 is a diagram showing relationships between an actual wind speed vector, a relative rotational speed vector, and an incoming wind speed vector in a cross-section of a blade element at a prescribed radial position of a blade when no flow separation has occurred.

FIG. 6 is a diagram showing relationships between an actual wind speed vector, a relative rotational speed vector, and an incoming wind speed vector in a cross-section of a blade element at a prescribed radial position of a blade when no flow separation has occurred. The prescribed radial position is any position among positions from the root to the tip of the blade. Although the blade 51 will be described as an example in the following description, the following description is true for the blade 52 and the blade 53.

As shown in FIG. 6, when the rotor of the first wind turbine 1a is rotating in response to the wind W, the blade element of the blade 51 receives a wind represented by an actual wind speed vector Vax caused by the wind W. The actual wind speed vector Vax is represented by the following Eq. (3) including a wind speed U of a rotation axis direction component of the first wind turbine 1a of the wind W and an induction coefficient a in a rotation axis direction of the first wind turbine 1a. The induction coefficient a is a coefficient in consideration of the fact that the wind speed U of the rotation axis direction component of the first wind turbine 1a of the wind W decreases under an influence of the first wind turbine 1a and depends on matters related to the design of the first wind turbine 1a and a physical quantity related to the operation of the first wind turbine 1a. The matters related to the design of the first wind turbine 1a are, for example, the number of blades and shapes of the blades. The physical quantities related to the operation of the first wind turbine 1a are, for example, the pitch angle of the blade, the rotational speed of the rotor, the torque of the rotor, and the torque of the power generator. Also, the wind speed U is measured in a method of performing conversion from the mast wind speed, a method using the LIDAR sensor, or the like.

[Math. 3]

$$Vax = (1-a)U \quad (3)$$

Also, as shown in FIG. 6, the blade element of the blade 51 is rotated according to a rotational speed vector R' due to the rotation of the rotor of the first wind turbine 1a. Thus, the blade element receives a wind represented by a relative rotational speed vector Vrot. The relative rotational speed vector Vrot is expressed by the following Eq. (4) including an angular velocity $\Omega$ of the rotor of the first wind turbine 1a, a radial position r of the blade element, and an induction coefficient a' of the rotating surface of the first wind turbine 1a in a tangential direction. The induction coefficient a' is a coefficient considering that a flow passing through the rotor of the first wind turbine 1a is affected by the first wind turbine 1a and rotates in a direction opposite to that of the rotor and depends upon matters related to the design of the first wind turbine 1a and a physical quantity related to the operation of the first wind turbine 1a.

[Math. 4]

$$Vrot = (1+a')\Omega r \quad (4)$$

Therefore, it can be said that the blade element shown in FIG. 6 receives a wind represented by an incoming wind speed vector A, which is a combination of the relative rotational speed vector Vrot and the actual wind speed vector Vax. The incoming wind speed vector A represents a speed of the wind flowing into the vicinity of the leading edge of the blade element shown in FIG. 6 according to the rotational speed and the wind velocity component U. This U is projected to the rotation axis of the first wind turbine 1a. Also, an angle $\phi$ formed by the relative rotational speed vector Vrot and the incoming wind speed vector A for the blade element has a relationship expressed by the following Eq. (5) with the relative rotational speed vector Vrot and the actual wind speed vector Vax.

[Math. 5]

$$\tan\phi = \frac{Vax}{Vrot} \quad (5)$$

The angle $\beta$ between a chord line WS of the blade element and the relative rotational speed vector Vrot shown in FIG. 6 depends on a mounting angle of the blade 51 mounted on the hub 4, a twisting angle of the blade 51, and a pitch angle of the blade 51.

An angle between the chord line WS of the blade element and the incoming wind speed vector A for the blade element shown in FIG. 6 is called an angle of attack $\alpha$. Both a lift force and a drag force applied to the blade element depend on the angle of attack $\alpha$. Also, torque Trot of the rotor of the first wind turbine 1a is calculated by performing an integration process on a product of a resultant force F of rotation direction components of the lift force and the drag force applied to the blade element associated with the rotor and the radial position r of the blade element with respect to all blade elements included in all blades, i.e., the blade 51, the blade 52, and the blade 53. If the angle of attack $\alpha$ does not exceed the stall angle $\alpha_S$, the blade element can generate a sufficiently large lift force without stalling.

Also, the angle $\phi$ formed by the relative rotational speed vector Vrot and the incoming wind speed vector A for the blade element, the above-described angle $\beta$, and the angle of attack $\alpha$ have a relationship represented by the following Eq. (6).

[Math. 6]

$$\alpha = \phi - \beta \quad (6)$$

Eq. (6) indicates that the angle of attack $\alpha$ can be adjusted by adjusting the above-described angle $\beta$ in accordance with the angle $\phi$ formed by the relative rotational speed vector Vrot and the incoming wind speed vector A for the blade element.

Also, it can be seen that the following Eq. (7) is established in consideration of geometrical relationships between the relative rotational speed vector Vrot, the actual wind speed vector Vax, and the incoming wind speed vector A.

[Math. 7]

$$\tan(\alpha + \beta) = \frac{Vax}{Vrot} \frac{(1-a)U}{(1+a')\Omega r} \quad (7)$$
$$= \frac{1-a}{(1+a')\lambda_r}$$

Eq. (7) includes a local tip speed ratio $\lambda_r$ represented by the following Eq. (8). The local tip speed ratio $\lambda_r$ is a ratio between a circumferential speed $r\Omega$ at the radial position r of the blade element and the wind speed U described above.

[Math. 8]

$$\lambda_r = r\Omega/U \quad (8)$$

On the other hand, a tip speed ratio $\lambda$ of the first wind turbine 1a is expressed by the following Eq. (9) including a radial position R of the blade element at the tip of the blade. Eq. (9) includes a circumferential speed $R\Omega$ at the tip of the blade.

[Math. 9]

$$\lambda = R\Omega/U \quad (9)$$

Figure 7:
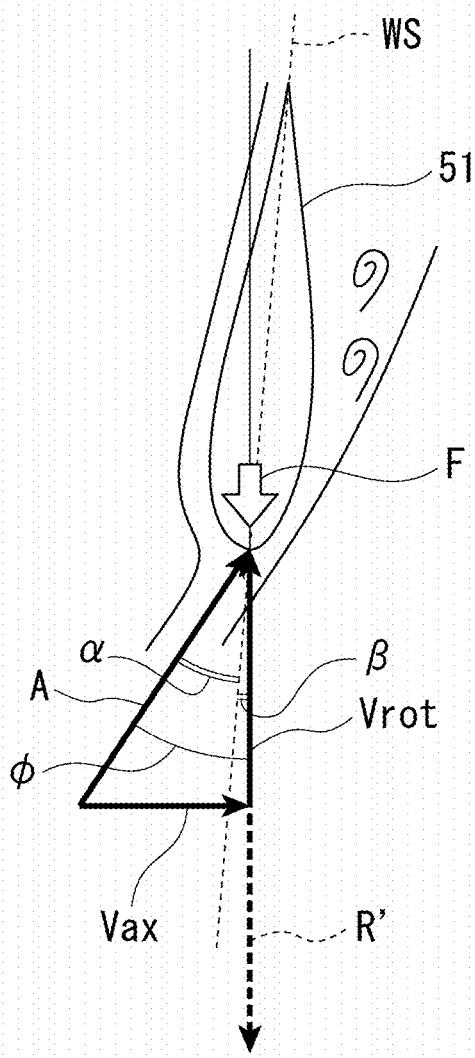
FIG. 7 is a diagram showing relationships between an actual wind speed vector, a relative rotational speed vector, and an incoming wind speed vector in the cross-section of the blade element at the prescribed radial position of the blade when flow separation has occurred.

FIG. 7 is a diagram showing relationships between an actual wind speed vector, a relative rotational speed vector, and an incoming wind speed vector in the cross-section of the blade element at the prescribed radial position of the blade when flow separation has occurred. As shown in FIG. 7, even if the blade 51 is rotating as represented by the rotational speed vector R' similar to that in FIG. 6, when the wind W suddenly becomes stronger, i.e., when the actual wind speed vector Vax suddenly becomes longer, the angle of attack a suddenly increases and may exceed the stall angle $\alpha_S$. In this case, the flow separation occurs, so that the lift force generated by the blade 51 decreases and the blade 51 stalls. Therefore, the rotational speed of the power generator connected to the hub 4 decreases.

Next, changes over time in the wind speed U, the rotational speed ω, the tip speed ratio λ, the angle of attack α, the torque Tg, and the pitch angle β when no flow separation occurs and when flow separation occurs will be described with reference to FIGS. 8 and 9.

Figure 8:
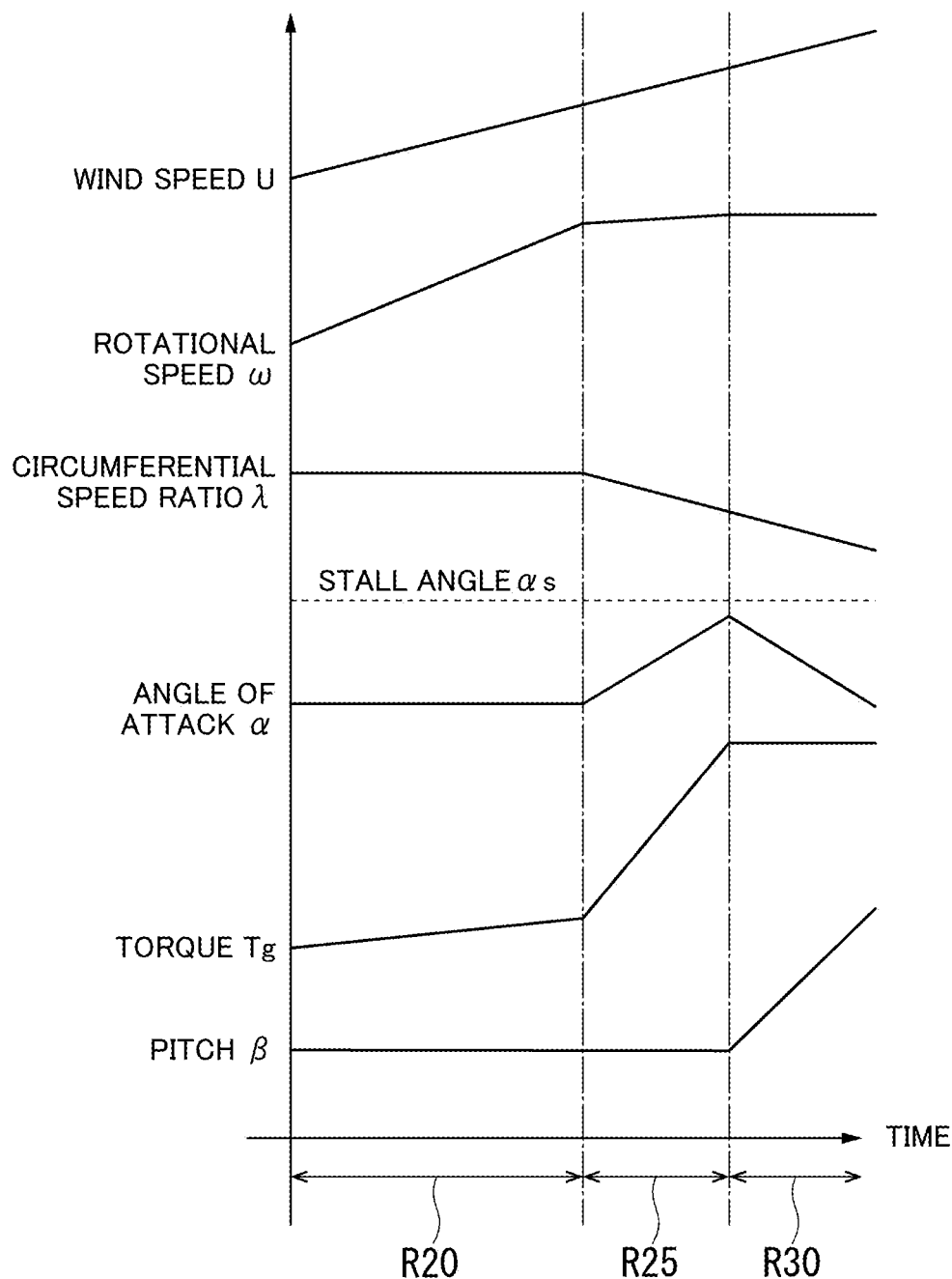
FIG. 8 shows an example of changes over time in a wind speed, a rotational speed, a tip speed ratio, an angle of attack, torque, and a pitch angle when the wind speed increases with time and the angle of attack does not exceed a stall angle at a place where the first wind turbine is installed.

FIG. 8 shows an example of changes over time in a wind speed, a rotational speed, a tip speed ratio, an angle of attack, torque, and a pitch angle when the wind speed increases with time and the angle of attack does not exceed a stall angle at a place where the first wind turbine is installed. When the angle of attack α does not exceed the stall angle $\alpha_S$, the first wind turbine 1a operates as follows.

In the rotational speed region R25, the rotational speed ω is controlled in the vicinity of the maximum rotational speed $\omega_{max}$ of the power generator by controlling the torque Tg using the control unit 14 in relation to the rotational speed ω. The tip speed ratio λ decreases because the wind speed U increases even though the rotational speed ω is approximately constant. The angle of attack α increases because the tip speed ratio λ decreases. The torque Tg increases in accordance with the solid line S3 shown in FIG. 3 as the rotational speed ω increases. Also, the pitch angle β is kept constant.

In the rotational speed region R30, the pitch angle β increases so that the wind W is allowed to release. The rotational speed ω does not increase because the pitch angle β increases and the wind W is allowed to release. The torque Tg is maintained at a value determined by the solid line S3 shown in FIG. 3 in accordance with the rotational speed. The angle of attack α decreases before the angle of attack α exceeds the stall angle $\alpha_S$ because the pitch angle β is increasing.

Figure 9:
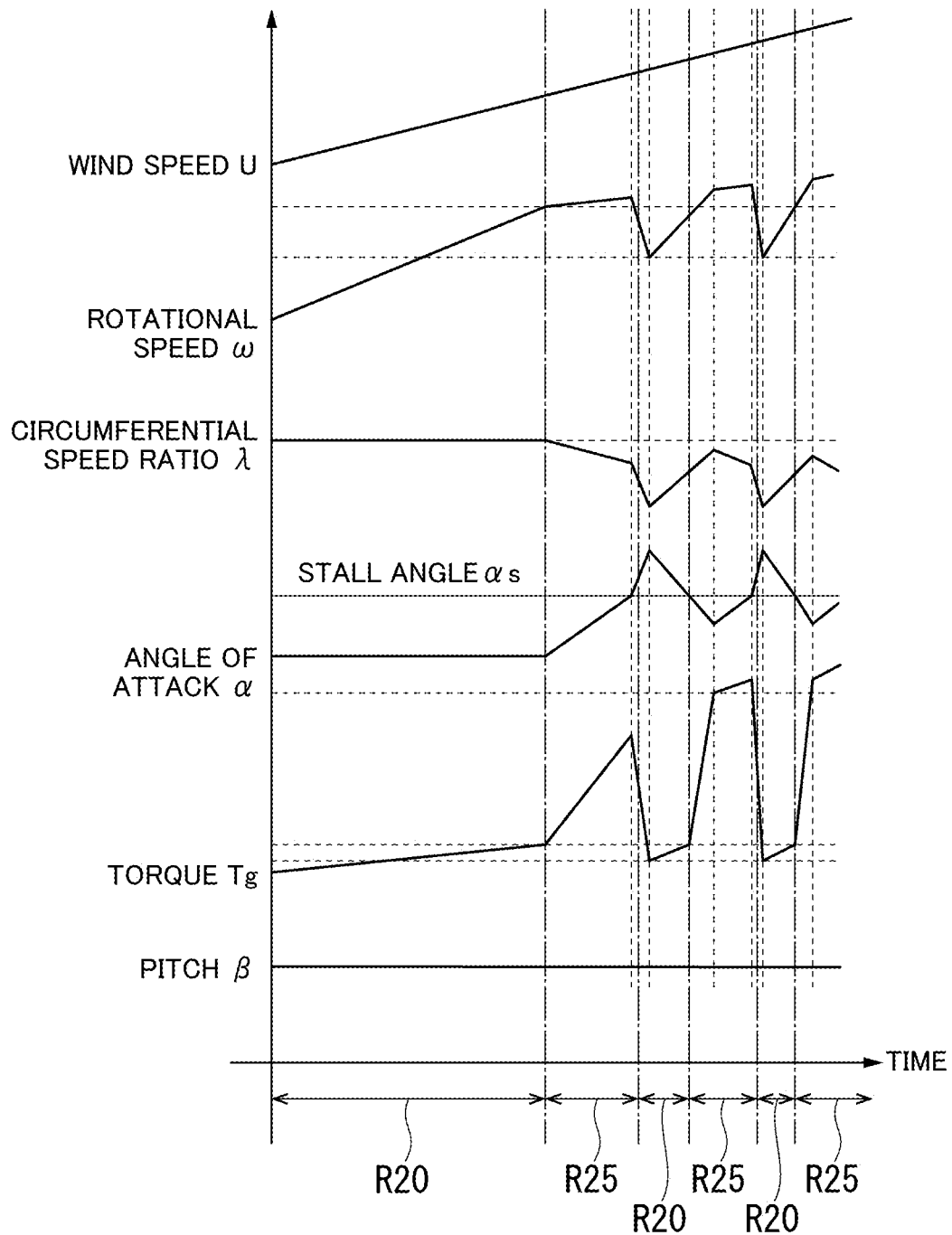
FIG. 9 shows an example of changes over time in a wind speed, a rotational speed, a tip speed ratio, an angle of attack, torque, and a pitch angle when the wind speed is increasing at the place where the first wind turbine is installed and the angle of attack exceeds the stall angle.

FIG. 9 shows an example of changes over time in a wind speed, a rotational speed, a tip speed ratio, an angle of attack, torque, and a pitch angle when the wind speed is increasing with time at the place where the first wind turbine is installed and the angle of attack exceeds the stall angle. When the angle of attack α exceeds the stall angle $\alpha_S$, the first wind turbine 1a operates as follows.

When the angle of attack α continues to increase in the rotational speed region R25 and exceeds the stall angle $\alpha_S$, the rotational speed ω rapidly decreases due to the decrease in a lift force generated by each of the blade 51, the blade 52, and the blade 53. The tip speed ratio λ decreases rapidly as the wind speed U increases and the rotational speed ω rapidly decreases. The angle of attack α increases rapidly as the tip speed ratio λ decreases rapidly. As shown in FIG. 9, when the angle of attack α exceeds the stall angle $\alpha_S$, the rotational speed ω is lowered to a level of the rotational speed region R20 and the torque Tg is also lowered in a control process executed by the control unit 14, so that the rotational speed ω turns to increase. Because the wind speed U is higher than an initial wind speed at this point, the rotational speed ω is increased at a high speed as compared with the initial rotational speed region R20. Accordingly, the tip speed ratio λ increases and the angle of attack α decreases. When the angle of attack α is sufficiently lower than the stall angle $\alpha_S$, the flow separation is limited and the airflow is reattached to the blade 51, the blade 52 or the blade 53, so that the blade 51, the blade 52, and the blade 53 can all generate sufficient lift forces.

When the rotational speed ω has entered the rotational speed region R25 again, the torque Tg increases and an increase in the rotational speed ω is limited. In this case, because the wind speed U also continues to increase, the angle of attack α starts to increase again and exceeds the stall angle $\alpha_S$ again, and a phenomenon similar to the phenomenon described above is repeated.

That is, when the angle of attack α exceeds the stall angle $\alpha_S$, a phenomenon in which the angle of attack α, the rotational speed ω, the tip speed ratio λ, and the torque Tg repeatedly change greatly occurs. The increase in the rotational speed ω is slower than that shown in FIG. 8 and a phenomenon in which it is very difficult to shift the region from the rotational speed region R25 to the rotational speed region R30 occurs. Also, in the rotational speed region R25, as shown in FIG. 5, a large thrust force is applied to the first wind turbine 1a and the thrust force also changes greatly when an operating state of the first wind turbine 1a changes. Because a force applied to the blades 51, 52, and 53 is transferred to the hub 4, the gearbox housed in the nacelle 3, the power generator, the tower 2, and the like, the thrust force causes the entire first wind turbine 1a to be fatigued, so that it is necessary to perform a maintenance process on the first wind turbine 1a frequently or the lifespan of the first wind turbine 1a may be shortened.

Figure 10:
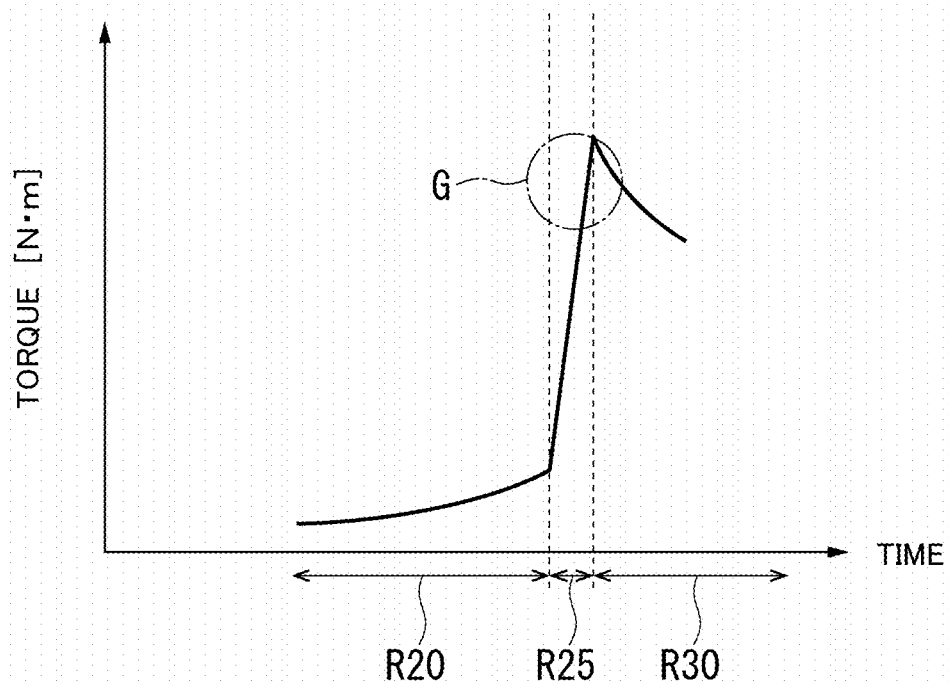
FIG. 10 is a diagram showing an example of a change over time in torque when the angle of attack exceeds the stall angle.

FIG. 10 is a diagram showing an example of a change over time in torque when the angle of attack exceeds the stall angle. As shown in FIG. 10, large changes in the angle of attack α, the rotational speed ω, the tip speed ratio λ, and the torque Tg described above are caused due to a region where the angle of attack α increases and the stall easily occurs in the rotational speed region R25 where the rotational speed ω is limited. Therefore, a method in which the pitch angle β is driven early to prevent the angle of attack α from exceeding the stall angle $\alpha_S$ in the rotational speed region R25 before the rotational speed ω enters the region of the rotational speed region R30 can be taken into account.

For example, in FIG. 9, it is determined that a stall has occurred when the stall occurs and the rotational speed ω decreases rapidly and it is possible to prevent an increase in the angle of attack α due to the effect of controlling the pitch angle β if an adjustment process is performed so that the pitch angle β gradually begins to open at a point in time when the rotational speed ω has reached the rotational speed region.

However, in general, as shown in FIGS. 8 and 9, the wind speed U rarely increases at a constant rate. When the wind speed U changes, the rotational speed ω also increases and decreases repeatedly, so that it cannot be determined whether the rapid decrease in the rotational speed ω is caused due to the rotational speed ω exceeding the stall angle $\alpha_S$ or a change in the wind condition.

The stall in the rotational speed region R25 is likely to occur especially when the first wind turbine 1a is installed at a place where a change in the wind speed U is large. Because a time constant of a change is large due to an influence of inertia, the rotational speed ω cannot follow a change in the wind speed U and a change in the tip speed ratio λ, i.e., the angle of attack α, occurs. Also, at a place where a change in the wind speed U is large, the non-uniformity of the wind speed U within the rotor surface is also large, so that an amount of change in the wind speed U differs according to each blade element and a change in the angle of attack α is also non-uniform. Thus, a phenomenon in which the stall frequently occurs at various locations within the rotating surface of the blade 51, the blade 52, and the blade 53 may occur. Therefore, in the above-described control of the pitch angle β, it is necessary to tune control parameters such as a timing of start of the control of the pitch angle β and a speed at which the pitch angle β is moved in accordance with a place where the first wind turbine 1a is installed. Although the present invention is effective if it is possible to determine whether or not a stall has occurred to tune the pitch angle β properly according to the place where the first wind turbine 1a is installed, it is difficult to determine the presence or absence of a stall under a situation where the wind speed U changes as described above.

Returning to FIG. 2, the wind turbine control device 10 determines whether or not flow separation has occurred in at least one of the blade 51, the blade 52, and the blade 53.

The acquisition unit 11 acquires wind condition data acquired in time series for a prescribed period. The wind condition data mentioned herein includes wind condition data at the time of plasma generation and wind condition data at the time of stopping plasma generation. The pre-scribed period mentioned herein is, for example, several weeks to several months.

Figure 11:
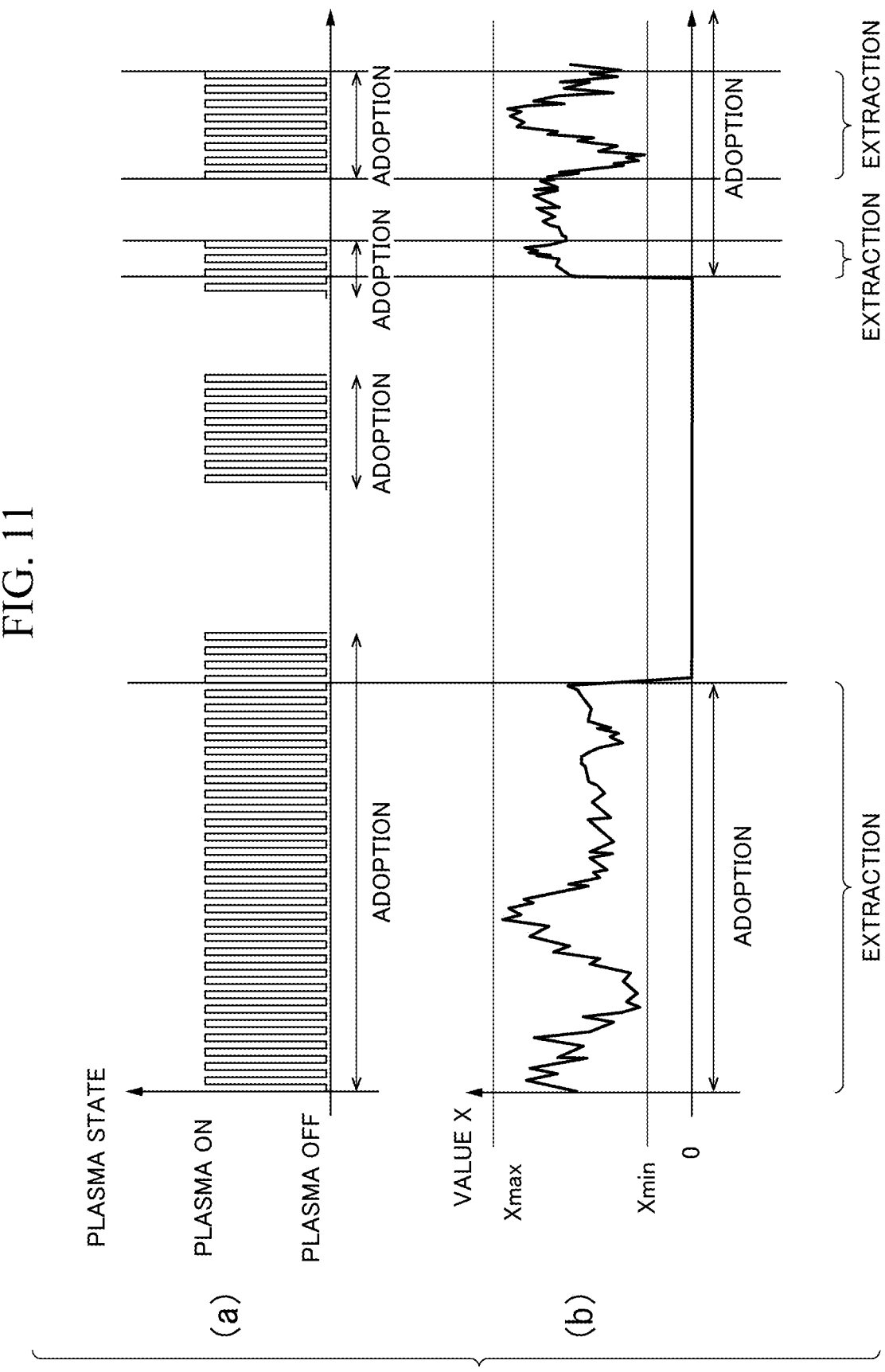
FIG. 11 is a diagram showing an example of plasma operation data and rotational speed data of the first wind turbine.

FIG. 11 is a diagram showing an example of plasma operation data and rotational speed data of the first wind turbine. FIG. 11(a) is an example of plasma operation data in the plasma electrode 510, the plasma electrode 520, or the plasma electrode 530. Although an operation of repeating plasma generation and plasma stop is performed every 10 minutes, there is a period in which plasma stop continues due to a defect in a plasma power supply on the way. Here, as the plasma state, only a duration where plasma generation and stop are repeated every 10 minutes is adopted.

The plasma generation mentioned herein indicates, for example, a state in which an alternating voltage having a voltage Vpp of 5 to 20 kV and a fundamental frequency f of 5 to 100 kHz is continuously applied in pulse modulation control based on a duty ratio D=0.1% to 50% and a modulation frequency F [Hz]. For example, the modulation frequency F is set so that St defined in the following Eq. (10) including an average circumferential velocity V at a position where the target plasma electrode 510, the plasma electrode 520, or the plasma electrode 530 is installed and an average chord length c at the same position has a value between 0.1 and 100.

[Math. 10]

$$St = \frac{F \cdot c}{V} \tag{10}$$

Next, FIG. 11(b) is the rotational speed data of the first wind turbine 1a. Because the operating state of the first wind turbine 1a changes with the wind speed U, the rotational speed ω, and the like, a state in which a rotational speed X is between Xmin and Xmax is adopted as a normal state here. The acquisition unit 11 acquires a time period in which both the wind condition data and the rotational speed data indicating the rotational speed X of the first wind turbine 1a are adopted as a time period of an analysis target. In this way, the data acquisition unit has a function of acquiring a time period in which all of a plurality of pieces of data can be adopted.

The acquisition unit 11 can acquire the time period, for example, only when the first wind turbine 1a is operating under the rotational speed regulation control according to the above-described function.

The acquisition unit 11 acquires the wind condition data at the time of plasma generation and the wind condition data at the time of stopping plasma generation from the data acquired in the above-described procedure. For example, the acquisition unit 11 collects the wind speed data at the time of plasma generation and the wind speed data at the time of stopping plasma generation generated by the anemometer 7. Also, the acquisition unit 11 collects the wind direction data at the time of plasma generation and the wind direction data at the time of stopping plasma generation generated by the wind direction meter 6.

The wind condition data at the time of plasma generation is data indicating the wind condition when a plasma has been generated by the plasma electrodes. The wind condition data at the time of stopping plasma generation is data indicating the wind condition when no plasma has been generated by the plasma electrodes. The wind condition mentioned herein includes at least one of the wind speed and the wind direction of the wind W. Therefore, the wind condition data at the time of plasma generation includes at least one of the wind speed data at the time of plasma generation indicating the wind speed when the plasma has been generated by the plasma electrodes and the wind direction data at the time of plasma generation indicating the wind direction in such a case. Likewise, the wind condition data at the time of stopping plasma generation includes at least one of the wind speed data at the time of stopping plasma generation indicating the wind speed when a plasma from the plasma electrodes has been stopped and the wind direction data at the time of stopping plasma generation indicating the wind direction in such a case.

The determination unit 12 executes a wind condition comparison process for comparing the wind condition data at the time of plasma generation with the wind condition data at the time of stopping plasma generation. For example, the determination unit 12 executes the following wind condition comparison process.

The determination unit 12 creates a histogram for each of the wind speed indicated in the wind speed data at the time of plasma generation and the wind speed indicated in the wind speed data at the time of stopping plasma generation and calculates an average thereof.

FIG. 12(a) is a diagram showing a histogram of the wind speed when a plasma is being generated by applying a voltage between the plasma electrodes 510, the plasma electrodes 520, and the plasma electrodes 530. An average wind speed calculated from the histogram shown in FIG. 12(a) is 3.1883 m/s. FIG. 12(b) is a diagram showing an example of a histogram of the wind speed when no plasma is being generated by applying no voltage between the plasma electrodes 510, the plasma electrodes 520, and the plasma electrodes 530. An average wind speed calculated from the histogram shown in FIG. 12(b) is 3.1644 m/s.

The determination unit 12 creates a histogram for each of the wind direction indicated in the wind direction data at the time of plasma generation and the wind direction indicated in the wind direction data at the time of stopping plasma generation and calculates an average thereof.

FIG. 13(*a*) is a diagram showing a histogram of the wind direction when a plasma is being generated by applying a voltage between the plasma electrodes 510, the plasma electrodes 520, and the plasma electrodes 530. FIG. 13(*b*) is a diagram showing an example of a histogram of the wind direction when no plasma is being generated by applying no voltage between the plasma electrodes 510, the plasma electrodes 520, and the plasma electrodes 530. In FIGS. 13(*a*) and 13(*b*), the wind direction when the wind W is blowing from north to south is 0 degrees and the wind direction when the wind W is blowing from south to north is 180 degrees. An average wind direction calculated from the histogram shown in FIG. 13(*a*) is 183.1469 degrees. An average wind direction calculated from the histogram shown in FIG. 13(*b*) is 183.7531 degrees.

The determination unit 12 executes at least one of a process of comparing the two histograms shown in FIG. 12, a process of comparing the average wind speeds calculated from the two histograms shown in FIG. 12, a process of comparing the two histograms shown in FIG. 13, and a process of comparing the average wind speeds calculated from the two histograms shown in FIG. 13 as a wind condition comparison process.

The determination unit 12 determines whether or not a result of the wind condition comparison process satisfies a prescribed wind condition condition. For example, the determination unit 12 determines whether or not an index for evaluating a difference between the two histograms shown in FIG. 12 is less than or equal to a prescribed threshold value or determines whether the difference between the average wind speeds calculated from the two histograms is less than or equal to a prescribed threshold value. Alternatively, the determination unit 12 determines whether or not an index for evaluating a difference between the two histograms shown in FIG. 13 is less than or equal to a prescribed threshold value or determines whether a difference between the average wind directions calculated from the two histograms is less than or equal to a prescribed threshold value. Alternatively, the determination unit 12 determines whether or not a difference between two average values is significant in a statistical test method such as Welch's t-test. When a difference between two comparison targets is within a range of a certain level or less, the determination unit 12 determines that the result of the wind condition comparison process satisfies the prescribed wind condition condition. Although the operating characteristic of the first wind turbine such as a power curve is greatly affected by the wind condition, it is possible to compare operating characteristics of the first wind turbine at the time of plasma generation and the time of plasma stop under approximately the same wind condition by performing the above-described wind condition comparison process of the determination unit 12.

When it is determined that the result of the wind condition comparison process satisfies the prescribed wind condition condition, the acquisition unit 11 acquires an operation history at the time of plasma generation and an operation history at the time of stopping plasma generation. The operation history at the time of plasma generation is an operation history of the first wind turbine 1*a* when a plasma has been generated by the plasma electrodes 510, the plasma electrodes 520, and the plasma electrodes 530. The operation history at the time of stopping plasma generation is an operation history of the first wind turbine 1*a* when no plasma has been generated by the plasma electrodes 510, the plasma electrodes 520, and the plasma electrodes 530.

Also, the operation history of the wind turbine mentioned herein is data indicating a history of the output, the rotational speed ω, the pitch angle β, the torque Tg, the tip speed ratio λ, and the like of the first wind turbine 1*a* and may be associated with the wind speed data or the wind direction data acquired by the acquisition unit 11. For example, the acquisition unit 11 acquires an operation history indicating a relationship between the output and the wind speed U of the first wind turbine 1*a* as the operation history at the time of plasma generation and the operation history at the time of stopping plasma generation. Alternatively, the acquisition unit 11 acquires a history indicating a relationship between the rotational speed ω and the torque Tg of the first wind turbine 1*a* as the operation history at the time of plasma generation and the operation history at the time of stopping plasma generation. Alternatively, the acquisition unit 11 acquires an operation history indicating a relationship between the rotational speed ω and the pitch angle β of the first wind turbine 1*a* as the operation history at the time of plasma generation and the operation history at the time of stopping plasma generation. Here, the acquisition unit 11 may acquire the operation history data at the time of plasma generation and the operation history data at the time of stopping plasma generation from the operation history of the first wind turbine 1*a* acquired at the same time when the wind condition data is acquired.

In the following description, an example in which the first wind turbine 1*a* is in a 10% load operation and the plasma state is a state in which the fundamental frequency F=15 kHz, the duty ratio=5%, and St=1 will be described. The 10% load operation is an operation in which the pitch angle β starts to open when the output has reached 10% of the rated output of the power generator connected to the hub 4 provided in the first wind turbine 1*a* and the output of 10% of the rated output is maintained. Also, the above-described St is represented by the above-described Eq. (10).

Figure 14:
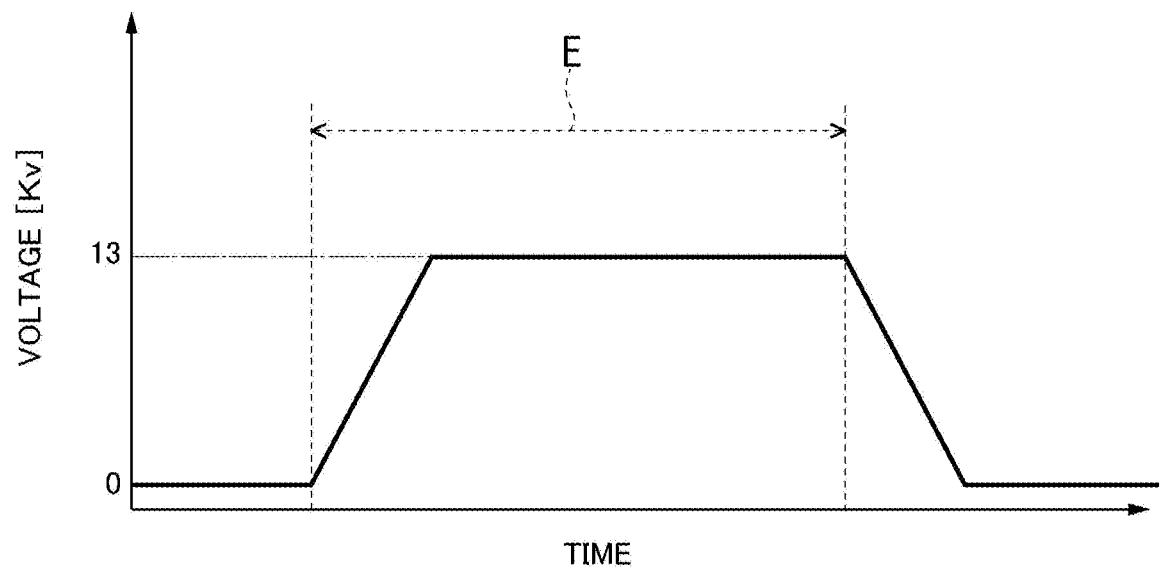
FIG. 14 is a diagram showing an example of a change over time in a voltage applied between the plasma electrodes according to the embodiment of the present invention.

Also, a period in which a plasma is being generated by applying a voltage between the plasma electrodes 510, the plasma electrodes 520, and the plasma electrodes 530 and a period in which no plasma is being generated by applying no voltage between the plasma electrodes 510, the plasma electrodes 520, and the plasma electrodes 530 are repeated at intervals of 10 minutes. FIG. 14 is a diagram showing an example of a change over time in the voltage applied between the plasma electrodes according to the embodiment of the present invention. For example, as shown in FIG. 14, the voltage between the plasma electrodes 510, the plasma electrodes 520, and the plasma electrodes 530 starts to increase from 0 V to 13 kV at a point in time when a period E has started and a voltage of 13 kV is applied until the end of the period E after the voltage reaches 13 kV. In this case, a length of the period E is 10 minutes. At a point in time when the period E has ended, the decrease from 13 kV to 0 V starts. The next period E starts when 10 minutes have elapsed from a point in time when the period E shown in FIG. 14 ended.

The determination unit 12 executes an operation history comparison process of comparing the operation history at the time of plasma generation with the operation history at the time of stopping plasma generation and executes a determination process of determining whether or not the result of the operation history comparison process satisfies the prescribed first condition.

For example, the determination unit 12 compares a statistical value of a physical quantity included in the operation history at the time of plasma generation with a statistical value of a physical quantity included in the operation history at the time of stopping plasma generation in the operation history comparison process. More specifically, the determination unit 12 executes the following operation history comparison process and the following determination process when the operation history indicating the relationship between the output and the wind speed U of the first wind turbine 1a has been acquired as the operation history at the time of plasma generation and the operation history at the time of stopping plasma generation.

Figure 15:
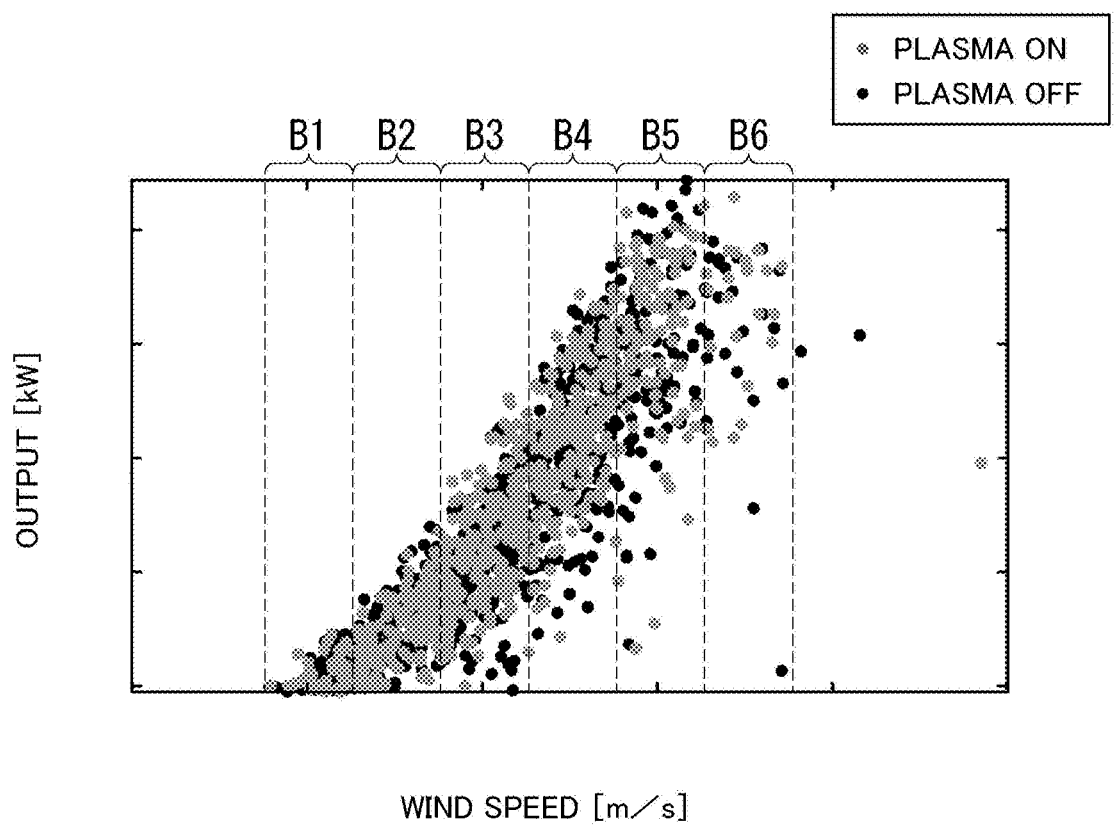
FIG. 15 is a scatter diagram showing an example of histograms of averages of a wind speed and an output for one minute when a plasma is being generated by applying a voltage between plasma electrodes and averages of a wind speed and an output for one minute when no plasma is being generated by applying no voltage between the plasma electrodes according to the embodiment of the present invention.

FIG. 15 is a scatter diagram showing an example of averages of a wind speed and an output for one minute when a plasma is being generated by applying a voltage between plasma electrodes and averages of a wind speed and an output for one minute when no plasma is being generated by applying no voltage between the plasma electrodes according to the embodiment of the present invention. A white dot shown in FIG. 15 indicates the averages of the wind speed and the output for one minute at the time of plasma generation. A black dot shown in FIG. 15 indicates the averages of the wind speed and the output for one minute at the time of stopping plasma generation.

The determination unit 12 creates a scatter diagram shown in FIG. 15 from the operation history acquired by the acquisition unit 11 and sets a first wind speed range B1, a second wind speed range B2, a third wind speed range B3, a fourth wind speed range B4, a fifth wind speed range B5, and a sixth wind speed range B6. The determination unit 12 calculates the average wind speed and a 95% confidence interval of the wind speed and the average output and a 95% confidence interval of the output for each of these six wind speed ranges at each of the time of plasma generation and the time of plasma stop.

Figure 16:
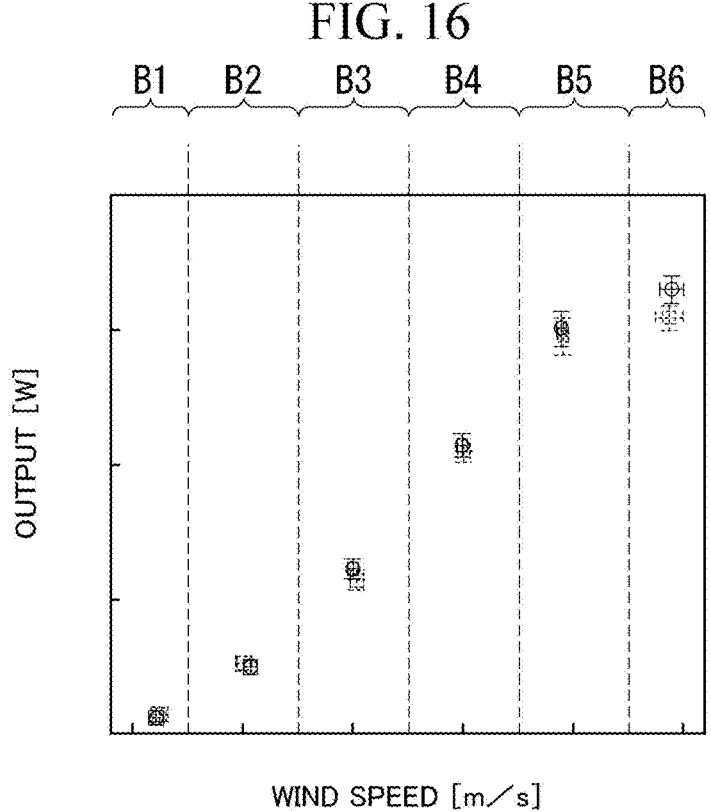
FIG. 16 is a diagram showing points shown in FIG. 15 divided into first to sixth wind speed ranges and averages of a wind speed and an output and a 95% confidence interval calculated for each of the six wind speed ranges.

FIG. 16 is a diagram showing points shown in FIG. 15 divided into the first to sixth wind speed ranges and averages of a wind speed and an output and 95% confidence intervals thereof calculated for each of the six wind speed ranges. A circle shown in FIG. 16 indicates the average wind speed and the average output at the time of plasma generation. A square shown in FIG. 16 indicates the average wind speed and the average output at the time of stopping plasma generation. Also, in FIG. 16, the 95% confidence interval of the wind speed and the 95% confidence interval of the output are indicated by error bars.

In the first to sixth wind speed ranges B1 to B6 shown in FIG. 16, the average wind speed is approximately the same between the time of plasma generation and the time of plasma stop. Also, in the first to fifth wind speed ranges B1 to B5 shown in FIG. 16, the average output is approximately the same between the time of plasma generation and the time of plasma stop. On the other hand, in the sixth wind speed range B6, the average output is different between the time of plasma generation and the time of plasma stop. The determination unit 12 determines that the result of the operation history comparison process satisfies the prescribed first condition on the basis of the average output difference between the time of plasma generation and the time of plasma stop in the sixth wind speed range B6. In this case, the prescribed first condition is that the average output difference between the time of plasma generation and the time of plasma stop exceeds a prescribed threshold value.

Figure 17:
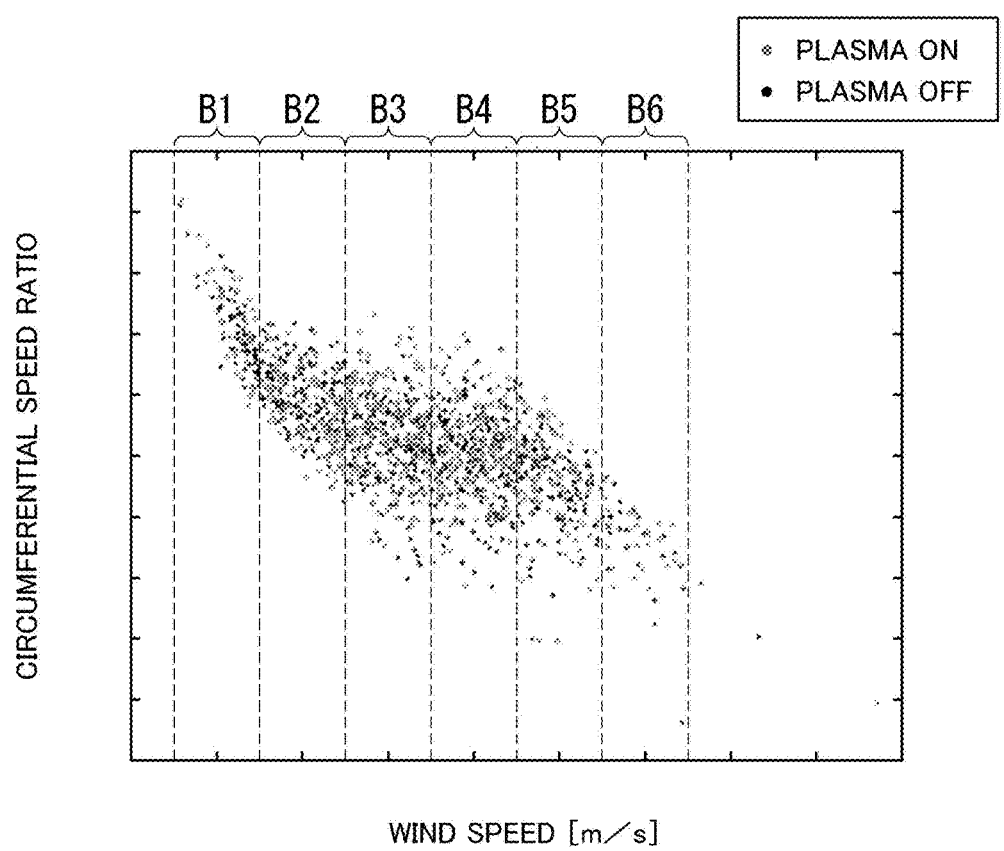
FIG. 17 is a scatter diagram showing an example of a relationship between a wind speed and a tip speed ratio when a plasma is being generated by applying a voltage between plasma electrodes and a relationship between a wind speed and a tip speed ratio when no plasma is being generated by applying no voltage between the plasma electrodes according to the embodiment of the present invention.
Figure 18:
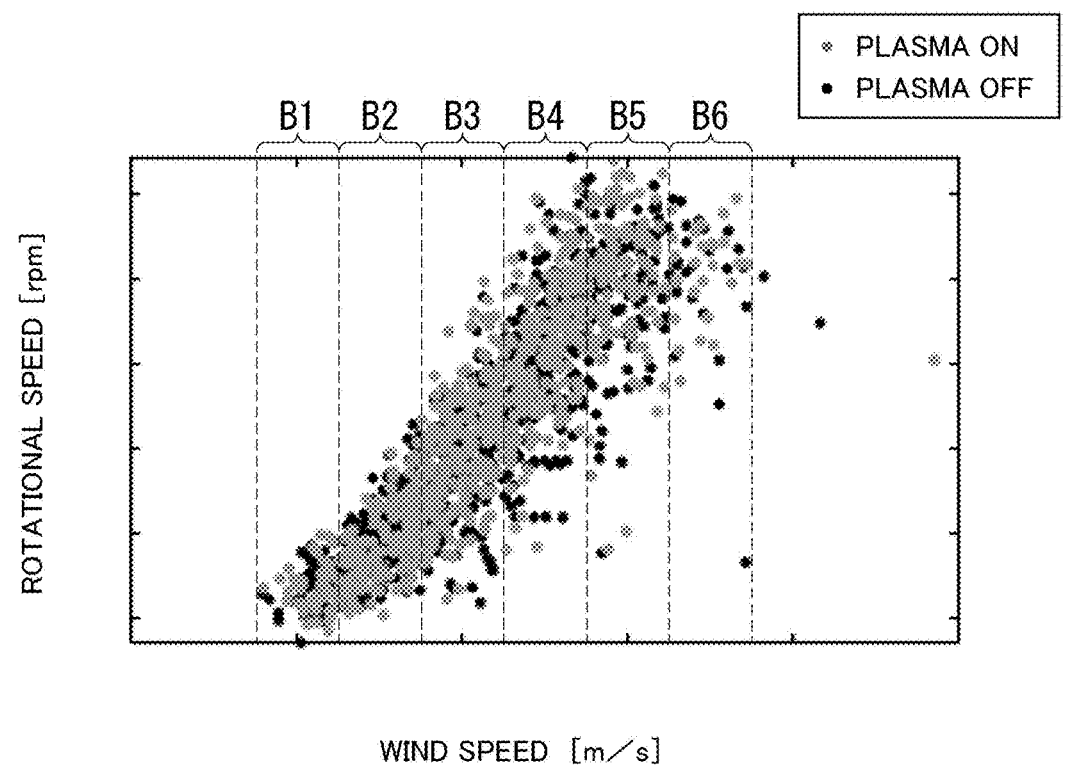
FIG. 18 is a scatter diagram showing an example of a relationship between a wind speed and a rotational speed when a plasma is being generated by applying a voltage between plasma electrodes and a relationship between a wind speed and a rotational speed when no plasma is being generated by applying no voltage between the plasma electrodes according to the embodiment of the present invention.
Figure 19:
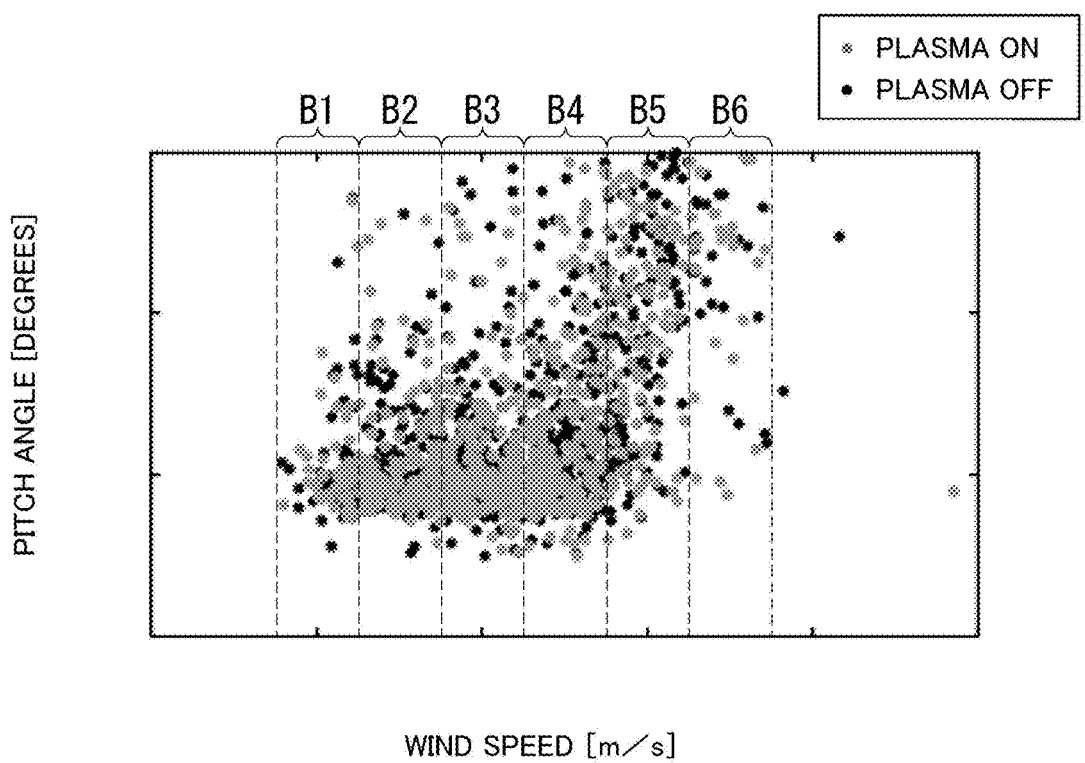
FIG. 19 is a scatter diagram showing an example of a relationship between a wind speed and a pitch angle when a plasma is being generated by applying a voltage between plasma electrodes and a relationship between a wind speed and a pitch angle when no plasma is being generated by applying no voltage between the plasma electrodes according to the embodiment of the present invention.

FIGS. 17 to 19 are diagrams showing data supporting that the average output difference exceeding the prescribed threshold value in the sixth wind speed range B6 shown in FIG. 16 is caused due to the occurrence of flow separation.

FIG. 17 is a scatter diagram showing an example of a relationship between a wind speed and a tip speed ratio when a plasma is being generated by applying a voltage between plasma electrodes and a relationship between a wind speed and a tip speed ratio when no plasma is being generated by applying no voltage between the plasma electrodes according to the embodiment of the present invention.

FIG. 18 is a scatter diagram showing an example of a relationship between a wind speed and a rotational speed when a plasma is being generated by applying a voltage between plasma electrodes and a relationship between a wind speed and a rotational speed when no plasma is being generated by applying no voltage between the plasma electrodes according to the embodiment of the present invention.

FIG. 19 is a scatter diagram showing an example of a relationship between a wind speed and a pitch angle when a plasma is being generated by applying a voltage between plasma electrodes and a relationship between a wind speed and a pitch angle when no plasma is being generated by applying no voltage between the plasma electrodes according to the embodiment of the present invention.

Referring to the first to fifth wind speed range B1 to B5 shown in FIG. 17, it can be seen that the tip speed ratio $\lambda$ is kept approximately constant even if the wind speed U increases. Also, referring to the first to fifth wind speed range B1 to B5 shown in FIG. 18, it can be seen that the rotational speed $\omega$ increases as the wind speed U increases. Further, referring to the first to fifth wind speed range B1 to B5 shown in FIG. 19, it can be seen that the pitch angle $\beta$ is approximately fixed at a constant angle and does not change even if the wind speed U increases. Therefore, in the first to fifth wind speed range B1 to B5, the constant tip speed ratio control is executed, and the angle of attack $\alpha$ does not increase, so that it can be estimated that the possibility of occurrence of flow separation will be low. In this state, as shown in FIG. 17, it is considered that no flow separation occurs because the average value of the outputs from the first wind speed range B1 to the fifth wind speed range B5 is approximately the same between the time of plasma generation and the time of plasma stop.

On the other hand, referring to the sixth wind speed range B6 shown in FIG. 17, it can be seen that the tip speed ratio $\lambda$ decreases as the wind speed U increases. Also, referring to the sixth wind speed range B6 shown in FIG. 18, it can be seen that the rotational speed $\omega$ is kept approximately constant even if the wind speed U increases. Further, referring to the sixth wind speed range B6 shown in FIG. 19, it can be seen that the pitch angle $\beta$ begins to increase as the wind speed U increases. Therefore, in the sixth wind speed range B6, it can be seen that the rotational speed limitation control is executed, the angle of attack $\alpha$ exceeds the stall angle $\alpha S$, and flow separation is like to occur. The pitch angle $\beta$ has begun to increase, but is insufficient to prevent a stall. Also, the data included in the sixth wind speed range is the data included in the operation history at the time of plasma generation or the operation history at the time of stopping plasma generation when the first wind turbine 1a is operated under the rotational speed limitation control. In this state, as shown in FIG. 17, because an average value of the outputs in the sixth wind speed range B6 is different between the time of plasma generation and the time of plasma stop, it can be said that there is a high possibility of occurrence of flow separation.

Alternatively, when the operation history showing the relationship between the rotational speed $\omega$ and the torque Tg of the first wind turbine 1a has been acquired as the operation history at the time of plasma generation and the operation history at the time of stopping plasma generation, the determination unit 12 executes the following operation history comparison process and the following determination process.

The determination unit 12 executes a process of comparing a distribution of data of the rotational speed ω and the torque Tg for each seconds at the time of plasma generation with a distribution of data of the rotational speed ω and the torque Tg for each seconds at the time of stopping plasma generation as the operation history comparison process. The determination unit 12 executes a process of determining whether or not the distribution of the data of the rotational speed ω and the torque Tg for each seconds at the time of plasma generation and the distribution of the data of the rotational speed ω and the torque Tg for each seconds at the time of stopping plasma generation match within a prescribed range as the determination process. For example, when the data of the rotational speed ω and the torque Tg for each seconds at the time of plasma generation and the data of the rotational speed ω and the torque Tg for each seconds at the time of stopping plasma generation have approximately the same distribution, the determination unit 12 determines that these two distributions match within the prescribed range.

When it is determined that the result of the operation history comparison process satisfies the prescribed first condition, the notification unit 15 notifies that flow separation has occurred. On the other hand, when it is determined that the result of the operation history comparison process does not satisfy the prescribed first condition, the notification unit 15 notifies that no flow separation has occurred. Examples of the mode in which the notification unit 15 provides a notification of the above content include a mode in which the above content is displayed on a display and a mode in which the above content is output as a sound from a speaker.

When it is determined that the result of the operation history comparison process satisfies the prescribed first condition, the notification unit 15 notifies that the plasma electrodes 510, the plasma electrodes 520, and the plasma electrodes 530 are recommended to remain installed on the blade 51, the blade 52, and the blade 53, respectively. On the other hand, when it is determined that the result of the operation history comparison process does not satisfy the prescribed first condition, the notification unit 15 notifies that the plasma electrodes 510, the plasma electrodes 520, and the plasma electrodes 530 may be removed from the blade 51, the blade 52, and the blade 53, respectively. Examples of the mode in which the notification unit 15 provides a notification of the above content include a mode in which the above content is displayed on a display and a mode in which the above content is output as a sound from a speaker.

The adjustment unit 13 adjusts the control parameter related to the control characteristic for the torque Tg. The control parameter, which is adjusted here, is, for example, a PI control parameter applied to the control of the torque Tg.

Alternatively, the adjustment unit 13 adjusts the control parameter related to the control characteristic for the pitch angle β. The control parameter, which is adjusted here, is, for example, a PI control parameter applied to the control of the pitch angle β.

Figure 20:
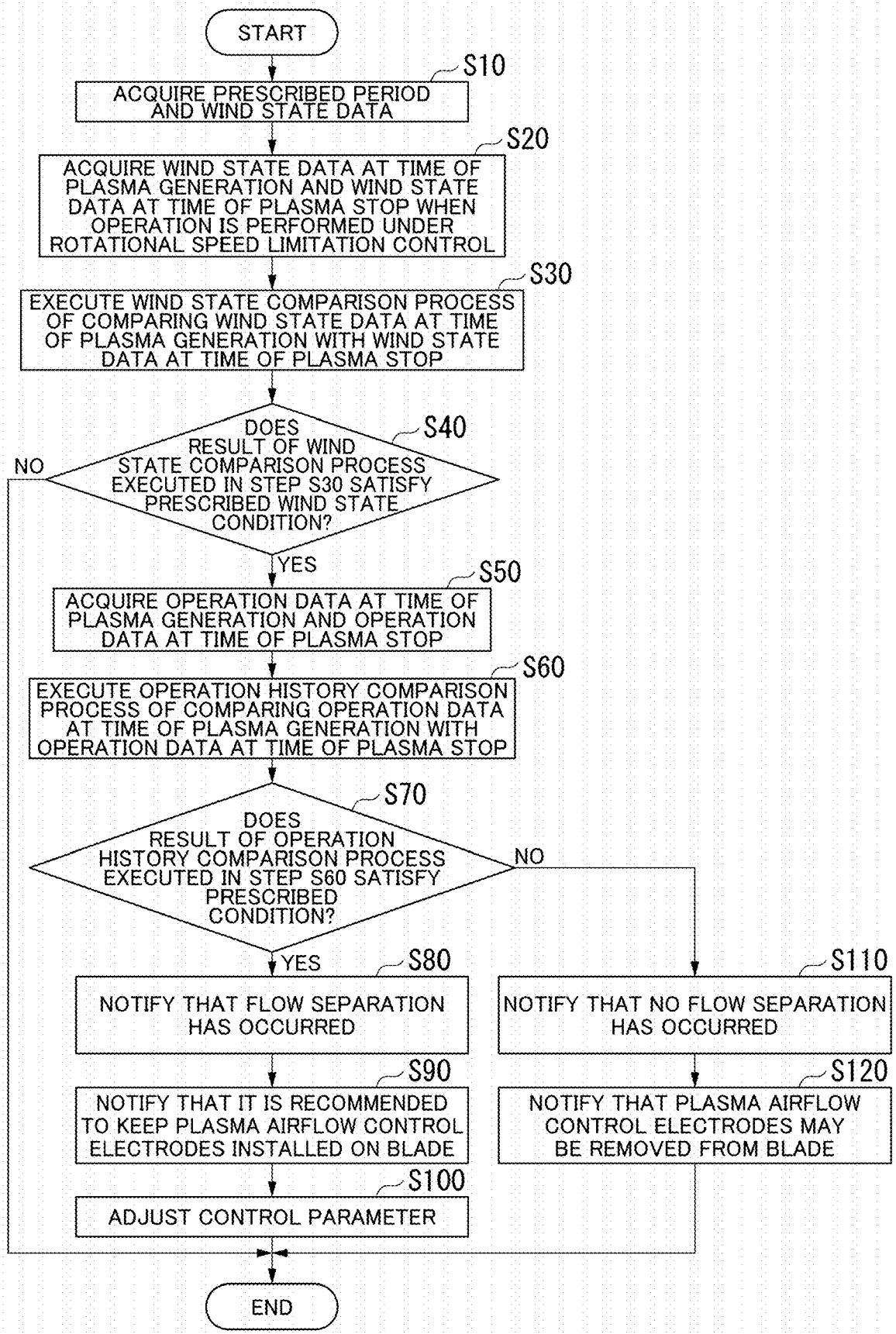
FIG. 20 is a flowchart showing an example of a process executed by the first wind turbine control device according to the embodiment of the present invention.

Next, an example of the process executed by the wind turbine control device 10 will be described with reference to FIG. 20. FIG. 20 is a flowchart showing the example of the process executed by the wind turbine control device according to the embodiment of the present invention. The process shown in FIG. 20 may be repeatedly executed.

In step S10, the acquisition unit 11 acquires wind condition data for a prescribed period. Here, the acquisition unit 11 may acquire wind turbine operation data in the same time period as the wind condition in addition to the wind condition data.

In step S20, the acquisition unit 11 acquires the wind condition data at the time of plasma generation and the wind condition data at the time of stopping plasma generation when the operation is being performed under the rotational speed limitation control. Here, the acquisition unit 11 may acquire wind turbine operation data at the time of plasma generation and wind turbine operation data at the time of stopping plasma generation in the same time period as the wind condition. Here, the acquisition unit 11 may perform a similar operation when an operation is being performed in a state that is not under the rotational speed limitation operation.

In step S30, the determination unit 12 executes a wind condition comparison process of comparing the wind condition data at the time of plasma generation with the wind condition data at the time of stopping plasma generation.

In step S40, the determination unit 12 determines whether or not the result of the wind condition comparison process executed in step S30 satisfies a prescribed wind condition condition. When it is determined that the result of the wind condition comparison process satisfies the prescribed wind condition condition (step S40: YES), the determination unit 12 moves the process to step S40. On the other hand, when it is determined that the result of the wind condition comparison process does not satisfy the prescribed wind condition condition (step S40: NO), the determination unit 12 causes the process to end.

In step S50, the acquisition unit 11 acquires operation history data at the time of plasma generation and operation history data at the time of stopping plasma generation. Here, if the operation history data has already been acquired in at least one of steps S10 and S20 described above, the acquired operation history data may be used.

In step S60, the determination unit 12 executes an operation history comparison process of comparing the operation history data at the time of plasma generation with the operation history data at the time of stopping plasma generation.

In step S70, the determination unit 12 determines whether or not the result of the determination process executed in step S60 satisfies the prescribed first condition. When it is determined that the result of the determination process executed in step S60 satisfies the prescribed first condition (step S70: YES), the determination unit 12 moves the process to step S80. On the other hand, when it is determined that the result of the determination process executed in step S60 does not satisfy the prescribed first condition (step S70: NO), the determination unit 12 moves the process to step S110.

In step S80, the notification unit 15 notifies that flow separation has occurred.

In step S90, the notification unit 15 notifies that the plasma electrodes 510, the plasma electrodes 520, and the plasma electrodes 530 are recommended to remain installed on the blade 51, the blade 52, and the blade 53, respectively.

In step S100, the adjustment unit 13 adjusts the control parameters and causes the process to end. However, the adjustment unit 13 may cause the process to end without adjusting the control parameters in step S100.

In step S110, the notification unit 15 notifies that no flow separation has occurred.

In step S120, the notification unit 15 notifies that the plasma electrodes 510, the plasma electrodes 520, and the plasma electrodes 530 may be removed from the blade 51, the blade 52, and the blade 53, respectively, and causes the process to end. Also, in step S120, the notification unit 15 may notify that the plasma electrodes 510, the plasma electrodes 520, and the plasma electrodes 530 are turned off.

Next, an example of a process executed by the first wind turbine 1a in relation to the second wind turbine 1b will be described.

The acquisition unit 11 acquires direction data, wake data, and wind turbine data.

The direction data is data indicating a direction in which the rotating surface of the first wind turbine 1a is facing. For example, the direction data is generated by a yaw drive device for adjusting the direction in which the rotating surface of the first wind turbine 1a is facing and a yaw counter for detecting the accuracy of the direction adjusted by the yaw drive device attached to a portion where the tower 2 and the nacelle 3 are connected and stored in a storage medium installed at any place. The acquisition unit 11 acquires the direction data from the yaw drive device or the storage medium.

The wake data is data indicating information about the wake of the first wind turbine 1a, and includes, for example, physical quantity data, surrounding environment data, and wake passage region data.

The physical quantity data is data indicating the physical quantity related to the property of the wake of the first wind turbine 1a. For example, the physical quantity data is data indicating, for example, the current or past temperature, humidity, wind speed, wind direction, turbulent flow intensity, and the like around the first wind turbine 1a. The physical quantity data is generated in measurement processes of sensors such as a thermometer, a hygrometer, the wind direction meter 6, and the anemometer 7 installed on the first wind turbine 1a or generated by executing a simulation using values measured by the sensors and is stored in a storage medium installed at any place. The acquisition unit 11 acquires the physical quantity data from these sensors or the storage medium.

The surrounding environment data is data indicating information about at least one of geographical features around the first wind turbine 1a and structures located around the first wind turbine 1a. The surrounding environment data is generated by measuring at least one of the geographical features around the first wind turbine 1a and the structures located around the first wind turbine 1a in advance in any method, and is stored in a storage medium installed at any place. The acquisition unit 11 acquires the surrounding environment data from the storage medium.

The wake passage region data is data indicating the wake passage region through which the wake of the first wind turbine 1a passes. For example, the wake passage region data is derived using at least one of pieces of surrounding environment data and physical quantity data indicating at least one of the current and past temperatures, humidity, wind speeds, wind directions, turbulent flow intensities, and the like around the first wind turbine 1a and is stored in a storage medium installed at any place. The acquisition unit 11 acquires the wake passage region data from the storage medium.

Also, the wake passage region is not necessarily defined only as a region on one surface that overlooks at least one of a sea surface and a ground surface, but may be defined for each of a plurality of planes that overlook at least one of the sea surface and the ground surface. That is, the wake passage region may be two-dimensional or three-dimensional.

Also, the wake passage region does not necessarily extend uniformly along the rotating shaft of the first wind turbine 1a. For example, the wake passage region may be bent and expanded by the wind or the like that crosses the leeward of the first wind turbine 1a, may be wiped out by the wind or the like that crosses the leeward of the first wind turbine 1a, or may branch due to the collision of the wake of the first wind turbine 1a with an island, a mountain, a building, or the like.

The wind turbine data is data indicating information about the second wind turbine 1b different from the first wind turbine 1a, and includes, for example, wind turbine position data, wind turbine design data, and wind turbine control data. The second wind turbine 1b may be a wind turbine of a type that is the same as that of the first wind turbine 1a or may be a wind turbine of a type different from that of the first wind turbine 1a.

The wind turbine position data is data indicating the position of the second wind turbine 1b and is stored in advance in a storage medium installed at any place. The acquisition unit 11 acquires wind turbine position data from the storage medium.

The wind turbine design data is, for example, data indicating components of the second wind turbine 1b and dimensions and materials of parts, and is stored in advance in a storage medium installed at any place. The acquisition unit 11 acquires the wind turbine design data from the storage medium.

The wind turbine control data is data indicating information about the control of the second wind turbine 1b, is generated by the wind turbine control device that controls the second wind turbine 1b, and is stored in a storage medium installed at any place. The control of the second wind turbine 1b mentioned herein is, for example, pitch angle control, torque control, constant tip speed ratio control, rotational speed limitation control, constant output control, and control of the plasma electrode attached to the leading edge of the blade of the second wind turbine 1b. The acquisition unit 11 acquires the wind turbine control data from the wind turbine control device or a storage device.

The pitch angle control is control for adjusting angles β of the blade 51, the blade 52, and the blade 53 using PI control (a proportional-integral controller) or the like. The torque control is control for adjusting the torque Tg of the power generator using PI control or the like. The constant tip speed ratio control is control for trying to keep the tip speed ratio in line with a designed tip speed ratio $\lambda_{DES}$ by increasing the torque Tg of the power generator by an amount of an increase in a wind speed of the incoming wind. The rotational speed limitation control is control for maintaining the rotational speed of the rotor at a prescribed value by controlling the torque of the power generator and the pitch angles of the blades 51, the blades 52, and the blades 53. The control of the plasma electrode is control for adjusting at least one of the fundamental frequency, the duty ratio, and the modulation frequency of the voltage applied between the two plasma electrodes.

The determination unit 12 determines whether or not the second wind turbine 1b is affected by the wake of the first wind turbine 1a using the direction data, the wake data, and the wind turbine data. For example, the determination unit 12 determines that the second wind turbine 1b is affected by the first wind turbine 1a when the position of the second wind turbine 1b indicated in the wind turbine position data is included in the wake passage region indicated in the wake passage region data.

Figure 21:
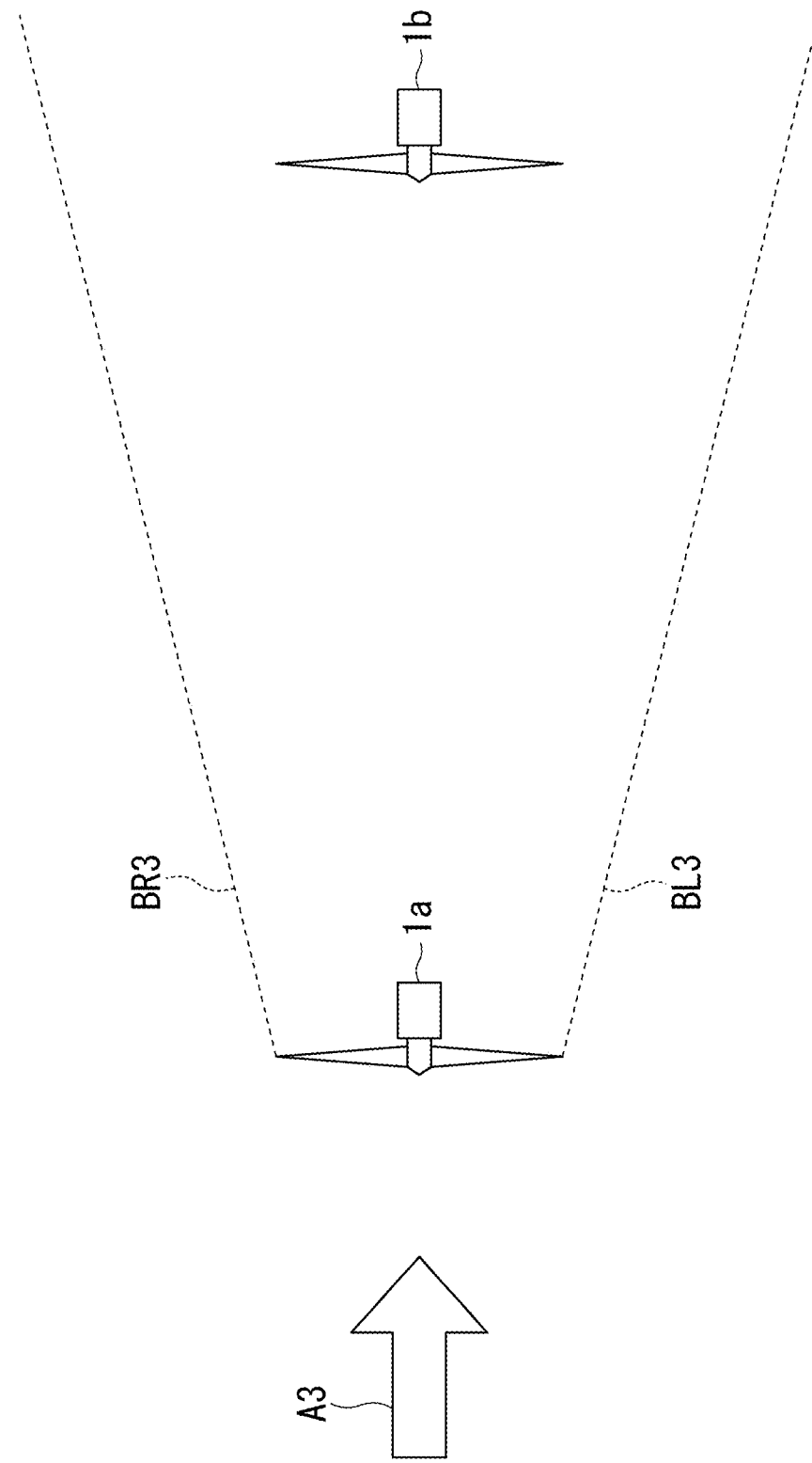
FIG. 21 is a diagram showing an example of a case where a second wind turbine is affected by a wake of the first wind turbine according to the embodiment of the present invention.

FIG. 21 is a diagram showing an example of a case where the second wind turbine is affected by the wake of the first wind turbine according to the embodiment of the present invention. An arrow A3 shown in FIG. 21 indicates an incoming wind blowing from the front to the rotating surface of the first wind turbine 1a. A region sandwiched between a dotted line BR3 and a dotted line BL3 shown in FIG. 21 is a wake passage region through which the wake of the first wind turbine 1a passes. On the other hand, in FIG. 21, a region above the dotted line BR3 and a region below the dotted line BL3 are free stream regions through which free streams pass. For example, as shown in FIG. 21, when the position of the second wind turbine 1b indicated in the wind turbine position data is included in the wake passage region, the determination unit 12 determines that the second wind turbine 1b is affected by the first wind turbine 1a.

Figure 22:
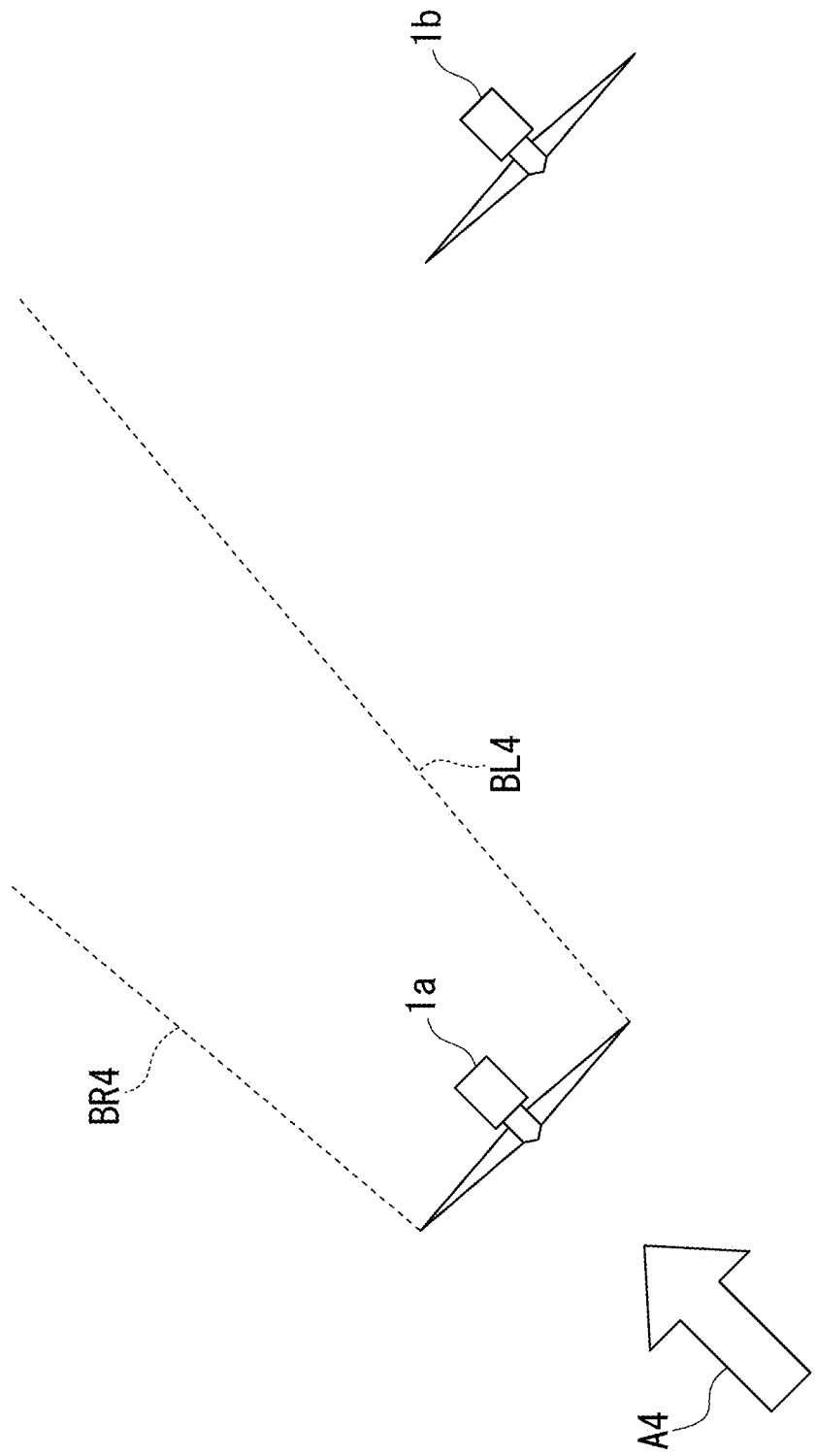
FIG. 22 is a diagram showing an example of a case where the second wind turbine is not affected by the wake of the first wind turbine according to the embodiment of the present invention.

FIG. 22 is a diagram showing an example of a case where the second wind turbine is not affected by the wake of the first wind turbine according to the embodiment of the present invention. FIG. 22 shows a case where the wind is incoming as indicated by an arrow A4. A region sandwiched between a dotted line BR4 and a dotted line BL4 shown in FIG. 22 is a wake passage region through which the wake of the first wind turbine 1a passes. On the other hand, in FIG. 22, a region above the dotted line BR4 and a region below the dotted line BL4 are free stream regions through which free streams pass. For example, as shown in FIG. 22, when the position of the second wind turbine 1b indicated in the wind turbine position data is not included in the wake passage region, the determination unit 12 determines that the second wind turbine 1b is not affected by the first wind turbine 1a.

However, the determination unit 12 may determine that the second wind turbine 1b is not affected by the first wind turbine 1a even if the position of the second wind turbine 1b indicated in the wind turbine position data is included in the wake passage region indicated in the wake passage region data.

For example, the determination unit 12 may determine that the second wind turbine 1b is not affected by the first wind turbine 1a when a turbulent flow intensity of the incoming wind or the wake of the first wind turbine 1a is relatively large even if the position of the second wind turbine 1b indicated in the wind turbine position data is included in the wake passage region indicated in the wake passage region data. Alternatively, even if the position of the second wind turbine 1b indicated in the wind turbine position data is included in the wake passage region indicated in the wake passage region data, the determination unit 12 may determine that the second wind turbine 1b is not affected by the first wind turbine 1a when the influence of the wake of the first wind turbine 1a is considered to be insignificant in consideration of the information indicated in the wind turbine design data. Alternatively, even if the position of the second wind turbine 1b indicated in the wind turbine position data is included in the wake passage region indicated in the wake passage region data, the determination unit 12 may determine that the second wind turbine 1b is not affected by the first wind turbine 1a when the influence of the wake of the first wind turbine 1a is considered to be insignificant in consideration of the information indicated in the wind turbine control data.

Figure 23:
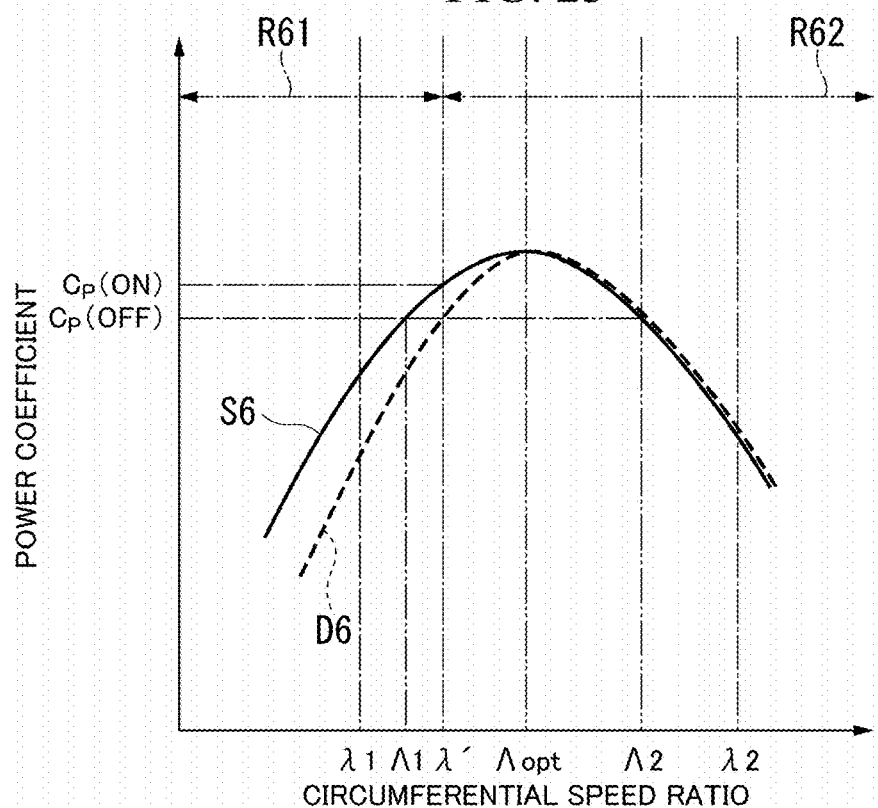
FIG. 23 is a diagram showing an example of a relationship between a tip speed ratio and a power coefficient when plasma electrodes are generating a plasma and a relationship between a tip speed ratio and a power coefficient when the plasma electrodes are generating no plasma according to the embodiment of the present invention.

FIG. 23 is a diagram showing an example of a relationship between a tip speed ratio and a power coefficient when plasma electrodes are generating a plasma and a relationship between a tip speed ratio and a power coefficient when the plasma electrodes are generating no plasma according to the embodiment of the present invention. In FIG. 23, the horizontal axis represents the tip speed ratio λ of the first wind turbine 1a and the vertical axis represents the power coefficient Cp of the first wind turbine 1a. The power coefficient Cp is a physical quantity indicating the electric power generated by the power generator connected to the rotor of the first wind turbine 1a when the incoming wind of the wind speed U described above flows into the first wind turbine 1a. The power coefficient Cp is represented by the following Eq. (11) including an output P of the power generator, a density ρ of air, a wind speed U, and an area S of the rotating surface of the first wind turbine 1a.

[Math. 11]

$$Cp = \frac{P}{(1/2)\rho SU^3} \tag{11}$$

A solid line S6 shown in FIG. 23 shows the relationship between the tip speed ratio λ and the power coefficient Cp when the plasma electrodes 510, the plasma electrodes 520, and the plasma electrodes 530 are generating a plasma. On the other hand, a broken line D6 shown in FIG. 23 indicates the relationship between the tip speed ratio λ and the power coefficient Cp when the plasma electrodes 510, the plasma electrodes 520, and the plasma electrodes 530 are generating no plasma. The relationship indicated by the solid line S6 and the relationship indicated by the broken line D6 are both experimentally obtained relationships.

The relationship indicated by the solid line S6 and the relationship indicated by the broken line D6 can be acquired in, for example, the following method. The first wind turbine 1a measures and acquires the output P of the power generator, the above-described wind speed U, and the angular velocity Ω of the rotor while switching between a state in which a plasma is being generated and a state in which no plasma is being generated at prescribed intervals. Also, if the above-described wind speed U cannot be measured, the first wind turbine 1a may substitute the wind speed measured by the wind direction meter 6 and the anemometer 7 for the wind speed U. As for plasma conditions in the state in which a plasma is being generated, the fundamental frequency, the duty ratio, and the modulation frequency of the voltage applied between the two facing electrodes may be fixed or controlled under some condition. Further, in these two states, a wind direction, a blow-up angle, a turbulent flow intensity, a wind shear, a wind via, a pitch angle, and the like of the incoming wind of the first wind turbine 1a are approximately uniform. If it is difficult to acquire data only under the conditions in which the above various types of conditions are uniform in the two states, it is also possible to acquire data including the conditions in which the various types of conditions are not uniform and extract only data in which various types of conditions are uniform to compare the data as post-processing.

The blow-up angle is an angle of the incoming wind of the first wind turbine 1a with respect to a horizontal plane. The wind shear is a wind speed distribution of the incoming wind of the first wind turbine 1a in a height direction of the first wind turbine 1a and is affected by the roughness of the sea surface or the ground surface on a windward side of the first wind turbine 1a. The wind via is a wind direction distribution of the incoming wind of the first wind turbine 1a in the height direction of the first wind turbine 1a and is constant normally when the first wind turbine 1a is installed on the ocean.

As shown in FIG. 23, in a range R61 where a tip speed ratio λ of the first wind turbine 1a is less than a tip speed ratio λ', a difference between a power coefficient Cp (ON) in a state in which a plasma is being generated and a power coefficient Cp (OFF) in a state in which a no plasma is being generated exceeds a prescribed threshold value. On the other hand, in a range R62 where the tip speed ratio λ of the first wind turbine 1a is greater than or equal to the tip speed ratio λ', the difference is less than or equal to the prescribed threshold value. Also, the prescribed threshold value mentioned herein is a threshold value that can be used for determining whether or not the difference between the power coefficient Cp (ON) and the power coefficient Cp (OFF) of the first wind turbine 1a has a significant magnitude. A tip speed ratio λ1 shown in FIG. 23 is an example of a tip speed ratio less than the tip speed ratio λ'. Also, a tip speed ratio λ2 shown in FIG. 23 is an example of a tip speed ratio that is greater than or equal to the tip speed ratio λ'.

When it is determined that the second wind turbine 1b is affected by the wake of the first wind turbine 1a, the control unit 14 controls the first wind turbine 1a so that the tip speed ratio λ of the first wind turbine 1a is included in the range R61 where the difference between the power coefficient Cp (ON) and the power coefficient Cp (OFF) of the first wind turbine 1a exceeds the prescribed threshold value. Also, the control unit 14 controls the plasma electrodes 510, the plasma electrodes 520, and the plasma electrodes 530 so that a plasma is generated at the same time when control thereof is executed. According to these two control processes, the power coefficient Cp of the first wind turbine 1a becomes a value indicated by a point on the solid line S6 belonging to the range R61 within the solid line S6 shown in FIG. 23.

Figure 24:
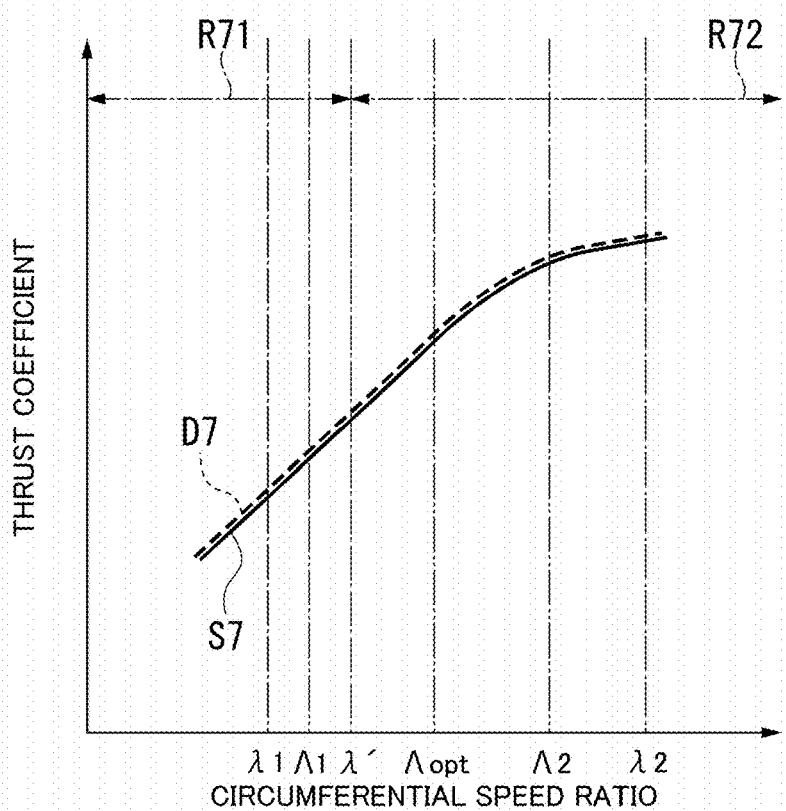
FIG. 24 is a diagram showing an example of a relationship between a tip speed ratio and a thrust coefficient when plasma electrodes are generating a plasma and a relationship between a tip speed ratio and a thrust coefficient when the plasma electrodes are generating no plasma according to the embodiment of the present invention.

FIG. 24 is a diagram showing an example of a relationship between a tip speed ratio and a thrust coefficient when plasma electrodes are generating a plasma and a relationship between a tip speed ratio and a thrust coefficient when the plasma electrodes are generating no plasma according to the embodiment of the present invention. In FIG. 24, the horizontal axis represents a tip speed ratio λ of the first wind turbine 1a and the vertical axis represents a thrust coefficient Ct of the first wind turbine 1a. The thrust coefficient Ct is a physical quantity indicating the magnitude of the thrust force received by the first wind turbine 1a when the incoming wind of the wind speed U flows into the first wind turbine 1a. The thrust coefficient Ct is expressed by the following Eq. (12) including the thrust force T received by the first wind turbine 1a from the incoming wind having a wind speed U, a density ρ of air, a wind speed U and an area S of the rotating surface of the first wind turbine 1a.

[Math. 12]

$$C_T = \frac{T}{(1/2)\rho S U^3} \quad (12)$$

A solid line S7 shown in FIG. 24 indicates a relationship between the tip speed ratio λ and the thrust coefficient Ct when the plasma electrodes 510, the plasma electrodes 520, and the plasma electrodes 530 are generating a plasma. On the other hand, a broken line D7 shown in FIG. 24 indicates a relationship between the tip speed ratio λ and the thrust coefficient Ct when the plasma electrodes 510, the plasma electrodes 520, and the plasma electrodes 530 are generating no plasma. Also, the relationship indicated by the solid line S7 and the relationship indicated by the broken line D7 are both experimentally obtained relationships.

A range R71 shown in FIG. 24 is a range in which the tip speed ratio λ of the first wind turbine 1a is less than the tip speed ratio λ' and corresponds to the range R61 shown in FIG. 23. On the other hand, the range R72 shown in FIG. 24 is a range in which the tip speed ratio λ of the first wind turbine 1a is greater than or equal to the tip speed ratio λ' and corresponds to the range R62 shown in FIG. 23. The tip speed ratio λ1 shown in FIG. 24 is an example of a tip speed ratio less than the tip speed ratio λ', as in FIG. 23. Also, the tip speed ratio λ2 shown in FIG. 24 is an example of a tip speed ratio greater than or equal to the tip speed ratio λ', as in FIG. 23. As indicated by the solid line S7 and the broken line D7 in FIG. 24, it can be seen that the thrust coefficient Ct is approximately the same regardless of whether or not a plasma is being generated in both the range R71 and the range R72.

On the other hand, as indicated by the solid line S6 and the broken line D7 in FIG. 23, it can be seen that the power coefficient Cp is larger in the range R61 when the plasma is being generated than when no plasma is being generated and that the magnitude of the power coefficient Cp is approximately the same regardless of whether or not the plasma is being generated in the range R62. For example, as indicated by the solid line S6 and the broken line D6 in FIG. 23, the power coefficient Cp increases when a plasma is being generated if the first wind turbine 1a is operated at the tip speed ratio λ1 less than the tip speed ratio λ'. Also, as indicated by the solid line S6 and the broken line D6 in FIG. 23, the power coefficient Cp is approximately the same regardless of whether or not a plasma is being generated if the first wind turbine 1a operates at the tip speed ratio λ2 greater than or equal to the tip speed ratio λ'.

That is, referring to FIGS. 23 and 24, it can be seen that it is possible to limit an increase in the thrust force T received from the incoming wind by the first wind turbine 1a while increasing the output P of the power generator connected to the rotor of the first wind turbine 1a as compared with the time of plasma stop by generating a plasma and making the tip speed ratio λ less than the tip speed ratio λ'. Also, for example, referring to FIGS. 23 and 24, it can be seen that, when the tip speed ratio λ has changed from a tip speed ratio Λ2 to a tip speed ratio Λ1, the first wind turbine 1a can reduce the thrust coefficient Ct while maintaining the power coefficient Cp. In this case, if no plasma is generated, the blades 51, 52, and 53 all vibrate due to the angle of attack α exceeding the stall angle $\alpha_S$ and flow separation, resulting in accumulation of fatigue. Further, this vibration is transferred to a support shaft, a gear, a bearing, the power generator, and the like housed in the nacelle 3 and the hub 4, and causes these mechanical elements to be fatigued. On the other hand, in this case, when a plasma is generated, the blades 51, 52, and 53 do not all accumulate fatigue due to vibrations because flow separation is limited by the plasma even if the angle of attack α exceeds the stall angle $\alpha_S$. Therefore, the first wind turbine 1a can maintain the power coefficient Cp and reduce the thrust coefficient Ct while avoiding the disadvantage due to the flow separation by generating the plasma.

Figure 25:
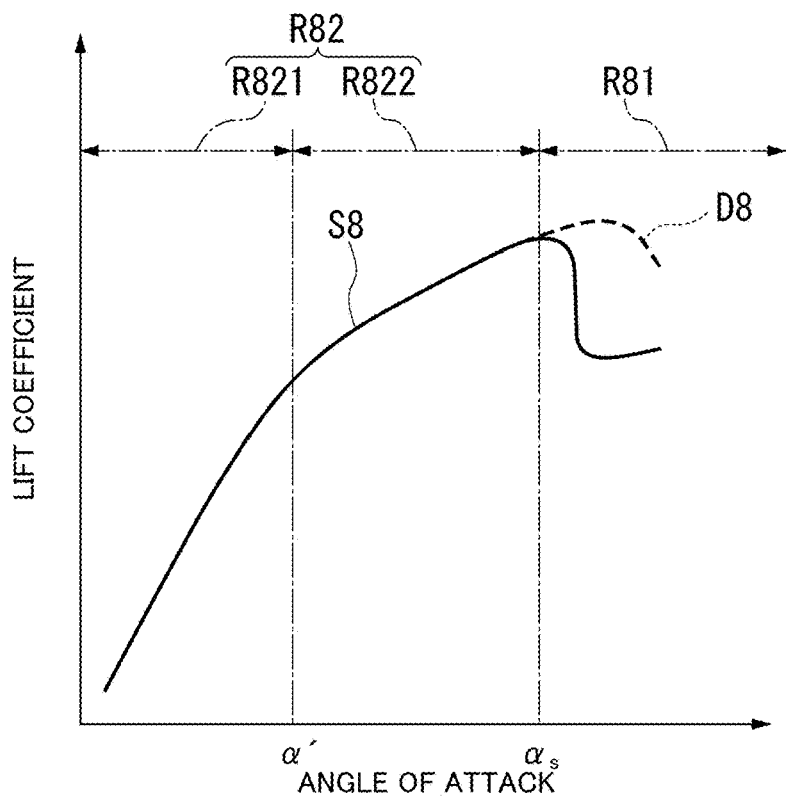
FIG. 25 is a diagram showing an example of a relationship between an angle of attack and a lift coefficient when an airfoil of the blade element provided in the first wind turbine is of a trailing-edge flow separation type according to the embodiment of the present invention.

FIG. 25 is a diagram showing an example of a relationship between an angle of attack and a lift coefficient when an airfoil of the blade element provided in the first wind turbine is of a trailing-edge flow separation type according to the embodiment of the present invention. FIG. 25 shows the angle of attack α of the blade element, and the vertical axis represents a lift coefficient CL of the blade element. A broken line D8 shown in FIG. 25 indicates a relationship between the angle of attack α and the lift coefficient CL when a plasma is being generated. On the other hand, a solid line S8 shown in FIG. 25 indicates a relationship between the angle of attack α and the lift coefficient CL when no plasma is being generated.

A range R81 shown in FIG. 25 is a range in which the angle of attack α of the blade element exceeds the stall angle $α_S$. On the other hand, a range R82 shown in FIG. 25 includes a range R821 in which the angle of attack α of the blade element is less than an angle of attack α' and a range R822 in which the angle of attack α is greater than or equal to the angle of attack α' and is less than or equal to the stall angle $α_S$.

Also, when the angle of attack of the blade element at a prescribed radial position falls within the range R81 shown in FIG. 25 in at least one of the blade 51, the blade 52, and the blade 53, the power coefficient Cp of the first wind turbine 1a can be adjusted so that it falls within the range R61 shown in FIG. 6 and the thrust coefficient Ct of the first wind turbine 1a can be adjusted so that it falls within the range R71 shown in FIG. 7. Likewise, when the angle of attack falls within the range R82 shown in FIG. 25, the power coefficient Cp of the first wind turbine 1a can be adjusted so that it falls within the range R62 shown in FIG. 6 and the thrust coefficient Ct of the first wind turbine 1a can be adjusted so that it falls within the range R72 shown in FIG. 7.

As indicated by the solid line S8 and the broken line D8 in FIG. 25, in the range R821, the lift coefficients CL of the blade 51, the blade 52, and the blade 53 increase in accordance with an increase of the angle of attack α regardless of whether or not a plasma is being generated. Although the lift coefficient CL increases in accordance with the increase in the angle of attack α regardless of whether or not a plasma is being generated in the range R822, a ratio of an increase in the lift coefficient CL with respect to an increase in the angle of attack α is low as compared with the range R821. This is because, in the range R822, a flow separation point generated at a trailing edge of the blade element is in a state of trailing-edge flow separation that gradually moves to the leading edge. Also, according to the airfoil, the lift coefficient CL may become approximately constant or slightly decrease even if the angle of attack α increases in the range R822.

Also, as indicated by the solid line S8 in FIG. 25, in the range R81, the lift coefficient CL rapidly decreases due to flow separation if the angle of attack α exceeds the stall angle $α_S$ and therefore the flow is separated when no plasma is being generated. On the other hand, as indicated by the broken line D8 in FIG. 25, in the range R81, the lift coefficient CL is maintained to some extent because the flow is attracted to the blade surface according to the action of the disturbance generated at the leading edge of the blade element even if the angle of attack α exceeds the stall angle $α_S$ when a plasma is being generated.

The control unit 14 controls the first wind turbine 1a so that the angle of attack α is included in a range of more than the stall angle $α_S$ in the blade elements at prescribed radial positions of the blade 51, the blade 52, and the blade 53. That is, the control unit 14 controls the first wind turbine 1a so that the angle of attack α is included in the range R81 shown in FIG. 25 at the blade elements at prescribed radial positions of the blade 51, the blade 52, and the blade 53. Thereby, as described above, the control unit 14 controls the first wind turbine 1a so that the tip speed ratio λ of the first wind turbine 1a is included in a range in which a difference between the power coefficient Cp (ON) and the power coefficient Cp (OFF) of the first wind turbine 1a exceeds a prescribed threshold value.

Also, when the airfoil of each of the blade 51, the blade 52, and the blade 53 is of a trailing-edge flow separation type and no plasma is generated, the control unit 14 may control the first wind turbine 1a so that the angle of attack α is included in a range of the stall angle $α_S$ or less in the blade element at a prescribed radial position of each of the blade 51, the blade 52, and the blade 53. That is, in this case, the control unit 14 controls the first wind turbine 1a so that the angle of attack α is included in the range R82 shown in FIG. 25 in the blade element at the prescribed radial position of each of the blade 51, the blade 52, and the blade 53. For example, the control unit 14 controls the torque of the power generator provided in the first wind turbine 1a or the pitch angles of the blade 51, the blade 52, and the blade 53, so that the angle of attack α is included in the range R82 shown in FIG. 25 in the blade element of the prescribed radial position of each of the blades 51, the blades 52, and the blades 53. Thereby, the control unit 14 avoids a situation in which the blades 51, 52, and 53 stall and the output P of the power generator provided in the first wind turbine 1a decreases rapidly when no plasma is generated.

Further, when the airfoil of the blade 51 is of a trailing-edge flow separation type and no plasma is generated, it is preferable that the control unit 14 control the first wind turbine 1a so that the angle of attack α is included in the range R822 rather than the range R821 shown in FIG. 25 in the blade element at a prescribed radial position of each of the blade 51, the blade 52, and the blade 53. This is because, as shown in FIG. 25, an amount of change in the lift coefficient CL with respect to the amount of change in the angle of attack α is smaller in the range R822 than in the range R821 and the output P of the power generator provided in the first wind turbine 1a can be made more stable.

The case where no plasma is generated mentioned herein is, for example, the case where at least one of the plasma electrodes 510, the plasma electrodes 520, the plasma electrodes 530, and facilities attached to these plasma electrodes cannot generate a plasma normally due to a failure, a malfunction, or the like. Alternatively, the case where no plasma is generated mentioned herein is the case where it is preferable that no plasma be generated due to restrictions on the weather, restrictions on the control of the first wind turbine 1a, and the like. Alternatively, the case where no plasma is generated mentioned herein is the case where the operator of the first wind turbine 1a using the plasma is unfamiliar and the like.

Figure 26:
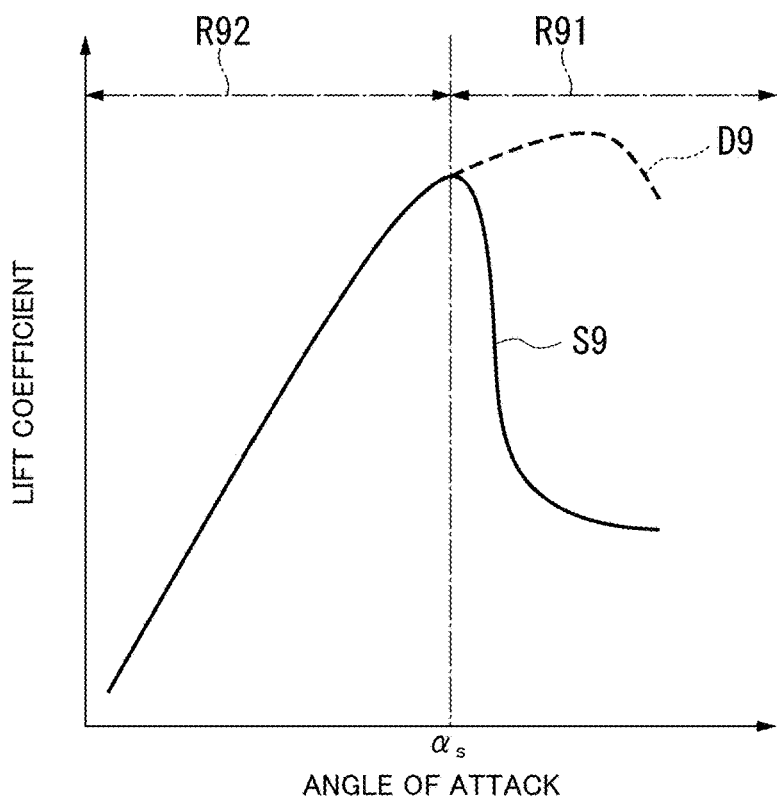
FIG. 26 is a diagram showing an example of a relationship between an angle of attack and a lift coefficient when an airfoil of the blade element provided in the first wind turbine is of a leading-edge flow separation type according to the embodiment of the present invention.

FIG. 26 is a diagram showing an example of a relationship between an angle of attack and a lift coefficient when an airfoil of the blade element provided in the first wind turbine is of a leading-edge flow separation type according to the embodiment of the present invention. In FIG. 26, the horizontal axis represents the angle of attack α of the blade element and the vertical axis represents the lift coefficient CL of the blade element. A broken line D9 shown in FIG. 26 indicates a relationship between the angle of attack α and the lift coefficient CL when the plasma electrodes 510, the plasma electrodes 520, and the plasma electrodes 530 are generating a plasma. On the other hand, a solid line S9 shown in FIG. 26 indicates a relationship between the angle of attack α and the lift coefficient CL when the plasma electrodes 510, the plasma electrodes 520, and the plasma electrodes 530 are generating no plasma.

A range R91 shown in FIG. 26 is a range in which the angle of attack α of the blade element exceeds the stall angle $\alpha_S$. On the other hand, a range R92 shown in FIG. 26 is a range in which the angle of attack α of the blade element is less than or equal to the stall angle $\alpha_S$.

Also, when the angle of attack of the blade element at a prescribed radial position falls within the range R91 shown in FIG. 26 in at least one of the blade 51, the blade 52, and the blade 53, the power coefficient Cp of the first wind turbine 1a can be adjusted so that it falls within the range R61 shown in FIG. 6 and the thrust coefficient Ct of the first wind turbine 1a can be adjusted so that it falls within the range R71 shown in FIG. 24. Likewise, when the angle of attack falls within the range R92 shown in FIG. 26, the power coefficient Cp of the first wind turbine 1a can be adjusted so that it falls within the range R62 shown in FIG. 23 and the thrust coefficient Ct of the first wind turbine 1a can be adjusted so that it falls within the range R72 shown in FIG. 24.

As indicated by the solid line S9 and the broken line D9 in FIG. 26, in the range R92, the lift coefficient CL of each of the blade 51, the blade 52, and the blade 53 increases in accordance with an increase in an angle of attack α regardless of whether or not a plasma is being generated. Also, the lift coefficient CL in the region corresponding to the range R822 shown in FIG. 25 in the range R92 is larger than the lift coefficient CL when the airfoil of each of the blades 51, 52, and 53 is of a trailing-edge stall type.

Also, as indicated by the solid line S9 in FIG. 26, in the range R91, the lift coefficient CL rapidly decreases if the angle of attack α increases to an angle exceeding the stall angle $\alpha_S$ and therefore the flow is separated when no plasma is being generated. On the other hand, as indicated by the broken line D9 in FIG. 26, in the range R91, the lift coefficient CL is maintained to some extent because the flow is attracted to the blade surface according to the action of the disturbance generated at the leading edge of the blade element even if the angle of attack α increases to an angle exceeding the stall angle as when a plasma is being generated.

The control unit 14 controls the first wind turbine 1a so that the angle of attack α is included in a range of more than the stall angle $\alpha_S$ in the blade elements at prescribed radial positions of the blade 51, the blade 52, and the blade 53. That is, the control unit 14 controls the first wind turbine 1a so that the angle of attack α is included in the range R91 shown in FIG. 26. Thereby, as described above, the control unit 14 controls the first wind turbine 1a so that the tip speed ratio λ of the first wind turbine 1a is included in a range in which a difference between the power coefficient Cp (ON) and the power coefficient Cp (OFF) of the first wind turbine 1a exceeds a prescribed threshold value.

When the airfoil of each of the blade 51, the blade 52, and the blade 53 is of a leading-edge flow separation type and no plasma is generated, the control unit 14 may control the first wind turbine 1a so that the angle of attack α is included in a range less than stall angle $\alpha_S$ or less in the blade element at a prescribed radial position of each of the blade 51, the blade 52, and the blade 53. That is, in this case, the control unit 14 controls the first wind turbine 1a so that the angle of attack α is included in the range R92 shown in FIG. 26 in the blade element at a prescribed radial position of each of the blade 51, the blade 52, and the blade 53. Thereby, the control unit 14 avoids a situation in which the blades 51, 52, and 53 stall and the output P of the power generator provided in the first wind turbine 1a decreases rapidly when no plasma is generated.

The case where no plasma is generated mentioned herein is similar to three cases that are exemplified with reference to FIG. 25.

Figure 27:
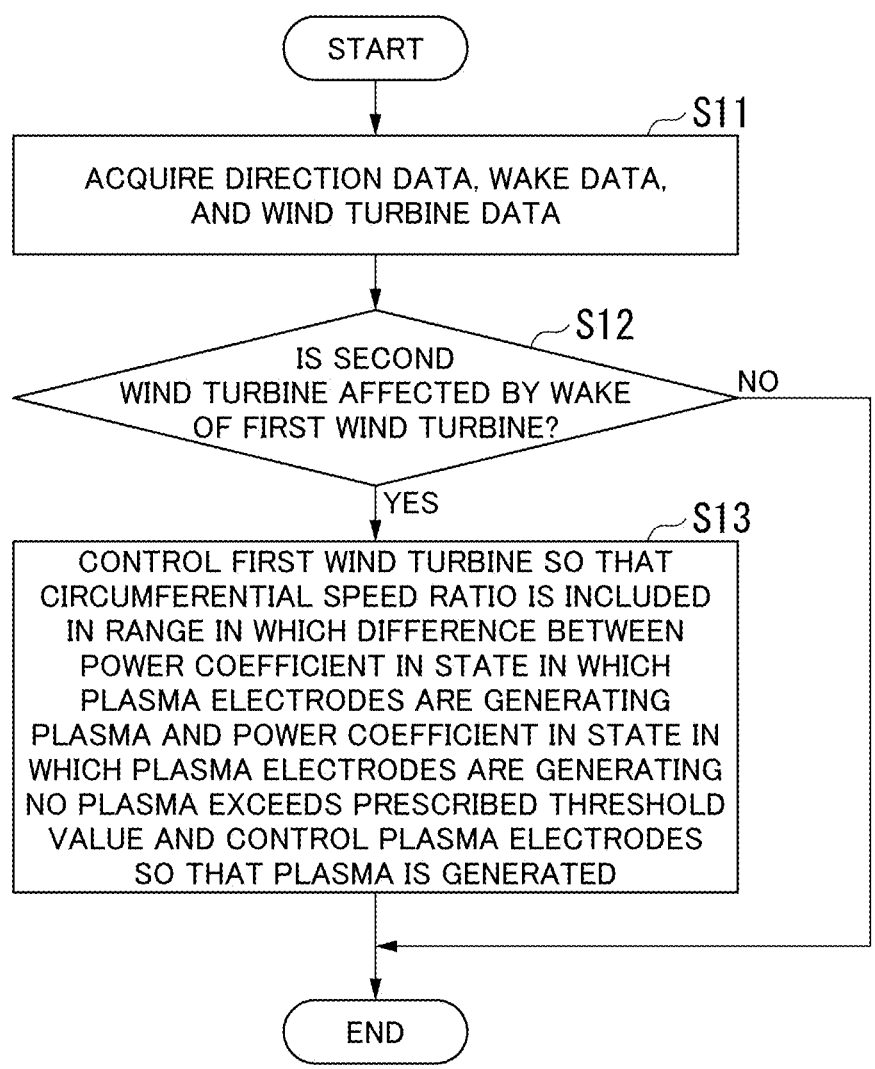
FIG. 27 is a flowchart for describing an example of a process executed by the wind turbine control device according to the embodiment of the present invention.

Next, an example of a process executed by the wind turbine control device will be described with reference to FIG. 27. FIG. 27 is a flowchart for describing an example of the process executed by the wind turbine control device according to the embodiment of the present invention. When there are a plurality of second wind turbines 1b, the wind turbine control device 10 executes the process shown in FIG. 27 for each second wind turbine 1b.

In step S11, the acquisition unit 11 acquires direction data, wake data, and wind turbine data.

In step S12, the determination unit 12 determines whether or not the second wind turbine 1b is affected by the wake of the first wind turbine 1a. When it is determined that the second wind turbine 1b is affected by the wake of the first wind turbine 1a (step S12: YES), the determination unit 12 moves the process to step S13. On the other hand, when it is determined that the second wind turbine 1b is not affected by the wake of the first wind turbine 1a (step S12: NO), the determination unit 12 causes the process to end.

In step S13, the control unit 14 controls the first wind turbine 1a so that the tip speed ratio λ is included in a range in which a difference between a power coefficient Cp (ON) in a state in which the plasma electrodes 510, the plasma electrodes 520, and the plasma electrodes 530 are generating a plasma and a power coefficient Cp (OFF) in a state in which the plasma electrodes 510, the plasma electrodes 520, and the plasma electrodes 530 are generating no plasma exceeds a prescribed threshold value. At the same time, in step S30, the control unit 14 controls the plasma electrodes 510, the plasma electrodes 520, and the plasma electrodes 530 so that a plasma is generated.

The wind turbine control device 10 according to the embodiment has been described above. The wind turbine control device 10 executes an operation history comparison process of comparing the operation history data at the time of plasma generation with the operation history data at the time of stopping plasma generation. The wind turbine control device 10 controls at least one of the first wind turbine 1a and the second wind turbine 1b different from the first wind turbine 1a on the basis of a result of the operation history determination process. Therefore, the wind turbine control device 10 can control the first wind turbine to which the plasma electrodes are installed in accordance with the relationship between the operation history when a plasma is being generated and the operation history when no plasma is being generated.

Also, the wind turbine control device 10 notifies that flow separation has occurred when it is determined that the result of the operation history comparison process satisfies a prescribed first condition. On the other hand, when it is determined that the result of the operation history comparison process does not satisfy the prescribed first condition, the wind turbine control device 10 notifies that no flow separation has occurred. Also, the wind turbine control device 10 acquires the operation history data at the time of plasma generation with the operation history data at the time of stopping plasma generation when the first wind turbine 1a is operating under rotational speed limitation control. Therefore, the wind turbine control device 10 can more accurately ascertain whether or not flow separation has occurred.

Also, the wind turbine control device 10 executes a wind condition comparison process for comparing wind condition data at the time of plasma generation with wind condition data at the time of stopping plasma generation and acquires the operation history data at the time of plasma generation and the operation history data at the time of stopping plasma generation when it is determined that a result of the wind condition comparison process satisfies a prescribed wind condition condition. Therefore, the wind turbine control device 10 can execute the above-described process in a state in which a wind condition difference falls within a certain range and can more accurately ascertain whether or not flow separation has occurred.

Also, the wind turbine control device 10 compares a statistical value of a physical quantity included in the operation history data at the time of plasma generation with a statistical value of a physical quantity included in the operation history data at the time of stopping plasma generation in the operation history comparison process. Therefore, even if it is difficult to determine whether or not there is a significant difference only by comparing the operation history data at the time of plasma generation with the operation history data at the time of stopping plasma generation, the wind turbine control device 10 can determine whether or not there is a significant difference between the two. Thus, the wind turbine control device 10 can more accurately ascertain whether or not flow separation has occurred.

Also, the wind turbine control device 10 acquires the operation history data at the time of plasma generation indicating a relationship between at least two types of physical quantities and the operation history data at the time of stopping plasma generation indicating a relationship between at least two types of physical quantities. Next, in the operation history determination process, the wind turbine control device 10 determines whether or not the prescribed first condition in which the relationship between at least two types of physical quantities indicated in the operation history data at the time of plasma generation and the relationship between at least two types indicated in the operation history data at the time of stopping plasma generation match within a prescribed range is satisfied. Therefore, the wind turbine control device 10 can determine whether or not there is a significant difference in the relationship between at least two types of physical quantities at the time of plasma generation and at the time of stopping plasma generation. Therefore, the wind turbine control device 10 can more accurately ascertain whether or not flow separation has occurred.

Also, the wind turbine control device 10 acquires second wind turbine operation history data indicating the operation history of the second wind turbine 1b. Next, the wind turbine control device 10 selects any of the execution of a process of changing only the control of the first wind turbine, the execution of a process of changing only the control of the second wind turbine, and the execution of a process of changing the control of the first wind turbine and the control of the second wind turbine on the basis of the result of the operation history determination process. Therefore, the wind turbine control device 10 can select a wind turbine whose control is changed in accordance with the second wind turbine operation history data in addition to the operation history data at the time of plasma generation and the operation history data at the time of stopping plasma generation.

Also, the wind turbine control device 10 acquires operation history data at the time of plasma generation indicating a relationship between an output and a wind speed of the first wind turbine 1a and operation history data at the time of stopping plasma generation indicating a relationship between an output and a wind speed of the first wind turbine 1a. Next, the wind turbine control device 10 adjusts a control parameter related to a control characteristic for the output when it is determined that the result of the operation history comparison process satisfies the prescribed first condition. The wind turbine control device 10 selects the execution of the process of changing only the control of the first wind turbine 1a and controls the first wind turbine 1a using the adjusted control parameter. Therefore, the wind turbine control device 10 can control the first wind turbine 1a while more accurately ascertaining whether or not flow separation has occurred using the output and the wind speed U of the first wind turbine 1a, which directly affect the rotational speed $\omega$ of the power generator connected to the first wind turbine 1a in the above-described process.

Also, the wind turbine control device 10 acquires operation history data at the time of plasma generation indicating a relationship between a rotational speed and torque Tg of the first wind turbine 1a and operation history data at the time of stopping plasma generation indicating a relationship between a rotational speed and torque Tg of the wind turbine. Next, the wind turbine control device 10 adjusts a control parameter related to a control characteristic for the torque Tg when it is determined that a result of the operation history comparison process satisfies the prescribed first condition. The wind turbine control device 10 selects the execution of the process of changing only the control of the first wind turbine 1a and controls the first wind turbine 1a using the adjusted control parameter. Therefore, the wind turbine control device 10 can clarify that flow separation is caused due to the control of the torque Tg and control the first wind turbine 1a while limiting the occurrence of the above-described phenomenon.

Also, the wind turbine control device 10 acquires operation history data at the time of plasma generation indicating a relationship between a rotational speed $\omega$ and a pitch angle $\beta$ of the first wind turbine 1a and an operation history data at the time of stopping plasma generation indicating a relationship between a rotational speed $\omega$ and a pitch angle $\beta$ of the wind turbine. Next, the wind turbine control device 10 adjusts a control parameter related to a control characteristic for the pitch angle $\beta$ when it is determined that a result of the operation history comparison process satisfies the prescribed first condition. The wind turbine control device 10 selects the execution of the process of changing only the control of the first wind turbine 1a and controls the first wind turbine 1a using the adjusted control parameter. Therefore, the wind turbine control device 10 can clarify that flow separation is caused due to the control of the pitch angle $\beta$ and control the first wind turbine 1a while limiting the occurrence of the above-described phenomenon.

Also, the wind turbine control device 10 acquires operation history data at the time of plasma generation indicating a relationship between a tip speed ratio $\lambda$ and a power coefficient Cp of the first wind turbine 1a and operation history data at the time of stopping plasma generation indicating a relationship between a tip speed ratio $\lambda$ and a power coefficient Cp of the first wind turbine 1a. Next, the wind turbine control device 10 adjusts a control parameter related to a control characteristic for the tip speed ratio $\lambda$ when it is determined that a result of the operation history comparison process satisfies the prescribed first condition. The wind turbine control device 10 selects the execution of the process of changing only the control of the first wind turbine 1a and controls the first wind turbine 1a using the adjusted control parameter. Therefore, the wind turbine control device 10 can clarify that flow separation is caused due to the control of the tip speed ratio λ and control the first wind turbine 1a while limiting the occurrence of the above-described phenomenon.

Also, the wind turbine control device 10 acquires operation history data at the time of plasma generation indicating a relationship between a tip speed ratio λ and a wind speed of the first wind turbine 1a and operation history data at the time of stopping plasma generation indicating a relationship between a tip speed ratio λ and a wind speed of the first wind turbine 1a. Next, the wind turbine control device 10 adjusts a control parameter related to a control characteristic for the tip speed ratio λ when it is determined that a result of the operation history comparison process satisfies the prescribed first condition. The wind turbine control device 10 selects the execution of the process of changing only the control of the first wind turbine 1a and controls the first wind turbine 1a using the adjusted control parameter. Therefore, the wind turbine control device 10 can clarify that flow separation is caused due to the control of the tip speed ratio λ and control the first wind turbine 1a while limiting the occurrence of the above-described phenomenon.

Also, the wind turbine control device 10 acquires operation history data at the time of plasma generation indicating a relationship between an output and a wind speed of the first wind turbine 1a and operation history data at the time of stopping plasma generation indicating a relationship between an output and a wind speed of the first wind turbine 1a. Next, the wind turbine control device 10 adjusts at least one of the control parameter related to the control characteristic for the output, the control parameter related to the control characteristic for the torque Tg, the control parameter related to the control characteristic for the pitch angle β, and the control parameter related to the control characteristic for the tip speed ratio λ. The wind turbine control device 10 selects the execution of the process of changing only the control of the first wind turbine 1a and controls the first wind turbine 1a using the adjusted control parameter. Thereby, the wind turbine control device 10 can comprehensively determine the operation history data and control the first wind turbine 1a while more accurately ascertaining whether or not flow separation has occurred.

Also, the wind turbine control device 10 acquires operation history data at the time of plasma generation indicating a relationship between a rotational speed and torque Tg of the first wind turbine 1a and operation history data at the time of stopping plasma generation indicating a relationship between a rotational speed and torque Tg of the wind turbine. Next, the wind turbine control device 10 adjusts at least one of the control parameter related to the control characteristic for the output, the control parameter related to the control characteristic for the torque Tg, the control parameter related to the control characteristic for the pitch angle β, and the control parameter related to the control characteristic for the tip speed ratio λ. The wind turbine control device 10 selects the execution of the process of changing only the control of the first wind turbine 1a and controls the first wind turbine 1a using the adjusted control parameter. Thereby, the wind turbine control device 10 can comprehensively determine the operation history data and control the first wind turbine 1a while more accurately ascertaining whether or not flow separation has occurred.

Also, the wind turbine control device 10 acquires operation history data at the time of plasma generation indicating a relationship between a rotational speed ω and a pitch angle β of the first wind turbine 1a and operation history data at the time of stopping plasma generation indicating a relationship between a rotational speed ω and a pitch angle β of the wind turbine. Next, the wind turbine control device 10 adjusts at least one of the control parameter related to the control characteristic for the output, the control parameter related to the control characteristic for the torque Tg, the control parameter related to the control characteristic for the pitch angle β, and the control parameter related to the control characteristic for the tip speed ratio λ. The wind turbine control device 10 selects the execution of the process of changing only the control of the first wind turbine 1a and controls the first wind turbine 1a using the adjusted control parameter. Thereby, the wind turbine control device 10 can comprehensively determine the operation history data and control the first wind turbine 1a while more accurately ascertaining whether or not flow separation has occurred.

Also, the wind turbine control device 10 acquires operation history data at the time of plasma generation indicating a relationship between a tip speed ratio λ and a power coefficient Cp of the first wind turbine 1a and operation history data at the time of stopping plasma generation indicating a relationship between a tip speed ratio λ and a power coefficient Cp of the first wind turbine 1a. Next, the wind turbine control device 10 adjusts at least one of the control parameter related to the control characteristic for the output, the control parameter related to the control characteristic for the torque Tg, the control parameter related to the control characteristic for the pitch angle β, and the control parameter related to the control characteristic for the tip speed ratio λ. The wind turbine control device 10 selects the execution of the process of changing only the control of the first wind turbine 1a, and controls the first wind turbine 1a using the adjusted control parameter. Thereby, the wind turbine control device 10 can comprehensively determine the operation history data and control the first wind turbine 1a while more accurately ascertaining whether or not flow separation has occurred.

Also, the wind turbine control device 10 acquires operation history data at the time of plasma generation indicating a relationship between a tip speed ratio λ and a power coefficient Cp of the first wind turbine 1a and operation history data at the time of stopping plasma generation indicating a relationship between a tip speed ratio λ and a power coefficient Cp of the first wind turbine 1a. Next, the wind turbine control device 10 adjusts at least one of the control parameter related to the control characteristic for the output, the control parameter related to the control characteristic for the torque Tg, the control parameter related to the control characteristic for the pitch angle β, and the control parameter related to the control characteristic for the tip speed ratio λ. The wind turbine control device 10 selects the execution of the process of changing only the control of the first wind turbine 1a, and controls the first wind turbine 1a using the adjusted control parameter. Thereby, the wind turbine control device 10 can comprehensively determine the operation history data and control the first wind turbine 1a while more accurately ascertaining whether or not flow separation has occurred.

Also, the wind turbine control device 10 acquires operation history data at the time of plasma generation indicating a relationship between a tip speed ratio λ and a wind speed of the first wind turbine 1a and operation history data at the time of stopping plasma generation indicating a relationship between a tip speed ratio λ and a wind speed of the first wind turbine 1a. Next, the wind turbine control device 10 adjusts at least one of the control parameter related to the control characteristic for the output, the control parameter related to the control characteristic for the torque Tg, the control parameter related to the control characteristic for the pitch angle β, and the control parameter related to the control characteristic for the tip speed ratio λ. The wind turbine control device 10 selects the execution of the process of changing only the control of the first wind turbine 1a and controls the first wind turbine 1a using the adjusted control parameter. Thereby, the wind turbine control device 10 can comprehensively determine the operation history data and control the first wind turbine 1a while more accurately ascertaining whether or not flow separation has occurred.

Also, the wind turbine control device 10 acquires second wind turbine operation history data indicating a relationship between a wind speed of the second wind turbine 1b and an occurrence frequency of the wind speed of the second wind turbine 1b. Next, the wind turbine control device 10 determines whether or not the operation history of the second wind turbine 1b indicated in the second wind turbine operation history data satisfies a prescribed second condition. The wind turbine control device 10 selects the execution of the process of changing only the control of the second wind turbine 1b. Therefore, the wind turbine control device 10 can control the second wind turbine 1b in accordance with the relationship between the wind speed of the second wind turbine 1b and the occurrence frequency of the wind speed of the second wind turbine 1b.

Also, the wind turbine control device 10 acquires second wind turbine operation history data indicating a relationship between an output and a wind speed of the second wind turbine 1b. Next, the wind turbine control device 10 determines whether or not the operation history of the second wind turbine indicated in the operation history data of the second wind turbine 1b satisfies the prescribed second condition. The wind turbine control device 10 selects the execution of the process of changing only the control of the second wind turbine 1b. Therefore, the wind turbine control device 10 can control the second wind turbine 1b in accordance with the relationship between the output of the second wind turbine 1b and the wind speed of the second wind turbine 1b.

Also, the wind turbine control device 10 acquires second wind turbine operation history data indicating a relationship between a rotational speed, torque, or a wind speed of the second wind turbine 1b and vibrations or distortion of the second wind turbine 1b. Next, the wind turbine control device 10 determines whether or not the operation history of the second wind turbine 1b indicated in the second wind turbine operation history data satisfies the prescribed second condition. The wind turbine control device 10 selects the execution of the process of changing only the control of the second wind turbine 1b. Therefore, the wind turbine control device 10 can control the second wind turbine 1b in accordance with the relationship between the rotational speed, the torque, or the wind speed of the second wind turbine 1b and the vibrations or distortion of the second wind turbine 1b.

Also, the wind turbine control device 10 acquires operation history data at the time of plasma generation indicating a relationship between a wind speed of the first wind turbine 1a and an occurrence frequency of the wind speed of the first wind turbine 1a and operation history data at the time of stopping plasma generation indicating a relationship between a wind speed of the first wind turbine 1a and an occurrence frequency of the wind speed of the first wind turbine 1a and acquires operation history data of the second wind turbine 1b indicating a relationship between a wind speed of the second wind turbine 1b and an occurrence frequency of the wind speed of the second wind turbine 1b. Next, the wind turbine control device 10 determines whether or not the operation history of the second wind turbine 1b indicated in the operation history data of the second wind turbine 1b satisfies the prescribed second condition. The execution of the process of changing the control of the first wind turbine 1a and the control of the second wind turbine 1b is selected. Therefore, the wind turbine control device 10 can control the first wind turbine 1a and the second wind turbine 1b in accordance with the relationship between the wind speed of the first wind turbine 1a and the occurrence frequency of the wind speed of the first wind turbine 1a and the operation history of the second wind turbine 1b.

Also, when it is determined that the result of the operation history comparison process satisfies the prescribed first condition, the wind turbine control device 10 notifies that the plasma electrodes 510, the plasma electrodes 520, and the plasma electrodes 530 are recommended to remain installed on the blade 51, the blade 52, and the blade 53, respectively. Therefore, the wind turbine control device 10 can limit the occurrence of flow separation using these three plasma electrodes. Also, if the plasma electrodes 510, the plasma electrodes 520, and the plasma electrodes 530 are divided in a span direction and the above-described process is performed for each span, it is possible to determine a position of flow separation on the blade 51, the blade 52, or the blade 53 where flow separation has occurred.

Also, when it is determined that the result of the operation history comparison process satisfies the prescribed first condition, the wind turbine control device 10 notifies that it is recommended to continue a state in which a plasma is being generated by the plasma electrodes 510, the plasma electrodes 520, and the plasma electrodes 530. Therefore, the wind turbine control device 10 can limit the occurrence of flow separation using these three plasma electrodes.

Also, when it is determined that the result of the operation history comparison process does not satisfy the prescribed first condition, the wind turbine control device 10 notifies that the plasma electrodes 510, the plasma electrodes 520, and the plasma electrodes 530 may be removed from the blade 51, the blade 52, and the blade 53, respectively. Therefore, the wind turbine control device 10 can reduce the electric power required to drive these three plasma electrodes.

Also, when it is determined that the result of the operation history comparison process does not satisfy the prescribed first condition, the wind turbine control device 10 notifies that it is recommended to continue a state in which no plasma is being generated by the plasma electrodes 510, the plasma electrodes 520, and the plasma electrodes 530. Therefore, the wind turbine control device 10 can reduce the electric power required to drive these three plasma electrodes.

Also, the wind turbine control device 10 determines that the second wind turbine 1b is affected by the wake of the first wind turbine 1a using the direction data, the wake data, and the wind turbine data. For example, when a position of the second wind turbine 1b indicated in the wind turbine position data is included in the wake passage region indicated in the wake passage region data, the wind turbine control device 10 determines that the second wind turbine 1b is affected by the first wind turbine 1a. The wind turbine control device 10 controls the first wind turbine 1a so that the angle of attack α of each of the blades 51, 52, and 53 is included in a range of more than the stall angle $α_S$ and controls the first wind turbine 1a so that the tip speed ratio λ is included in a range in which a difference between the power coefficient Cp (ON) and the power coefficient Cp (OFF) exceeds a prescribed threshold value.

Thereby, the wind turbine control device 10 can limit the case where the wake of the first wind turbine 1a located on the windward side of the second wind turbine 1b flows into the second wind turbine 1b and the output of the power generator provided in the second wind turbine 1b is reduced. Therefore, the wind turbine control device 10 can reduce an area required for the construction of a wind farm including the first wind turbine 1a and the second wind turbine 1b while improving the power generation efficiency of the entire wind farm. Further, because the thrust force T received by the first wind turbine 1a from the incoming wind is reduced in the above-described control, the wind turbine control device 10 can avoid a situation in which an unnecessary load is applied to each part of the first wind turbine 1a.

Also, the wind turbine control device 10 may control the first wind turbine 1a so that the angle of attack $\alpha$ of each of the blade 51, the blade 52, and the blade 53 is included in a range of the stall angle $\alpha_S$ or less when no plasma is generated. Thereby, even if no plasma is generated, the wind turbine control device 10 can secure a lift coefficient CL of a certain level or more and continue the operation of the first wind turbine 1a without having to perform a repair process by stopping the first wind turbine 1a and spend a period in which an operator is skilled in the operation in a state in which the angle of attack $\alpha$ within the range R81 shown in FIG. 25 or within the range R91 shown in FIG. 26 is maintained while generating a plasma.

Also, when the airfoil of each of the blade 51, the blade 52, and the blade 53 is of a trailing-edge flow separation type and the first wind turbine 1a is controlled so that the angle of attack $\alpha$ of each of the blade 51, the blade 52, and the blade 53 is included in the range R822 shown in FIG. 25, the wind turbine control device 10 can further stabilize the lift coefficient CL of each of the blade 51, the blade 52, and the blade 53. On the other hand, the wind turbine control device 10 can further increase the lift coefficient CL of each of the blade 51, the blade 52, and the blade 53 when the airfoil of each of the blade 51, the blade 52, and the blade 53 is of a trailing-edge flow separation type.

Figure 28:
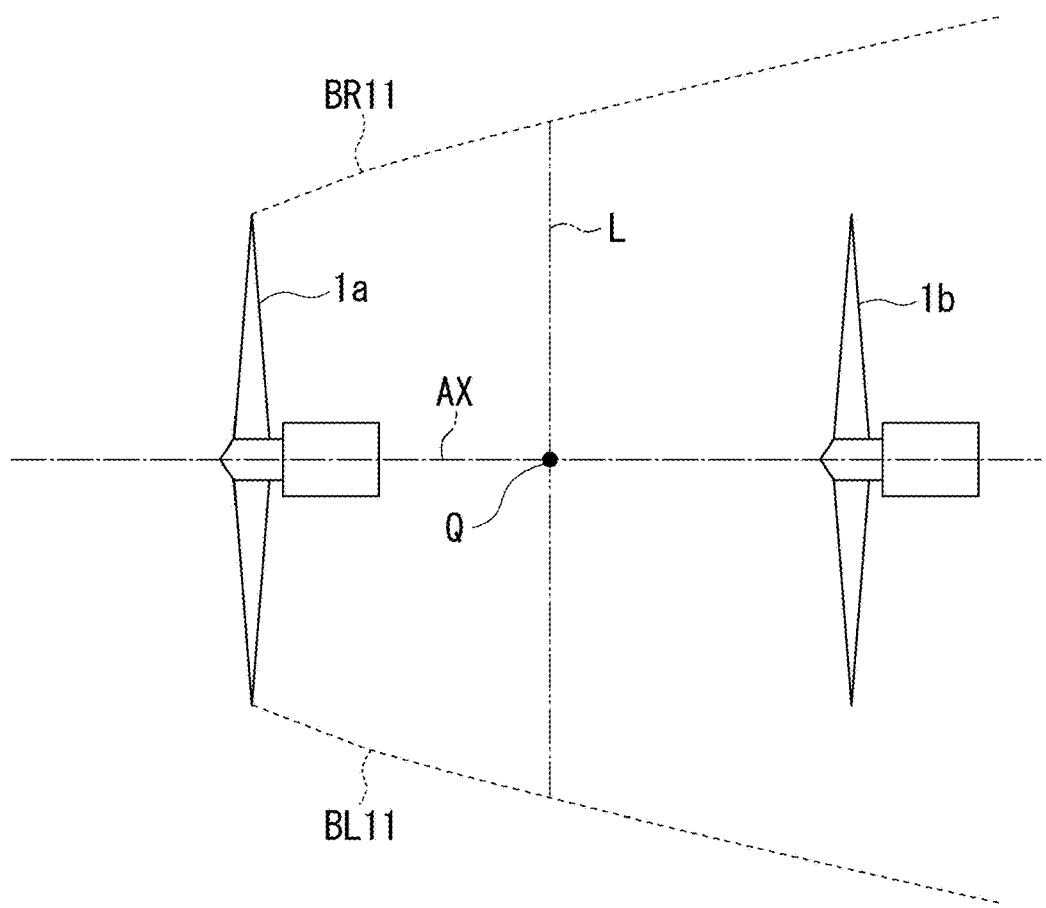
FIG. 28 is a bird's-eye view of the first wind turbine, the second wind turbine, and the surroundings of these two wind turbines according to the embodiment of the present invention.

Next, effects of the wind turbine control device 10 according to the embodiment will be specifically described with reference to FIGS. 28 and 29. FIG. 28 is a bird's-eye view of the first wind turbine, the second wind turbine, and the surroundings of these two wind turbines according to the embodiment of the present invention.

A region sandwiched between a dotted line BR11 and a dotted line BL11 shown in FIG. 28 is a wake passage region through which the wake of the first wind turbine 1a passes and includes the second wind turbine 1b. On the other hand, in FIG. 28, a region above the dotted line BR11 and a region below the dotted line BL11 are free stream regions through which the free stream passes. Also, the wind speed in the free stream region is faster than the wind speed in the wake passage region. Also, an dash-dot-dash line AX shown in FIG. 28 indicates a horizontal line passing through the rotation center of the rotor of the first wind turbine 1a. An dash-dot-dash line L shown in FIG. 28 is a line segment orthogonal to the dash-dot-dash line AX at a point Q and parallel to the sea surface or the ground surface where the first wind turbine 1a is installed.

Figure 29:
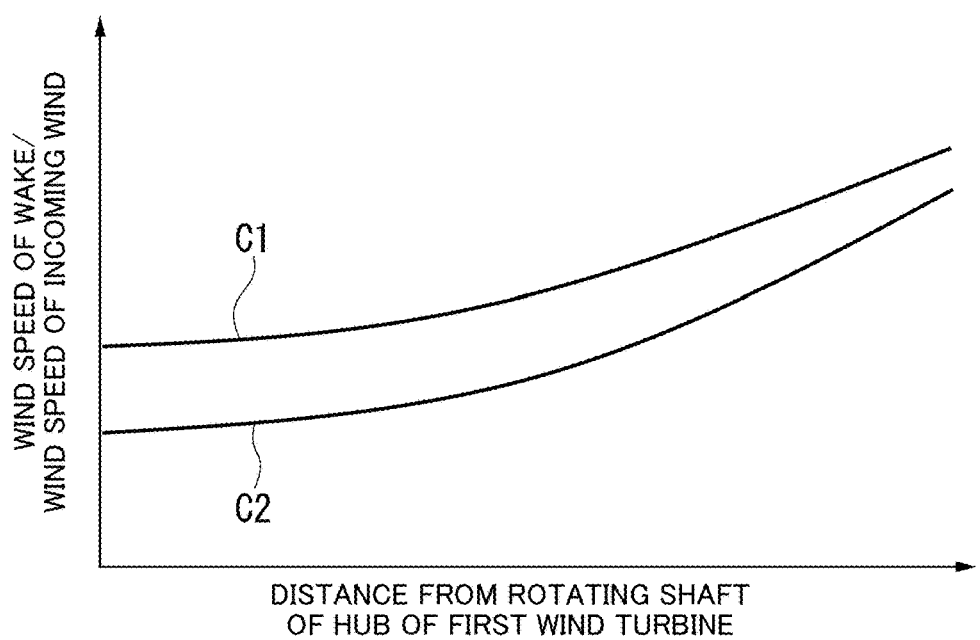
FIG. 29 is a diagram showing an example of a wind speed distribution of the wake of the first wind turbine when plasma electrodes are generating a plasma and a wind speed distribution of the wake of the first wind turbine when the plasma electrodes are generating no plasma according to the embodiment of the present invention.

FIG. 29 is a diagram showing an example of a wind speed distribution of the wake of the first wind turbine when plasma electrodes are generating a plasma and a wind speed distribution of the wake of the first wind turbine when the plasma electrodes are generating no plasma according to the embodiment of the present invention. The horizontal axis of FIG. 29 represents a distance from the rotating shaft of the rotor of the first wind turbine 1a. That is, the horizontal axis of FIG. 29 represents a position on the dash-dot-dash line L with respect to the point Q shown in FIG. 28. On the other hand, the vertical axis of FIG. 29 represents a quantity obtained by dividing the wind speed of the wake of the first wind turbine 1a by the wind speed of the incoming wind of the first wind turbine 1a.

A solid line C1 shown in FIG. 29 indicates a wind speed distribution of the wake of the first wind turbine 1a when a plasma is being generated. On the other hand, a solid line C2 shown in FIG. 29 indicates a wind speed distribution of the wake of the first wind turbine 1a when no plasma is being generated.

As shown in FIG. 28, the wake of the first wind turbine 1a is the incoming wind of the second wind turbine 1b. Also, in relation to the wake of the first wind turbine 1a, a turbulence intensity increases when the tip speed ratio $\lambda$ of the first wind turbine 1a is included in the range R61 shown in FIG. 23 and the first wind turbine 1a is controlled so that a plasma is generated. Thereby, because air mixing due to turbulence is promoted at a boundary between the wake passage region and the free flow region, the speed of the wake of the first wind turbine 1a increases across the entire wake passage region as shown in FIG. 29. Therefore, the wind turbine control device 10 can limit a decrease in the wind speed of the wake of the first wind turbine 1a and limit a decrease in the output of the power generator provided in the second wind turbine 1b by generating a plasma.

Ideally, it is preferable that the first wind turbine 1a be operated with a tip speed ratio $\Lambda_{OPT}$ at which the power coefficient Cp is maximized. However, because the above-described wind speed U actually changes, the first wind turbine 1a is operated in, for example, a range in which the tip speed ratio $\lambda$ is from the tip speed ratio $\lambda'$ to the tip speed ratio $\Lambda 2$ shown in FIGS. 23 and 24. When the first wind turbine 1a is operated in the range in which the tip speed ratio $\lambda$ is from the tip speed ratio $\lambda'$ to the tip speed ratio $\Lambda 2$, it is possible by generating a plasma to obtain a power coefficient Cp at a degree which is the same as that when no plasma is being generated even if the range of the tip speed ratio $\lambda$ is extended to a range from the tip speed ratio $\Lambda 1$ to the tip speed ratio $\Lambda 2$ shown in FIGS. 23 and 24.

In this case, as shown in FIG. 24, the thrust coefficient Ct is smaller when the first wind turbine 1a is operated in the range in which the tip speed ratio $\lambda$ is from the tip speed ratio $\Lambda 1$ to the tip speed ratio $\Lambda 2$ than when the first wind turbine 1a is operated in the range in which the tip speed ratio $\lambda$ is from the tip speed ratio $\lambda'$ to the tip speed ratio $\Lambda 2$. Also, in this case, because the wind speed of the incoming wind of the wind turbine located on the leeward side of the first wind turbine 1a is increased, the output of the wind turbine is improved and the efficiency of the entire wind farm is improved.

On the other hand, the first wind turbine 1a may be operated in a range in which the tip speed ratio $\lambda$ is from a tip speed ratio less than the tip speed ratio $\lambda'$ to the tip speed ratio $\Lambda 2$. In this case, the output of the first wind turbine 1a is less than that when the operating range is not extended due to a decrease in the power coefficient Cp. However, in this case, because the decrease in the wind speed of the incoming wind of the wind turbine located on the leeward side of the first wind turbine 1a is alleviated, the efficiency of the entire wind farm is improved.

Although the case where the wind turbine control device 10 creates the scatter diagram shown in FIG. 15 has been described as an example in the above-described embodiment, the present invention is not limited thereto. The wind turbine control device 10 may execute a process of comparing a distribution of white dots shown in FIG. 18 with a distribution of black dots shown in FIG. 18 as an operation history comparison process without creating the scatter diagram shown in FIG. 15.

Also, the wind turbine control device 10 acquires direction data indicating a direction in which the rotating surface of the first wind turbine 1a is facing, wake passage region data indicating a wake passage region through which the wake of the first wind turbine 1a passes, and wind turbine position data indicating a position of the second wind turbine 1b different from the first wind turbine 1a. Next, the wind turbine control device 10 determines whether or not the position of the second wind turbine 1b indicated in the wind turbine position data is included in the wake passage region indicated in the wake passage region data using the direction data, the wake passage region data, and the wind turbine position data.

When it is determined that the position of the second wind turbine 1b indicated in the wind turbine position data is included in the wake passage region indicated in the wake passage region data, the wind turbine control device 10 controls a direction in which the rotating surface of the first wind turbine 1a is facing and controls the plasma electrodes so that a plasma is generated so that the position of the second wind turbine 1b indicated in the wind turbine position data is not included in the wake passage region indicated in the wake passage region data.

Thereby, the wind turbine control device 10 can remove the second wind turbine 1b from the wake passage region while limiting a changing load applied to the first wind turbine 1a.

Also, the acquisition unit 11 may acquire the wind condition data at the time of plasma generation simultaneously with the operation history data at the time of plasma generation or may acquire the wind condition data at the time of stopping plasma generation simultaneously with the operation history data at the time of stopping plasma generation.

Also, at least some of the functions of the wind turbine control device 10 may be implemented by executing a program with hardware including a circuit unit (circuitry). The hardware mentioned herein is, for example, a central processing unit (CPU), a large-scale integration (LSI) circuit, an application specific integrated circuit (ASIC), a field-programmable gate array (FPGA), and a graphics processing unit (GPU). Also, the above-described program is stored in a storage device including a storage medium. The storage medium mentioned herein is, for example, a hard disk drive (HDD), a flash memory, a read only memory (ROM), and a digital versatile disc (DVD). Also, the above-described program may be a differential program that implements some of the functions of the wind turbine control device 10.

The embodiments of the present invention have been described above with reference to the drawings. However, the wind turbine control device 10 is not limited to the above-described embodiments and various modifications, substitutions, combinations, or design changes can be made without departing from the scope and spirit of the present invention.

REFERENCE SIGNS LIST

10 Wind turbine control device
11 Acquisition unit
12 Determination unit
13 Adjustment unit
14 Control unit
15 Notification unit

The invention claimed is:

1. A wind turbine control device comprising:
an acquisition unit configured to acquire operation history data at the time of plasma generation indicating an operation history of a first wind turbine when a plasma has been generated by plasma electrodes installed on a blade and operation history data at the time of stopping plasma generation indicating an operation history of the first wind turbine when no plasma has been generated by the plasma electrodes;
a determination unit configured to execute an operation history comparison process of comparing the operation history data at the time of plasma generation with the operation history data at the time of stopping plasma generation and execute an operation history determination process of determining whether or not a result of the operation history comparison process satisfies a prescribed first condition; and
a control unit configured to control at least one of the plasma electrodes and at least one of the first wind turbine and a second wind turbine different from the first wind turbine on the basis of a result of the operation history determination process,
wherein the acquisition unit acquires the operation history data at the time of plasma generation indicating a relationship between at least two types of physical quantities and the operation history data at the time of stopping plasma generation indicating a relationship between at least two types of physical quantities, and
wherein the determination unit determines whether or not the prescribed first condition in which the relationship between at least two types of physical quantities indicated in the operation history data at the time of plasma generation matches the relationship between at least two types of physical quantities indicated in the operation history data at the time of stopping plasma generation is satisfied in the operation history determination process.

2. The wind turbine control device according to claim 1, wherein the acquisition unit acquires wind condition data at the time of plasma generation indicating a wind condition when the plasma has been generated by the plasma electrodes simultaneously with the operation history data at the time of plasma generation and acquires wind condition data at the time of stopping plasma generation indicating a wind condition when no plasma has been generated by the plasma electrodes simultaneously with the operation history data at the time of stopping plasma generation.

3. The wind turbine control device according to claim 1,
wherein the acquisition unit acquires wind condition data at the time of plasma generation indicating a wind condition when the plasma has been generated by the plasma electrodes and acquires wind condition data at the time of stopping plasma generation indicating a wind condition when no plasma has been generated by the plasma electrodes,
wherein the determination unit executes a wind condition comparison process of comparing the wind condition data at the time of plasma generation with the wind condition data at the time of stopping plasma generation and further determines whether or not a result of the wind condition comparison process satisfies a prescribed wind condition, and wherein the acquisition unit acquires the operation history data at the time of plasma generation and the operation history data at the time of stopping plasma generation when it is determined that the result of the wind condition comparison process satisfies the prescribed wind condition.

4. The wind turbine control device according to claim 1, wherein the determination unit compares a statistical value of a physical quantity included in the operation history data at the time of plasma generation with a statistical value of a physical quantity included in the operation history data at the time of stopping plasma generation in the operation history comparison process.

5. The wind turbine control device according to claim 1,
wherein the acquisition unit further acquires second wind turbine operation history data indicating an operation history of the second wind turbine, and
wherein the control unit selects any of execution of a process of changing only control of the first wind turbine, execution of a process of changing only control of the second wind turbine, and execution of a process of changing the control of the first wind turbine and the control of the second wind turbine on the basis of the result of the operation history determination process.

6. The wind turbine control device according to claim 5,
wherein the acquisition unit acquires the operation history data at the time of plasma generation indicating a relationship between a tip speed ratio and a power coefficient of the first wind turbine and the operation history data at the time of stopping plasma generation indicating a relationship between a tip speed ratio and a power coefficient of the first wind turbine,
wherein the wind turbine control device further comprises an adjustment unit configured to adjust a control parameter related to at least one of the tip speed ratio, torque of the first wind turbine, a pitch angle of the first wind turbine, and a yaw control characteristic for the first wind turbine when it is determined that the result of the operation history comparison process satisfies the prescribed first condition, and
wherein the control unit selects the execution of the process of changing only the control of the first wind turbine and controls the first wind turbine using the control parameter adjusted by the adjustment unit.

7. The wind turbine control device according to claim 5,
wherein the acquisition unit acquires the operation history data at the time of plasma generation indicating a relationship between an output and a wind speed of the first wind turbine and the operation history data at the time of stopping plasma generation indicating a relationship between an output and a wind speed of the first wind turbine,
wherein the wind turbine control device further comprises an adjustment unit configured to adjust a control parameter related to a control characteristic for the output when it is determined that the result of the operation history comparison process satisfies the prescribed first condition, and
wherein the control unit selects the execution of the process of changing only the control of the first wind turbine and controls the first wind turbine using the control parameter adjusted by the adjustment unit.

8. The wind turbine control device according to claim 5,
wherein the acquisition unit acquires the operation history data at the time of plasma generation indicating a relationship between a rotational speed and torque of the first wind turbine and the operation history data at the time of stopping plasma generation indicating a relationship between a rotational speed and torque of the first wind turbine,
wherein the wind turbine control device further comprises an adjustment unit configured to adjust a control parameter related to a control characteristic for the torque when it is determined that the result of the operation history comparison process satisfies the prescribed first condition, and
wherein the control unit selects the execution of the process of changing only the control of the first wind turbine and controls the first wind turbine using the control parameter adjusted by the adjustment unit.

9. The wind turbine control device according to claim 5,
wherein the acquisition unit acquires the operation history data at the time of plasma generation indicating a relationship between a rotational speed and a pitch angle of the first wind turbine and the operation history data at the time of stopping plasma generation indicating a relationship between a rotational speed and a pitch angle of the first wind turbine,
wherein the wind turbine control device further comprises an adjustment unit configured to adjust a control parameter related to a control characteristic for the pitch angle when it is determined that the result of the operation history comparison process satisfies the prescribed first condition, and
wherein the control unit selects the execution of the process of changing only the control of the first wind turbine and controls the first wind turbine using the control parameter adjusted by the adjustment unit.

10. The wind turbine control device according to claim 5,
wherein the acquisition unit acquires the operation history data at the time of plasma generation indicating a relationship between a tip speed ratio and a power coefficient of the first wind turbine and the operation history data at the time of stopping plasma generation indicating a relationship between a tip speed ratio and a power coefficient of the first wind turbine,
wherein the wind turbine control device further comprises an adjustment unit configured to adjust a control parameter related to a control characteristic for the tip speed ratio when it is determined that the result of the operation history comparison process satisfies the prescribed first condition, and
wherein the control unit selects the execution of the process of changing only the control of the first wind turbine and controls the first wind turbine using the control parameter adjusted by the adjustment unit.

11. The wind turbine control device according to claim 5,
wherein the acquisition unit acquires the operation history data at the time of plasma generation indicating a relationship between a tip speed ratio and a wind speed of the first wind turbine and the operation history data at the time of stopping plasma generation indicating a relationship between a tip speed ratio and a wind speed of the first wind turbine,
wherein the wind turbine control device further comprises an adjustment unit configured to adjust a control parameter related to a control characteristic for the tip speed ratio when it is determined that the result of the operation history comparison process satisfies the prescribed first condition, and
wherein the control unit selects the execution of the process of changing only the control of the first wind turbine and controls the first wind turbine using the control parameter adjusted by the adjustment unit.

12. The wind turbine control device according to claim 5,
wherein the acquisition unit further acquires the second wind turbine operation history data indicating a relationship between a wind speed of the second wind turbine and a frequency of the wind speed of the second wind turbine,
wherein the determination unit further determines whether or not the operation history of the second wind turbine indicated in the second wind turbine operation history data satisfies a prescribed second condition, and
wherein the control unit selects the execution of the process of changing only the control of the second wind turbine.

13. The wind turbine control device according to claim 5,
wherein the acquisition unit further acquires the second wind turbine operation history data indicating a relationship between an output and a wind speed of the second wind turbine,
wherein the determination unit further determines whether or not the operation history of the second wind turbine indicated in the second wind turbine operation history data satisfies a prescribed second condition, and
wherein the control unit selects the execution of the process of changing only the control of the second wind turbine.

14. The wind turbine control device according to claim 5,
wherein the acquisition unit further acquires the second wind turbine operation history data indicating a relationship between a rotational speed, torque, or a wind speed of the second wind turbine and vibrations or distortion of the second wind turbine,
wherein the determination unit further determines whether or not the operation history of the second wind turbine indicated in the second wind turbine operation history data satisfies a prescribed second condition, and
wherein the control unit selects the execution of the process of changing only the control of the second wind turbine.

15. The wind turbine control device according to claim 5,
wherein the acquisition unit acquires the operation history data at the time of plasma generation indicating a relationship between a wind speed of the first wind turbine and a frequency of the wind speed of the first wind turbine and the operation history data at the time of stopping plasma generation indicating a relationship between a wind speed of the first wind turbine and a frequency of the wind speed of the first wind turbine and further acquires the second wind turbine operation history data indicating a relationship between a wind speed of the second wind turbine and a frequency of the wind speed of the second wind turbine,
wherein the determination unit further determines whether or not the operation history of the second wind turbine indicated in the second wind turbine operation history data satisfies a prescribed second condition, and
wherein the control unit selects the execution of the process of changing the control of the first wind turbine and the control of the second wind turbine.

16. The wind turbine control device according to claim 1, further comprising a notification unit configured to provide a notification for notifying that it is recommended to keep the plasma electrodes installed on the blade when it is determined that the result of the operation history comparison process satisfies the prescribed first condition.

17. The wind turbine control device according to claim 1, further comprising a notification unit configured to provide a notification for notifying that it is recommended to continue a state in which the plasma is generated by the plasma electrodes when it is determined that the result of the operation history comparison process satisfies the prescribed first condition.

18. The wind turbine control device according to claim 1, further comprising a notification unit configured to provide a notification for notifying that the plasma electrodes may be removed from the blade when it is determined that the result of the operation history comparison process does not satisfy the prescribed first condition.

19. The wind turbine control device according to claim 1, further comprising a notification unit configured to provide a notification for notifying that it is recommended to continue a state in which no plasma is generated by the plasma electrodes when it is determined that the result of the operation history comparison process does not satisfy the prescribed first condition.

20. A wind turbine control device comprising:
an acquisition unit configured to acquire operation history data at the time of plasma generation indicating an operation history of a first wind turbine when a plasma has been generated by plasma electrodes installed on a blade and operation history data at the time of stopping plasma generation indicating an operation history of the first wind turbine when no plasma has been generated by the plasma electrodes;
a determination unit configured to execute an operation history comparison process of comparing the operation history data at the time of plasma generation with the operation history data at the time of stopping plasma generation and execute an operation history determination process of determining whether or not a result of the operation history comparison process satisfies a prescribed first condition; and
a control unit configured to control at least one of the plasma electrodes and at least one of the first wind turbine and a second wind turbine different from the first wind turbine on the basis of a result of the operation history determination process,
wherein the acquisition unit further acquires direction data indicating a direction in which a rotating surface of the first wind turbine is facing, wake data indicating information about a wake of the first wind turbine, and wind turbine data indicating information about the second wind turbine different from the first wind turbine,
wherein the determination unit further determines whether or not the second wind turbine is affected by the wake of the first wind turbine using the direction data, the wake data, and the wind turbine data, and
wherein, when it is determined that the second wind turbine is affected by the wake of the first wind turbine, the control unit controls the first wind turbine so that a tip speed ratio of the first wind turbine is included in a range in which a difference between a power coefficient of the first wind turbine in a state in which the plasma electrodes attached to the blade of the first wind turbine are generating the plasma and a power coefficient of the first wind turbine in a state in which the plasma electrodes are not generating the plasma exceeds a prescribed threshold value and controls the plasma electrodes so that the plasma is generated.

21. The wind turbine control device according to claim 20,
wherein the acquisition unit acquires wake passage region data indicating a wake passage region through which the wake of the first wind turbine passes as the wake data and acquires wind turbine position data indicating a position of the second wind turbine as the wind turbine data, and wherein, when the position of the second wind turbine indicated in the wind turbine position data is included in the wake passage region indicated in the wake passage region data, the determination unit determines that the second wind turbine is affected by the first wind turbine.

22. The wind turbine control device according to claim 20, wherein the control unit controls the first wind turbine so that the tip speed ratio of the first wind turbine is included in the range in which the difference exceeds the prescribed threshold value by controlling the first wind turbine so that an angle of attack is included in a range of more than a stall angle in a blade element at a prescribed radial position of the blade.

23. The wind turbine control device according to claim 22, wherein, when an airfoil of the blade is of a trailing-edge flow separation type and the plasma electrodes generate no plasma, the control unit controls the first wind turbine so that an angle of attack is included in a range of a stall angle or less in a blade element at a prescribed radial position of the blade.

24. The wind turbine control device according to claim 22, wherein, when an airfoil of the blade is of a leading-edge flow separation type and the plasma electrodes generate no plasma, the control unit controls the first wind turbine so that an angle of attack is included in a range of a stall angle or less in a blade element at a prescribed radial position of the blade.

25. A wind turbine control device comprising:
an acquisition unit configured to acquire operation history data at the time of plasma generation indicating an operation history of a first wind turbine when a plasma has been generated by plasma electrodes installed on a blade and operation history data at the time of stopping plasma generation indicating an operation history of the first wind turbine when no plasma has been generated by the plasma electrodes;
a determination unit configured to execute an operation history comparison process of comparing the operation history data at the time of plasma generation with the operation history data at the time of stopping plasma generation and execute an operation history determination process of determining whether or not a result of the operation history comparison process satisfies a prescribed first condition; and
a control unit configured to control at least one of the plasma electrodes and at least one of the first wind turbine and a second wind turbine different from the first wind turbine on the basis of a result of the operation history determination process,
wherein the acquisition unit further acquires direction data indicating a direction in which a rotating surface of the first wind turbine is facing, wake passage region data indicating a wake passage region through which the wake of the first wind turbine passes, and wind turbine position data indicating a position of the second wind turbine different from the first wind turbine,
wherein the determination unit further determines whether or not the position of the second wind turbine indicated in the wind turbine position data is included in the wake passage region indicated in the wake passage region data using the direction data, the wake passage region data, and the wind turbine position data, and wherein, when it is determined that the position of the second wind turbine indicated in the wind turbine position data is included in the wake passage region indicated in the wake passage region data, the control unit controls the direction in which the rotating surface of the first wind turbine is facing so that the position of the second wind turbine indicated in the wind turbine position data is not included in the wake passage region indicated in the wake passage region data and controls the plasma electrodes so that the plasma is generated.

26. A wind turbine control method comprising:
acquiring operation history data at the time of plasma generation indicating an operation history of a first wind turbine when a plasma has been generated by plasma electrodes installed on a blade and operation history data at the time of stopping plasma generation indicating an operation history of the first wind turbine when no plasma has been generated by the plasma electrodes, acquiring the operation history data at the time of plasma generation indicating a relationship between at least two types of physical quantities and the operation history data at the time of stopping plasma generation indicating a relationship between at least two types of physical quantities;
executing an operation history comparison process of comparing the operation history data at the time of plasma generation with the operation history data at the time of stopping plasma generation and executing an operation history determination process of determining whether or not a result of the operation history comparison process satisfies a prescribed first condition, determining whether or not the prescribed first condition in which the relationship between at least two types of physical quantities indicated in the operation history data at the time of plasma generation matches the relationship between at least two types of physical quantities indicated in the operation history data at the time of stopping plasma generation is satisfied; and
controlling at least one of the plasma electrodes and at least one of the first wind turbine and a second wind turbine different from the first wind turbine on the basis of a result of the operation history determination process.

27. A wind turbine control method comprising:
acquiring operation history data at the time of plasma generation indicating an operation history of a first wind turbine when a plasma has been generated by plasma electrodes installed on a blade and operation history data at the time of stopping plasma generation indicating an operation history of the first wind turbine when no plasma has been generated by the plasma electrodes, acquiring direction data indicating a direction in which a rotating surface of the first wind turbine is facing, wake data indicating information about a wake of the first wind turbine, and wind turbine data indicating information about the second wind turbine different from the first wind turbine;
executing an operation history comparison process of comparing the operation history data at the time of plasma generation with the operation history data at the time of stopping plasma generation and executing an operation history determination process of determining whether or not a result of the operation history comparison process satisfies a prescribed first condition, determining whether or not the second wind turbine is affected by the wake of the first wind turbine using the direction data, the wake data, and the wind turbine data; and when it is determined that the second wind turbine is affected by the wake of the first wind turbine, controlling the first wind turbine so that a tip speed ratio of the first wind turbine is included in a range in which a difference between a power coefficient of the first wind turbine in a state in which the plasma electrodes attached to the blade of the first wind turbine are generating the plasma and a power coefficient of the first wind turbine in a state in which the plasma electrodes are not generating the plasma exceeds a prescribed threshold value and controls the plasma electrodes so that the plasma is generated.

28. A wind turbine control method comprising:

acquiring operation history data at the time of plasma generation indicating an operation history of a first wind turbine when a plasma has been generated by plasma electrodes installed on a blade and operation history data at the time of stopping plasma generation indicating an operation history of the first wind turbine when no plasma has been generated by the plasma electrodes, acquiring direction data indicating a direction in which a rotating surface of the first wind turbine is facing, wake passage region data indicating a wake passage region through which the wake of the first wind turbine passes, and wind turbine position data indicating a position of the second wind turbine different from the first wind turbine;

executing an operation history comparison process of comparing the operation history data at the time of plasma generation with the operation history data at the time of stopping plasma generation and executing an operation history determination process of determining whether or not a result of the operation history comparison process satisfies a prescribed first condition, determining whether or not the position of the second wind turbine indicated in the wind turbine position data is included in the wake passage region indicated in the wake passage region data using the direction data, the wake passage region data, and the wind turbine position data; and when it is determined that the position of the second wind turbine indicated in the wind turbine position data is included in the wake passage region indicated in the wake passage region data, controlling the direction in which the rotating surface of the first wind turbine is facing so that the position of the second wind turbine indicated in the wind turbine position data is not included in the wake passage region indicated in the wake passage region data and controls the plasma electrodes so that the plasma is generated.

* * * * *